United States Patent
Wahadaniah et al.

(10) Patent No.: US 9,167,247 B2
(45) Date of Patent: Oct. 20, 2015

(54) METHODS AND APPARATUSES FOR ENCODING AND DECODING VIDEO USING INTER-COLOR-PLANE PREDICTION

(75) Inventors: Viktor Wahadaniah, Singapore (SG); Chong Soon Lim, Singapore (SG); Sue Mon Thet Naing, Singapore (SG); Jin Li, Singapore (SG); Haiwei Sun, Singapore (SG); Takahiro Nishi, Nara (JP); Hisao Sasai, Osaka (JP); Youji Shibahara, Osaka (JP); Kyoko Tanikawa, Osaka (JP); Toshiyasu Sugio, Osaka (JP); Toru Matsunobu, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 421 days.

(21) Appl. No.: 13/810,736

(22) PCT Filed: May 18, 2012

(86) PCT No.: PCT/JP2012/003284
§ 371 (c)(1),
(2), (4) Date: Jan. 17, 2013

(87) PCT Pub. No.: WO2012/160797
PCT Pub. Date: Nov. 29, 2012

(65) Prior Publication Data
US 2013/0121415 A1 May 16, 2013

Related U.S. Application Data

(60) Provisional application No. 61/488,174, filed on May 20, 2011.

(51) Int. Cl.
*H04N 19/61* (2014.01)
*H04N 19/103* (2014.01)
(Continued)

(52) U.S. Cl.
CPC ....... *H04N 19/00569* (2013.01); *H04N 19/103* (2013.01); *H04N 19/176* (2013.01); *H04N 19/186* (2013.01); *H04N 19/46* (2013.01); *H04N 19/50* (2013.01); *H04N 19/61* (2013.01)

(58) Field of Classification Search
None
See application file for complete search history.

(56) References Cited

U.S. PATENT DOCUMENTS 5,983,251 A * 11/1999 Martens et al. ............... 708/203
7,333,544 B2 * 2/2008 Kim et al. ................ 375/240.16
(Continued)

FOREIGN PATENT DOCUMENTS

JP 2005-039841 2/2005
JP 2008-306719 12/2008

OTHER PUBLICATIONS

Kim et al., "Efficient RGB Video Coding Using Adaptive Inter-Plane Residual Prediction," ICCE 2008, Digest of Technical Papers, International Conf. Consumer Electronics, Jan. 9-13, 2008, pp. 1-2.*
(Continued)

*Primary Examiner* — Jayanti K Patel
*Assistant Examiner* — Reza Aghevli
(74) *Attorney, Agent, or Firm* — Wenderoth, Lind & Ponack, L.L.P.

(57) ABSTRACT

Methods and apparatuses for performing inter-color-plane prediction with adaptability to various existing video content representations are provided. A plurality of predetermined rescaling schemes based on a color plane format is selected. A first block of original samples of a first color plane is encoded into a compressed bitstream. A block of reconstructed samples of the first color plane is reconstructed. An inter-color-plane prediction process is performed to produce samples of a second color plane. Said block of prediction samples of the second color plane is subtracted from a second block of original samples of the second color plane to produce a block of residual samples of the second color plane where the positions of the first block and the second block of original samples are aligned. Finally, the block of residual samples of the second color plane is encoded.

4 Claims, 49 Drawing Sheets

(51) Int. Cl.
*H04N 19/50* (2014.01)
*H04N 19/176* (2014.01)
*H04N 19/46* (2014.01)
*H04N 19/186* (2014.01)

(56) References Cited

U.S. PATENT DOCUMENTS

| | | | |
|---|---|---|---|
| 8,107,749 B2* | 1/2012 | Birinov et al. | 382/236 |
| 8,111,914 B2* | 2/2012 | Lee et al. | 382/166 |
| 2005/0013370 A1 | 1/2005 | Kim et al. | |
| 2007/0014478 A1 | 1/2007 | Birinov et al. | |
| 2008/0298694 A1* | 12/2008 | Kim et al. | 382/236 |
| 2008/0304759 A1 | 12/2008 | Lee et al. | |

OTHER PUBLICATIONS

Song et al., "Block Adaptive Inter-Color Compensation Algorithm for RGB 4:4:4 Video Coding," IEEE Trans. on Circuits and Systems for Video Technology, vol. 18, No. 10, Oct. 2008, pp. 1447-1451.*

Kim et al., "High-Fidelity RGB Video Coding Using Adaptive Inter-Plabe Weighted Prediction," IEEE Trans. on Circuits and Systems for Video Technology, vol. 19, No. 7, Jul. 2009, pp. 1051-1056.*

International Search Report issued Aug. 21, 2012 in International (PCT) Application No. PCT/JP2012/003284.

Written Opinion of the International Searching Authority issued Aug. 21, 2012 in International (PCT) Application No. PCT/JP2012/003284.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, version. 4 (date: May 9, 2011), 5th Meeting: Geneva, CH, Mar. 16-23, 2011.

Larisa Goffman-Vinopal et al., "Color Image Compression using Inter-color Correlation", Proceedings of 2002 International Conference on Image Processing.2002., vol. 2, Dec. 2002, p. II-353-II-356.

Woo-Shik Kim et al., "Color Format Extension", Joint Video Team (JVT) of ISO/IEC MPEG & ITU-T VCEG (ISO/IEC JTC1/SC29/WG11 and ITU-T SG16 Q. 6), JVT-H018, 8th Meeting: Geneva, Switzerland, May 23-27, 2003.

Woo-Shik Kim et al., "Inter-Plane Prediction for RGB Coding", Joint Video Team (JVT) of ISO/IEC MPEG & ITU-T VCEG (ISO/IEC JTC1/SC29/WG11 and ITU-T SG16 Q. 6), JVT-I023, PExt Ad Hoc Group Meeting: Trondheim, Jul. 22-24, 2003 (date saved: Aug. 27, 2003).

Woo-Shik Kim et al., "Inter-Plane Prediction for RGB Coding II", Joint Video Team (JVT) of ISO/IEC MPEG & ITU-T VCEG (ISO/IEC JTC1/SC29/WG11 and ITU-T SG16 Q. 6), JVT-J017, 10th Meeting: Waikoloa, Hawaii, USA, Dec. 8-12, 2003.

Woo-Shik Kim et al., "Inter-Plane Prediction for RGB Video Coding", 2004 International Conference on Image Processing, ICIP '04, Oct. 24-27, 2004, vol. 2, p. 785-788.

Woo-Shik Kim et al., "Advanced Residual Color Transform", Joint Video Team (JVT) of ISO/IEC MPEG & ITU-T VCEG (ISO/IEC JTC1/SC29/WG11 and ITU-T SG16 Q. 6), JVT-Q059, 17th Meeting: Nice, FR, Oct. 14-21, 2005.

S. Benierbah et al., "Compression of colour images by inter-band compensated prediction", IEE Proceedings-Vision, Image and Signal Processing, vol. 153, No. 2, Apr. 2006, p. 237-243.

Detlev Marpe et al., "Macroblock-Adaptive Residual Color Space Transforms for 4: 4: 4 Video Coding", 2006 IEEE International Conference on Image Processing, Oct. 8-11, 2006, p. 3157-3160.

Yong-Hwan Kim et al., "Efficient RGB Video Coding Using Adaptive Inter-Plane Residual Prediction", ICCE 2008. Digest of Technical Papers, International Conference on Consumer Electronics, Jan. 9-13, 2008, p. 1-2.

Byung Cheol Song et al., "Block Adaptive Inter-Color Compensation Algorithm for RGB 4: 4: 4 Video Coding", IEEE Transactions on Circuits and Systems for Video Technology, vol. 18, No. 10, Oct. 2008, p. 1447-1451.

Yong-Hwan Kim et al., "High-Fidelity RGB Video Coding Using Adaptive Inter-Plane Weighted Prediction", IEEE Transactions on Circuits and Systems for Video Technology, vol. 19, No. 07, Jul. 2009, p. 1051-1056.

Lili Zhao et al., "Region Adaptive Inter-Color Prediction Approach to RGB 4: 4: 4 Intra Coding", 2010 Fourth Pacific-Rim Symposium on Image and Video Technology (PSIVT), Nov. 14-17, 2010, p. 203-207.

* cited by examiner

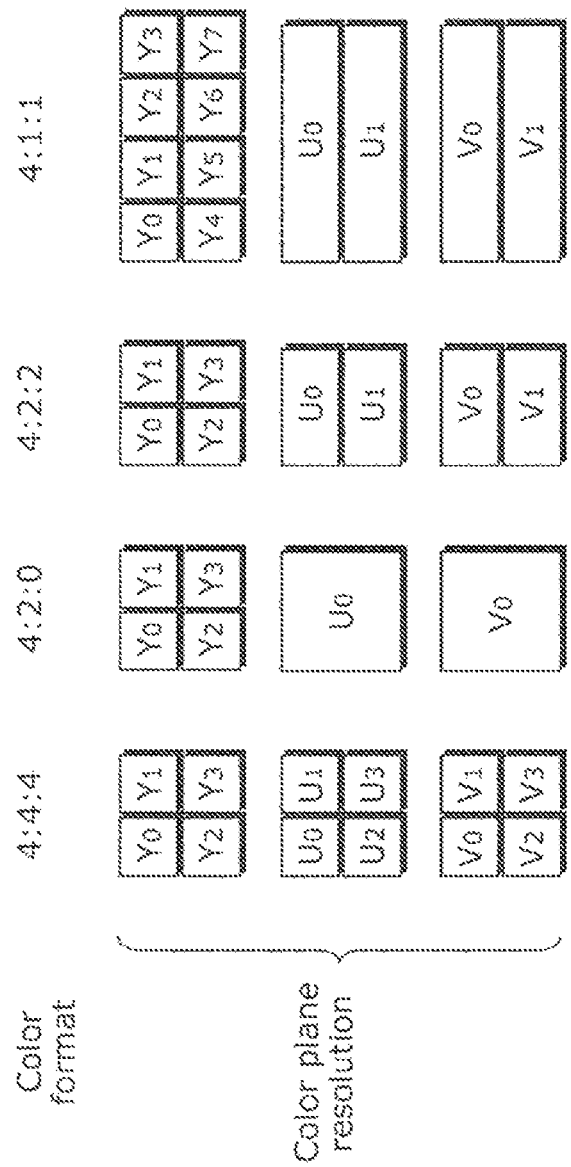
Fig. 1 - PRIOR ART

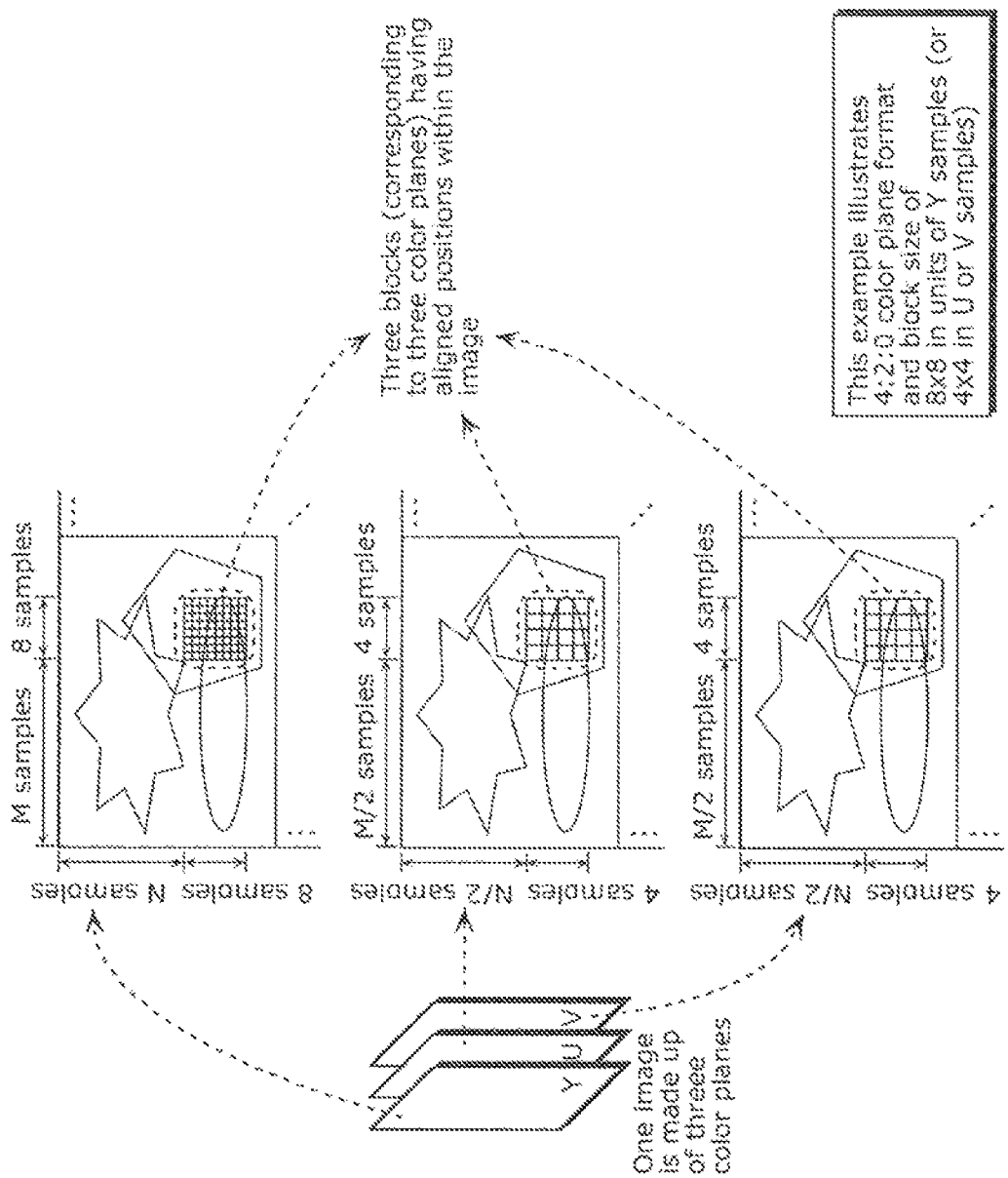
Fig. 2 - PRIOR ART

Fig. 3 - PRIOR ART
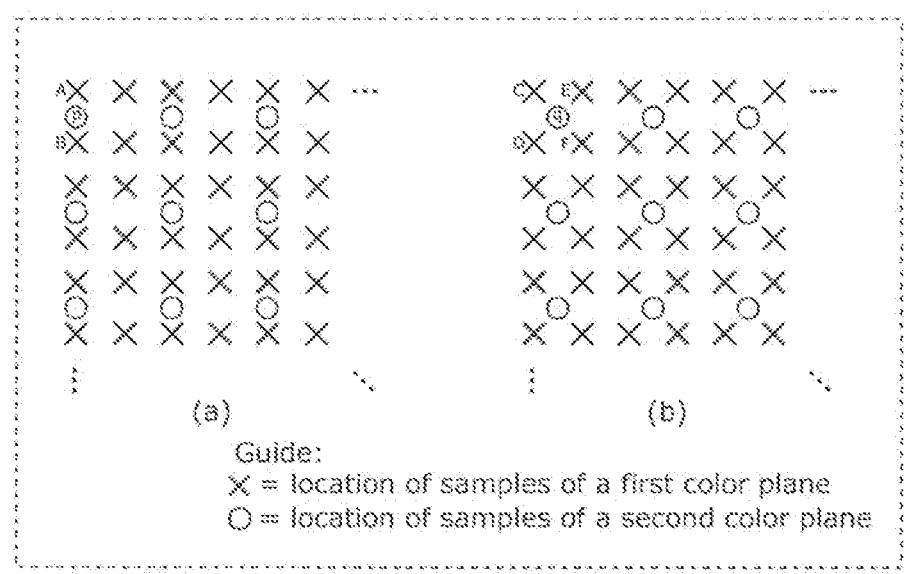
Fig. 4 - PRIOR ART
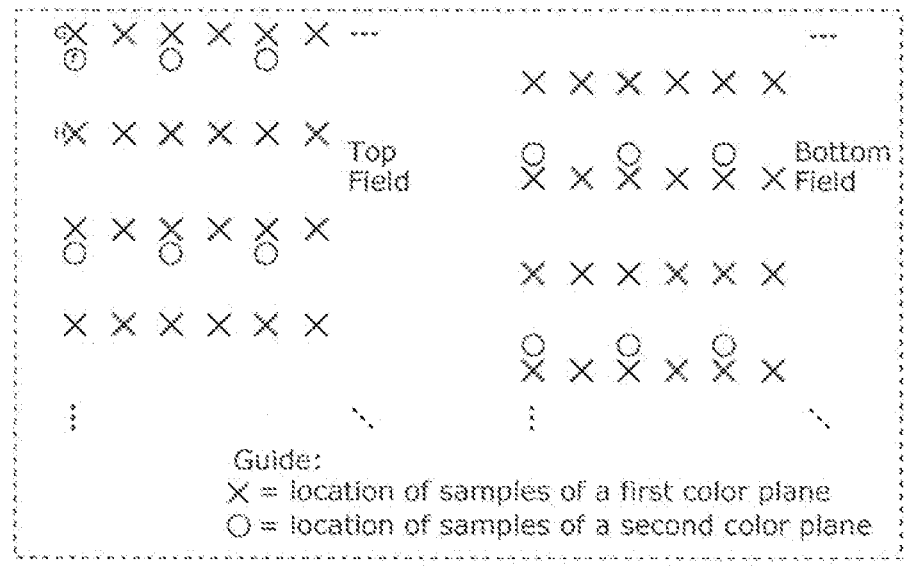

Fig. 39

| Video stream (PID=0x1011, Primary video) | Audio stream (PID=0x1100) | Audio stream (PID=0x1101) | Presentation graphics stream (PID=0x1200) | Presentation graphics stream (PID=0x1201) | Interactive graphics stream (PID=0x1400) | Video stream (PID=0x1B00, Secondary video) | Video stream (PID=0x1B01, Secondary video) |

Fig. 42
Stream of TS packets
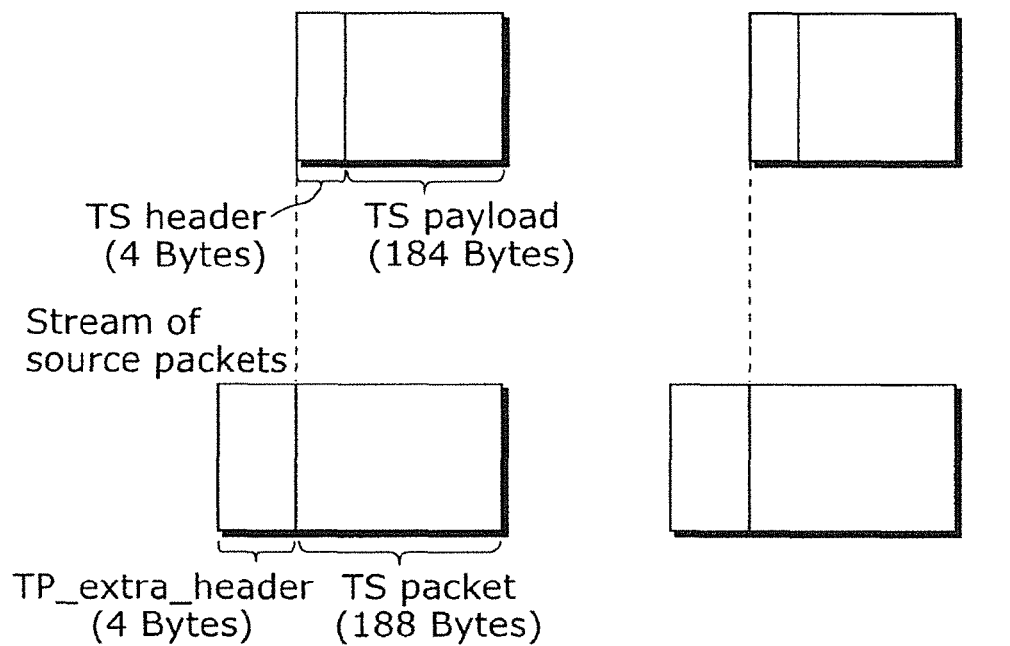
TS header (4 Bytes)  TS payload (184 Bytes)
Stream of source packets
TP_extra_header (4 Bytes)  TS packet (188 Bytes)
Multiplexed data
SPN 0 1 2 3 4 5 6 7 ...
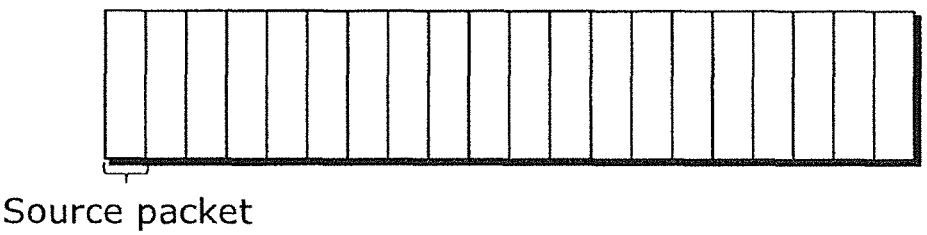
Source packet Fig. 50
| Corresponding standard | Driving frequency |
|---|---|
| MPEG-4 AVC | 500 MHz |
| MPEG-2 | 350 MHz |
| ⋮ | ⋮ |
Fig. 51A
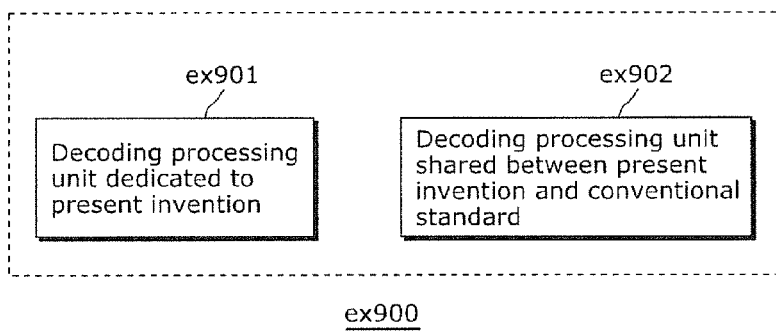
ex900
Fig. 51B
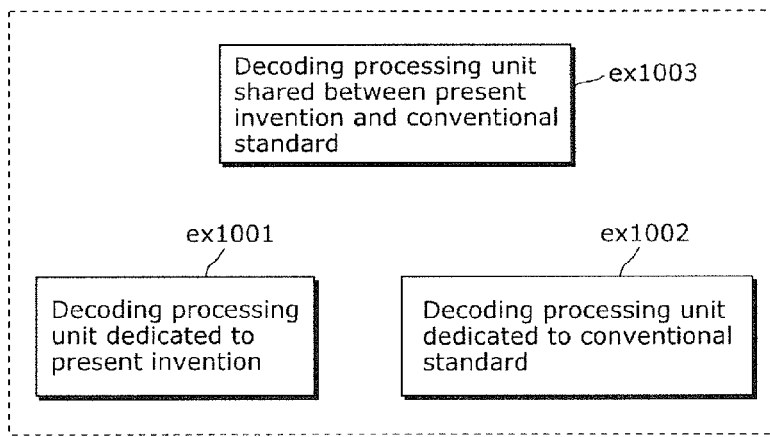
ex1000

METHODS AND APPARATUSES FOR ENCODING AND DECODING VIDEO USING INTER-COLOR-PLANE PREDICTION

TECHNICAL FIELD

This invention can be used in any multimedia data coding and, more particularly, in coding of image and video contents comprising more than one color planes.

BACKGROUND ART

State-of-the-art video coding schemes, such as MPEG-4 AVC/H.264, and the upcoming HEVC (High-Efficiency Video Coding), support coding of image and video contents comprising one or more color planes/components. An example of such video contents is video data in YUV color space with 4:2:0 chroma format (color plane format). YUV color space comprises one luminance plane (Y) and two chrominance planes (U and V), while 4:2:0 chroma format indicates that the resolution of the two chrominance planes is horizontally and vertically half of the luminance plane resolution. Some examples of the commonly used color plane formats are illustrated in FIG. 1.

At aligned positions (as illustrated in FIG. 2), different color planes of an image often contain object shapes and features that are correlated or similar to a certain extent. By utilizing such a correlation, inter-color-plane prediction can be performed in which samples of a second color plane (such as the U plane) are predicted from prior reconstructed samples of a first color plane (such as the Y plane). During both encoding and decoding processes, reconstruction of a first block of the first color plane is performed prior to the prediction process for an aligned second block of the second color plane, so that reconstructed samples of the first block are available for generating the prediction samples for the second block. Inter-color-plane prediction is supported in the Working Draft 3 of HEVC video coding scheme.

SUMMARY OF INVENTION

Technical Problem

The problem with the prior art of inter-color-plane prediction is that it does not account for other image/video content representations other than 4:2:0 chroma format with color plane sampling locations shown in (a) of FIG. 3. Color plane sampling location indicates the position of image samples of a lower-resolution color plane in relation to another higher-resolution color plane. A number of color plane sampling locations may be used in a video, as shown in the examples in FIG. 3.

In addition, the prior art does not account for field coding, in which alternate rows of image samples are coded separately as top and bottom fields. When field coding is used, color sampling locations in the top field and bottom field are different from the case where frame coding is used, as shown in the example in FIG. 4.

Solution to Problem

To solve the above problems, new methods and apparatuses for performing inter-color-plane prediction with adaptability to various color plane formats, color plane sampling locations and field coding type are introduced in the current invention.

What is novel about this invention is that it provides a means to adapt inter-color-plane prediction to the currently existing variety of image/video content representations, thereby expanding the applicability of inter-color-plane prediction techniques.

Advantageous Effects of Invention

The effect of the current invention is in the form of adaptability of inter-color-plane prediction to various image/video content representations. Thus, applicability and coding efficiency of inter-color-plane prediction techniques are improved.

BRIEF DESCRIPTION OF DRAWINGS

FIG. 1 is a diagram illustrating examples of color plane formats in existing variety of image/video content representations.

FIG. 2 is a diagram illustrating an example of an aligned set of blocks of image samples corresponding to the color planes that make up an image/video content representation.

FIG. 3 is a diagram illustrating two examples of different color plane sampling locations for 4:2:0 color plane format.

FIG. 4 is a diagram illustrating an example of different color plane sampling locations in top and bottom field pictures for 4:2:0 color plane format.

FIG. 39 illustrates a structure of multiplexed data.

FIG. 42 shows a structure of TS packets and source packets in the multiplexed data.

FIG. 50 shows an example of a look-up table in which video data standards are associated with driving frequencies.

FIG. 51A is a diagram showing an example of a configuration for sharing a module of a signal processing unit.

FIG. 51B is a diagram showing another example of a configuration for sharing a module of the signal processing unit.

DESCRIPTION OF EMBODIMENTS

Embodiments of the current invention are described in the following. It will be apparent to those skilled in the art that combinations of the embodiments can be carried out to further increase the adaptability of inter-color-plane prediction to various image/video content representations.

Embodiment 1

Figure 5:
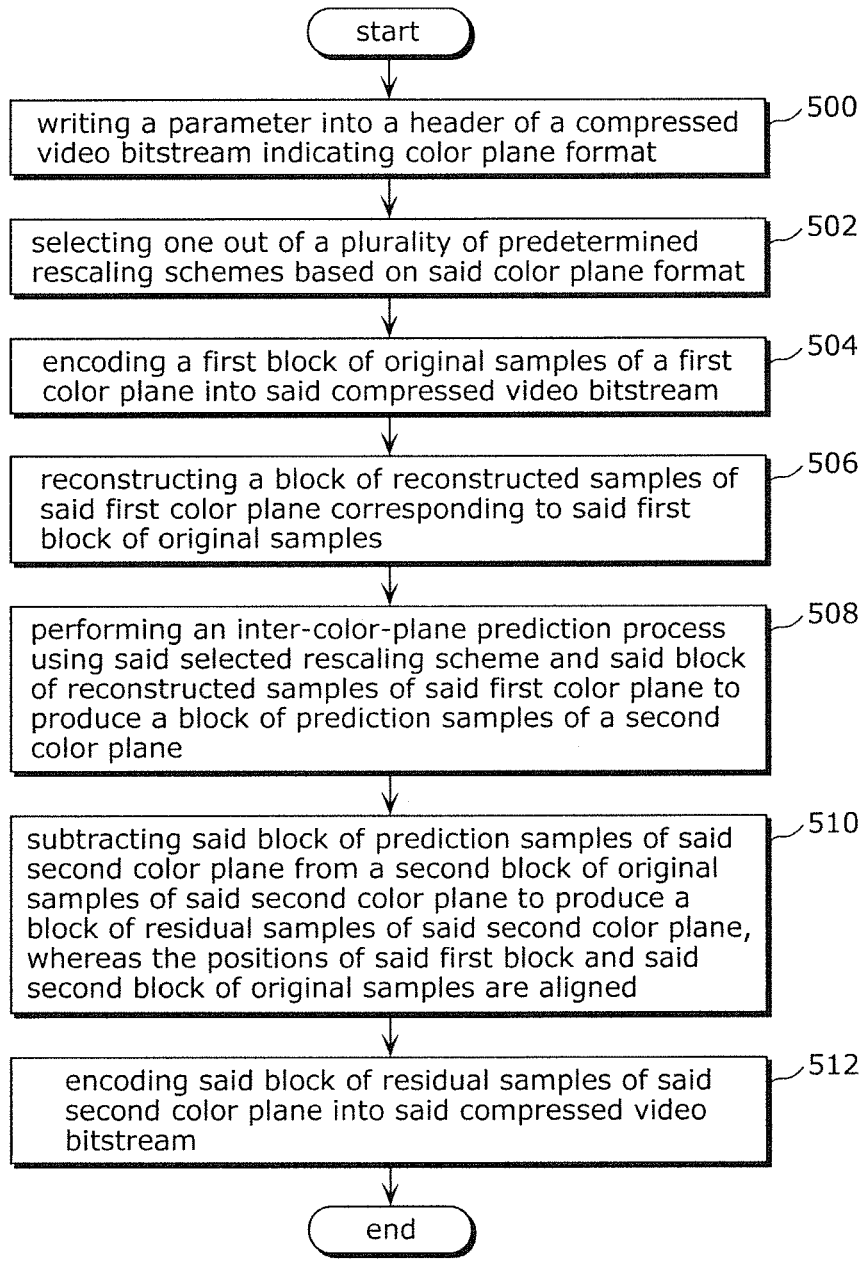
FIG. 5 is a flowchart showing a video encoding process utilizing inter-color-plane prediction scheme according to the first embodiment of the current invention.

FIG. 5 shows a flowchart showing a video encoding process utilizing inter-color-plane prediction scheme according to the first embodiment of the current invention. First, module 500 writes a parameter into a header of a compressed video bitstream indicating color plane format. Module 502 then selects one out of a plurality of predetermined rescaling schemes based on said color plane format. Next, module 504 encodes a first block of original samples of a first color plane into said compressed video bitstream. Next in module 506, a block of reconstructed samples of said first color plane corresponding to said first block of original samples is reconstructed. Module 508 then uses said selected rescaling schemes and said block of reconstructed samples of said first color plane to perform an inter-color-plane prediction process. Upon performing said inter-color-prediction process, module 508 produces a block of prediction samples of a second color plane. Next, module 510 subtracts said block of prediction samples of said second color plane from a second block of original samples of said second color plane to produce a block of residual samples of said second color plane. In this encoding process, the positions of said first block and said second block of original samples are aligned. Finally, module 512 encodes said block of residual samples of said second color plane into said compressed video bitstream.

Figure 7:
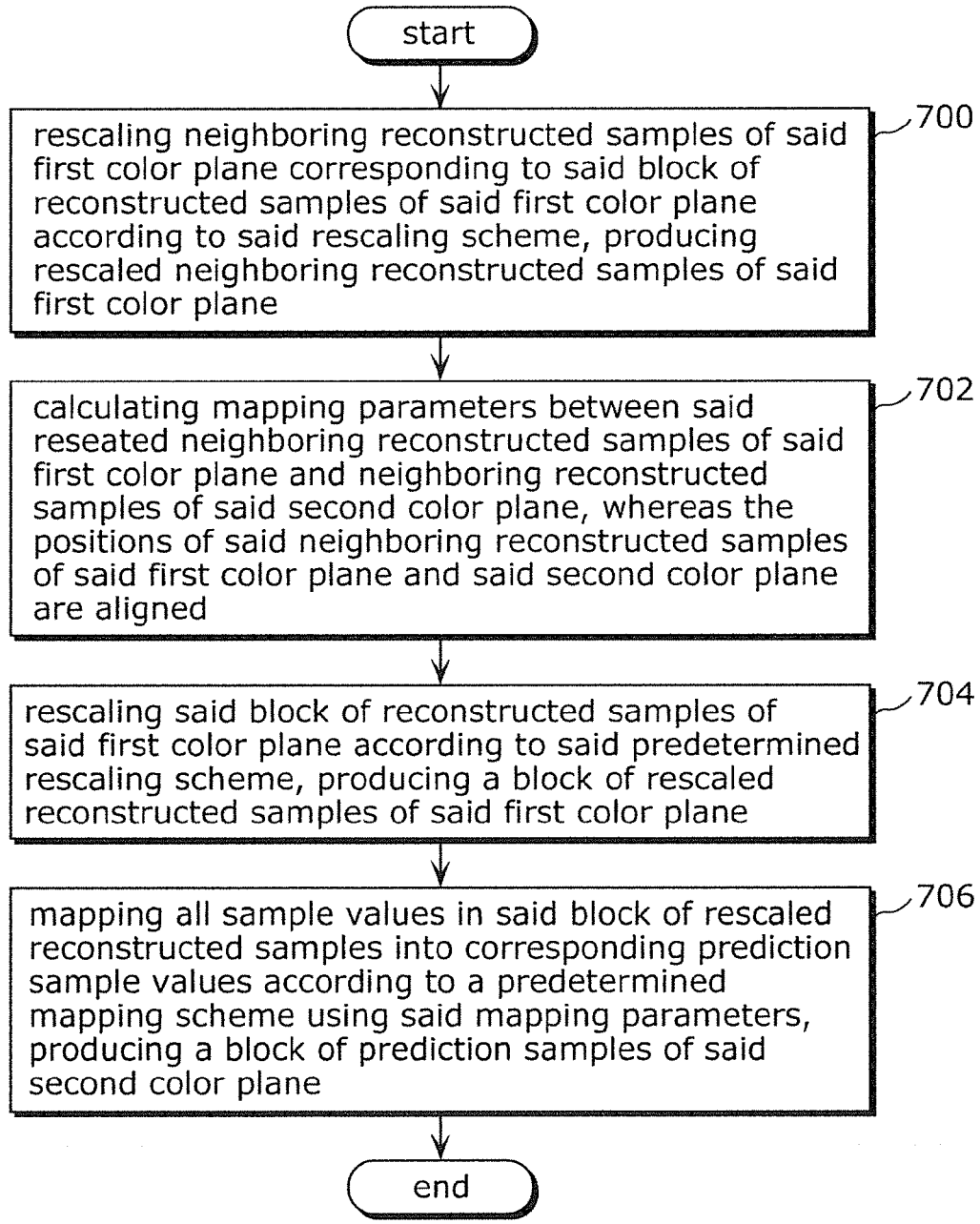
FIG. 7 is a flowchart showing an inter-color-plane prediction process using a predetermined rescaling scheme and a block of reconstructed samples of a first color plane to produce a block of prediction samples of a second color plane.

FIG. 7 shows a flowchart showing an inter-color-plane prediction process using a predetermined rescaling scheme and a block of reconstructed samples of a first color plane to produce a block of prediction samples of a second color plane.

First, module 700 rescales the neighboring reconstructed samples of said first color plane corresponding to said block of reconstructed samples of said first color plane according to said rescaling scheme. Module 700 produces rescaled neighboring reconstructed samples of said first color plane. Neighboring reconstructed samples refer to the reconstructed samples that are generated prior to the encoding process of a current block of image samples and are adjacent to said current block. Examples of neighboring reconstructed samples are two columns of reconstructed samples on the left of a target block and two rows of reconstructed samples above a target block.

A rescaling scheme performs a predetermined interpolation and upscaling/downscaling of an input block of image samples. For the color plane sampling location shown in the example in (a) of FIG. 3, an exemplary predetermined rescaling scheme interpolates samples A and B to produce the sample p. Similarly for the color plane sampling location shown in the example in (b) of FIG. 3, another exemplary predetermined rescaling scheme interpolates samples C, D, E and F to produce the sample q. In yet another color plane sampling location shown in the example in FIG. 4, yet another exemplary predetermined rescaling scheme interpolates samples G and H to produce the sample r.

Next, module 702 calculates mapping parameters between said rescaled neighboring reconstructed samples of said first color plane and neighboring reconstructed samples of said second color plane. In this process, the positions of said neighboring reconstructed samples of said first color plane and said second color plane are aligned. Said mapping parameters control a predetermined mapping scheme which maps a first set of values to a second set of values. An example of a mapping scheme is the mapping from value x to value y according to a linear relationship y=a·x+b. In this example, the constants a and b make up a set of mapping parameters.

Next, module 704 rescales said block of reconstructed samples of said first color plane according to said predetermined rescaling scheme and produces a block of rescaled reconstructed samples of said first color plane. Finally, module 706 maps all sample values in said block of rescaled reconstructed samples into corresponding prediction sample values according to a predetermined mapping scheme using said mapping parameters. Module 706 produces a block of prediction samples of said second color plane, which constitutes the final output of the inter-color-plane prediction process.

Figure 6:
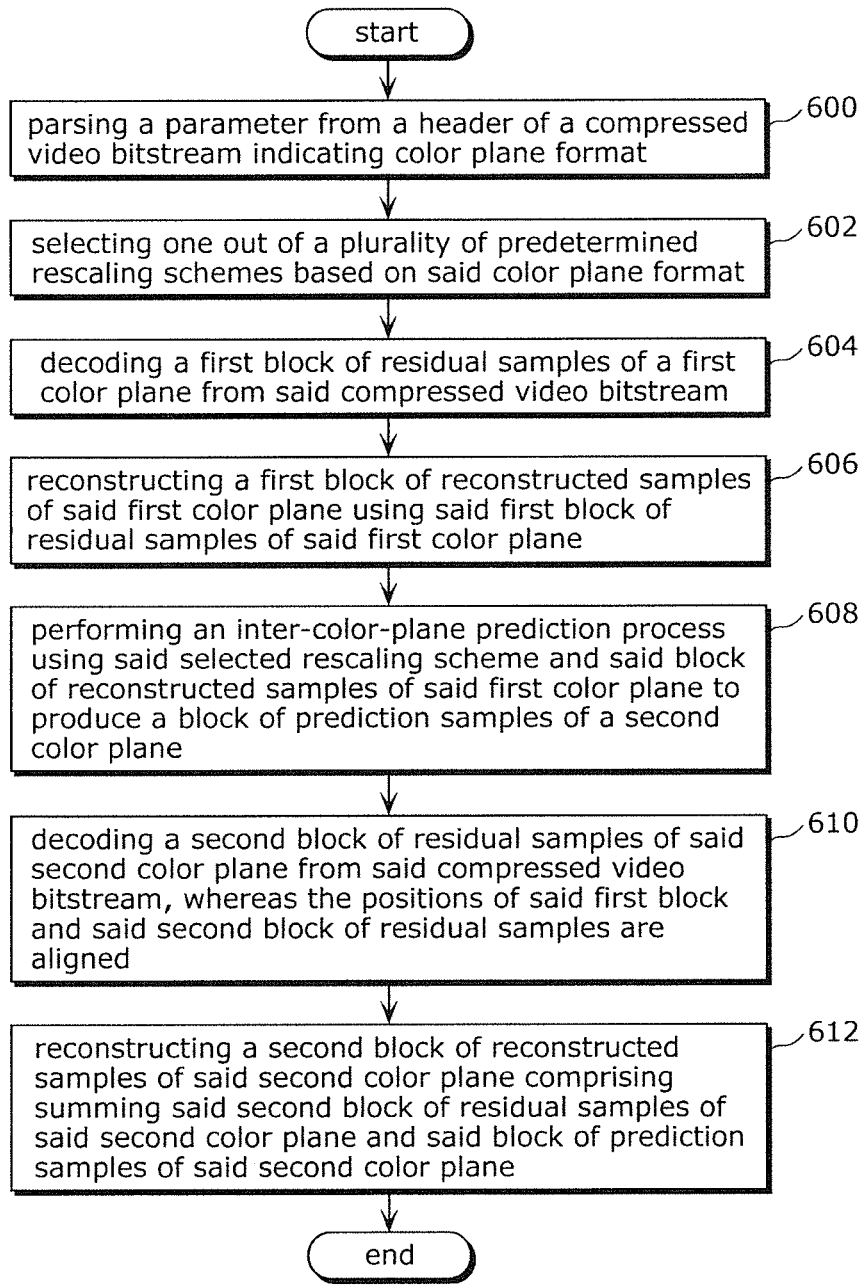
FIG. 6 is a flowchart showing a video decoding process utilizing inter-color-plane prediction scheme according to the first embodiment of the current invention.

FIG. 6 shows a flowchart showing a video decoding process utilizing inter-color-plane prediction scheme according to the first embodiment of the current invention. First, module 600 parses a parameter from a header of a compressed video bitstream indicating color plane format. Module 602 then selects one out of a plurality of predetermined rescaling schemes based on said color plane format. Next, module 604 decodes a first block of residual samples of a first color plane from said compressed video bitstream. Next in module 606, a first block of reconstructed samples of said first color plane corresponding to said first block of original samples is reconstructed. Module 608 then uses said selected rescaling schemes and said first block of reconstructed samples of said first color plane to perform an inter-color-plane prediction process, producing a block of prediction samples of a second color plane. Next, module 610 decodes a second block of residual samples of said second color plane from said compressed video bitstream. In this decoding process, the positions of said first block and said second block of residual samples are aligned. Finally, module 612 performs a reconstruction process to produce a second block of reconstructed samples of said second color plane, comprising summing said second block of residual samples of said second color plane and said block of prediction samples of said second color plane.

Both the encoding process (FIG. 5) and the decoding process (FIG. 6) perform the inter-color prediction process as described above in FIG. 7 in exactly the same manner.

Figure 20:
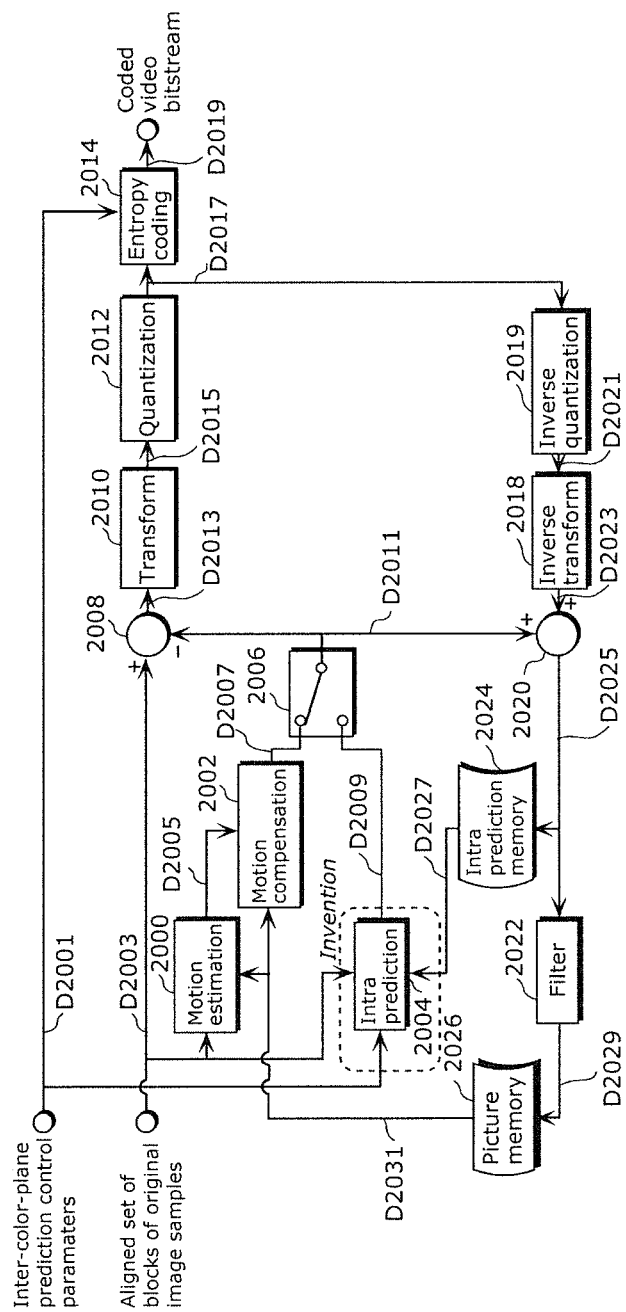
FIG. 20 is a block diagram showing an example apparatus of a video encoder utilizing inter-color-plane prediction scheme according to the current invention.

FIG. 20 shows a block diagram showing an example apparatus of a video encoder utilizing inter-color-plane prediction scheme according to the current invention. It consists of a motion estimation unit 2000, a motion compensation unit 2002, an intra prediction unit 2004, a switch unit 2006, a subtracting unit 2008, a transform unit 2010, a quantization unit 2012, an entropy coding unit 2014, an inverse quantization unit 2016, an inverse transform unit 2018, a summing unit 2020, a filter unit 2022, an intra prediction memory unit 2024, and a picture memory unit 2026.

As shown in the diagram, the motion estimation unit 2000 reads an aligned set of blocks of original samples D2003 corresponding to the color planes that make up an image/video content representation, as well as the reference pictures D2031, then outputs a set of motion vectors D2005. An example of said aligned set of blocks of original samples is three aligned blocks of original samples of Y, U and V planes. In a possible encoder implementation of this invention, the motion estimation unit 2000 uses the original samples of one predetermined color plane (for example Y color plane) for determining said set of motion vectors D2005. Next, the motion compensation unit 2002 reads the set of motion vectors D2005 and the reference pictures D2031 to produce the aligned set of blocks of inter prediction samples D2007.

The intra prediction unit 2004 reads the aligned blocks of original samples D2003, prior reconstructed samples D2027 of the current image adjacent to the blocks of original samples D2003, and the inter-color-plane controlling parameters D2001. Using these inputs, the intra prediction unit 2004 performs the intra prediction process and produces the aligned set of blocks of intra prediction samples D2009.

The switch unit 2006 passes either the inter prediction samples D2007 or intra prediction samples D2009 as the prediction samples D2011 according to a predetermined decision scheme. The subtracting unit 2008 then subtracts the prediction samples D2011 from the original samples D2003 and produces the residual samples D2013. The transform unit 2010 performs a predetermined transform scheme and the quantization unit 2012 performs a predetermined quantization scheme. The resulting quantized transformed residual data D2017 is coded by the entropy coding unit 2014 into the coded video bitstream D2019. Additionally, the entropy coding unit 2014 also codes the inter-color-plane prediction control parameters D2001 into a header of the compressed video bitstream D2019.

The quantized transformed residual data D2017 is inverse quantized and inverse transformed by the inverse quantization unit 2016 and the inverse transform unit 2018 into the difference samples D2023. The summing unit 2020 adds the prediction samples D2011 and the difference samples D2023 to produce the reconstructed samples D2025. The reconstructed samples D2025 of the current image are stored in the intra prediction memory unit 2024 to be used for the encoding process of subsequent blocks of image samples within a current image. The reconstructed samples D2025 are filtered by the filter unit 2022 and the filtered samples D2029 are stored into the picture memory unit 2026.

Figure 21:
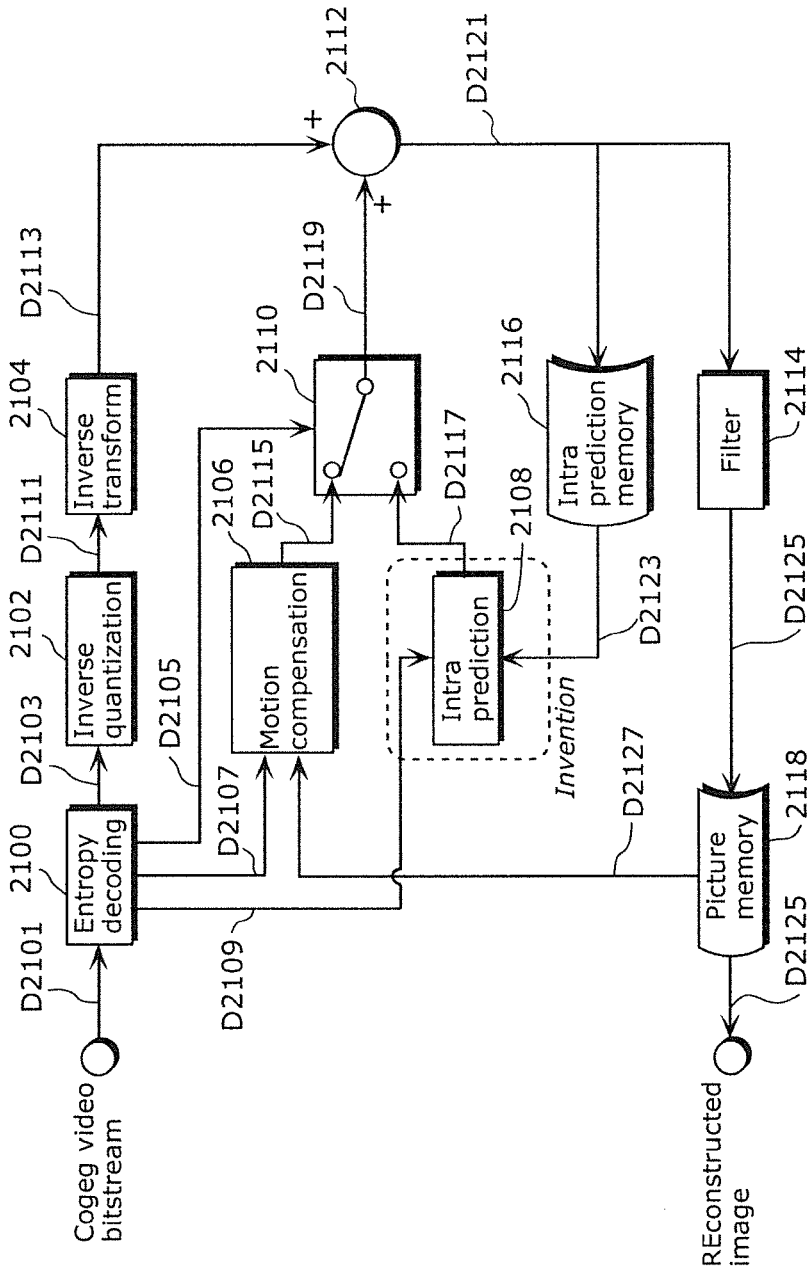
FIG. 21 is a block diagram showing an example apparatus of a video decoder utilizing inter-color-plane prediction scheme according to the current invention.
Figure 22A:
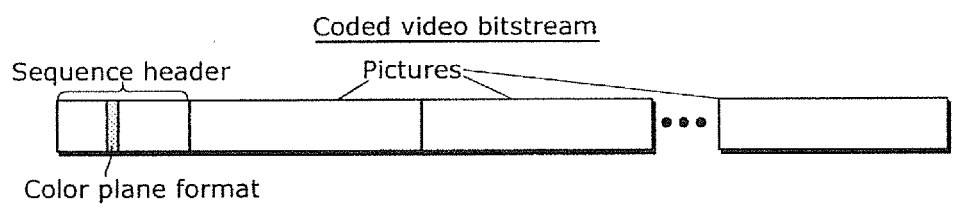
FIG. 22A is a diagram showing the location of the parameter indicating color plane format in a header of a coded video bitstream according to the first embodiment of the current invention.
Figure 22B:
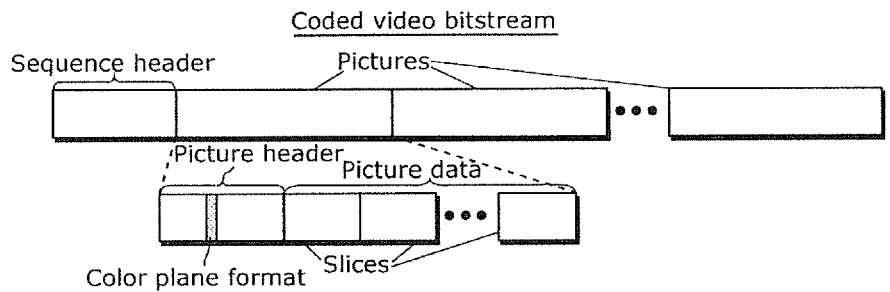
FIG. 22B is a diagram showing the location of the parameter indicating color plane format in a header of a coded video bitstream according to the first embodiment of the current invention.
Figure 22C:
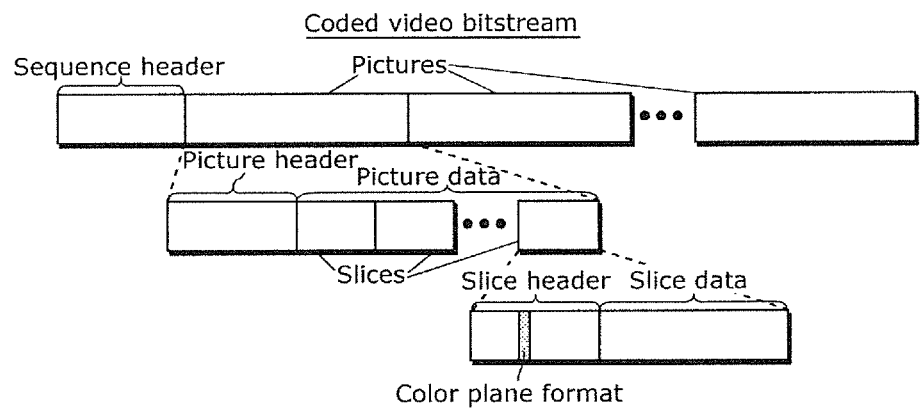
FIG. 22C is a diagram showing the location of the parameter indicating color plane format in a header of a coded video bitstream according to the first embodiment of the current invention.
Figure 22D:
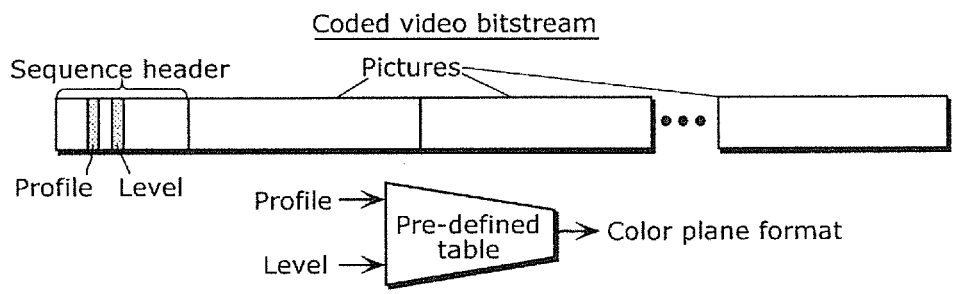
FIG. 22D is a diagram showing the location of the parameter indicating color plane format in a header of a coded video bitstream according to the first embodiment of the current invention.
Figure 23A:
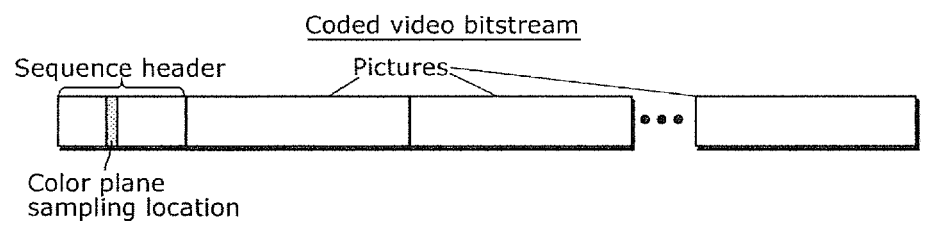
FIG. 23A is a diagram showing the location of the parameter indicating color plane sampling location in a header of a coded video bitstream according to the second embodiment of the current invention.
Figure 23B:
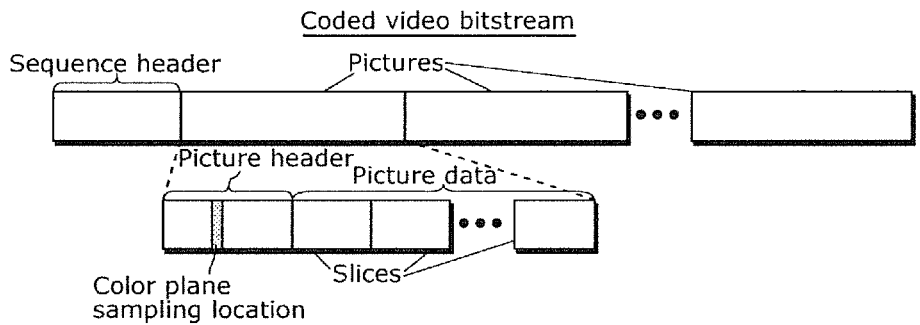
FIG. 23B is a diagram showing the location of the parameter indicating color plane sampling location in a header of a coded video bitstream according to the second embodiment of the current invention.
Figure 23C:
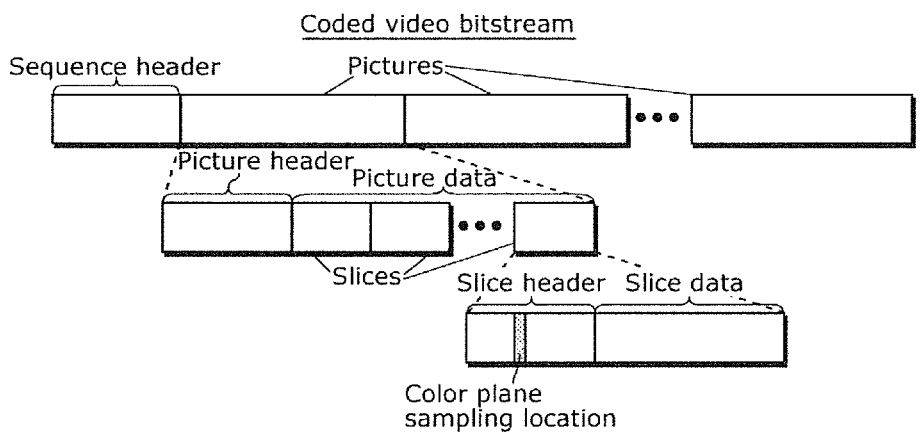
FIG. 23C is a diagram showing the location of the parameter indicating color plane sampling location in a header of a coded video bitstream according to the second embodiment of the current invention.
Figure 23D:
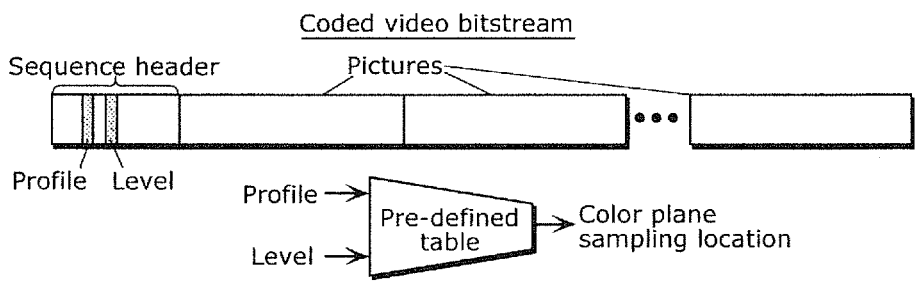
FIG. 23D is a diagram showing the location of the parameter indicating color plane sampling location in a header of a coded video bitstream according to the second embodiment of the current invention.
Figure 24A:
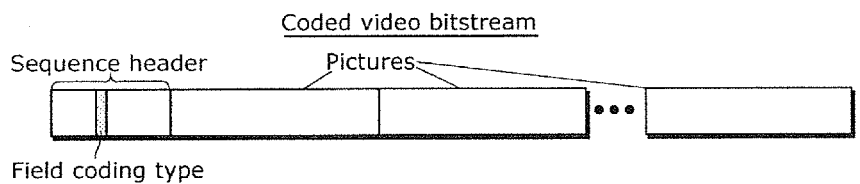
FIG. 24A is a diagram showing the location of the parameter indicating field coding type in a header of a coded video bitstream according to the third embodiment of the current invention.
Figure 24B:
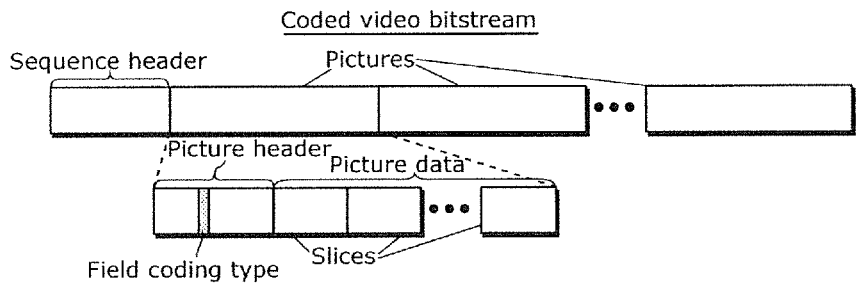
FIG. 24B is a diagram showing the location of the parameter indicating field coding type in a header of a coded video bitstream according to the third embodiment of the current invention.
Figure 24C:
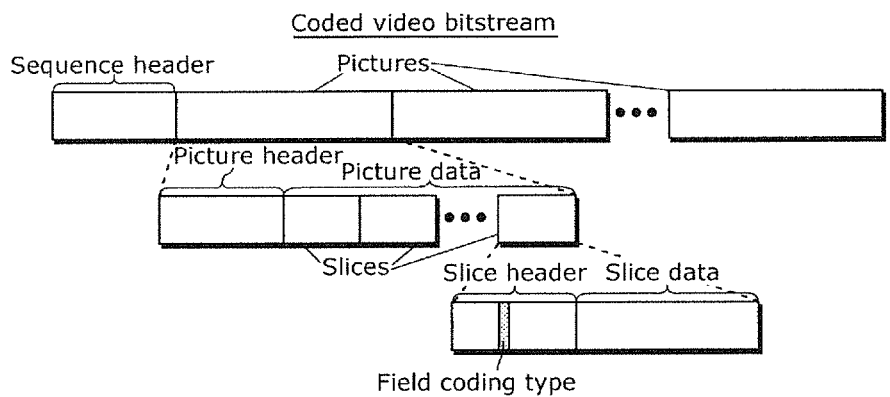
FIG. 24C is a diagram showing the location of the parameter indicating field coding type in a header of a coded video bitstream according to the third embodiment of the current invention.
Figure 24D:
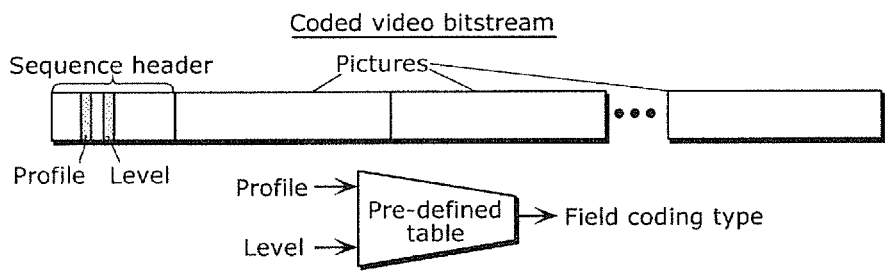
FIG. 24D is a diagram showing the location of the parameter indicating field coding type in a header of a coded video bitstream according to the third embodiment of the current invention.
Figure 25A:
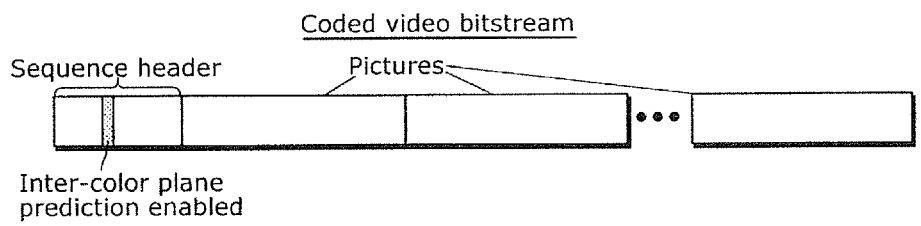
FIG. 25A is a diagram showing the location of the parameter indicating whether or not inter-color-plane prediction is enabled in a header of a coded video bitstream according to the fourth embodiment of the current invention.
Figure 25B:
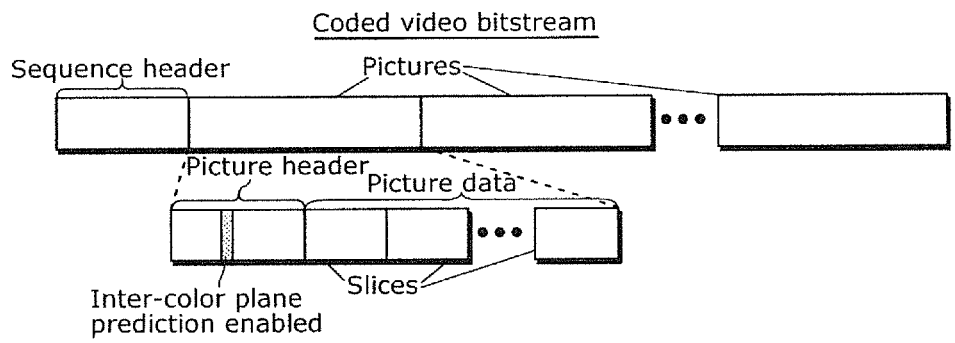
FIG. 25B is a diagram showing the location of the parameter indicating whether or not inter-color-plane prediction is enabled in a header of a coded video bitstream according to the fourth embodiment of the current invention.
Figure 25C:
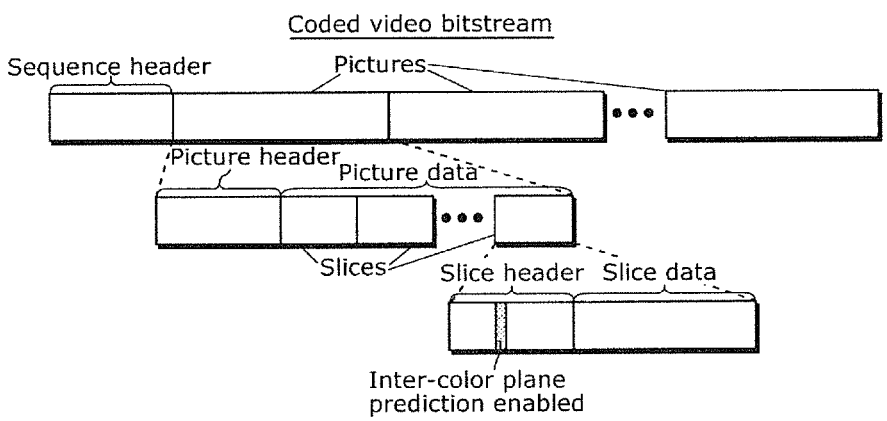
FIG. 25C is a diagram showing the location of the parameter indicating whether or not inter-color-plane prediction is enabled in a header of a coded video bitstream according to the fourth embodiment of the current invention.
Figure 25D:
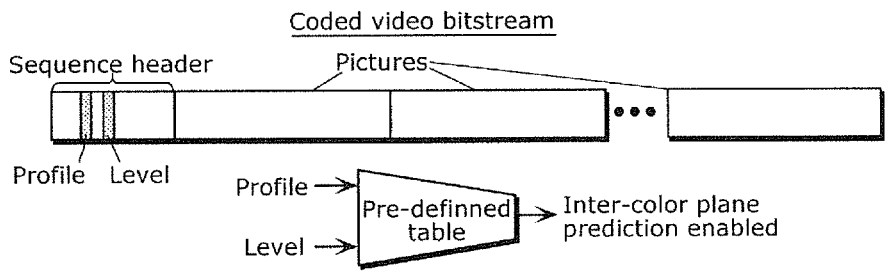
FIG. 25D is a diagram showing the location of the parameter indicating whether or not inter-color-plane prediction is enabled in a header of a coded video bitstream according to the fourth embodiment of the current invention.

FIG. 21 shows a block diagram showing an example apparatus of a video decoder utilizing inter-color-plane prediction scheme according to the current invention. It consists of an entropy decoding unit 2100, an inverse quantization unit 2102, an inverse transform unit 2104, a motion compensation unit 2106, an intra prediction unit 2108, a switch unit 2110, a summing unit 2112, a filter unit 2114, an intra prediction memory unit 2116, and a picture memory unit 2118.

As shown in the diagram, the entropy decoding unit 2100 decodes residual data D2103 from the coded video bitstream D2101. The residual data is inverse quantized and inverse transformed by the inverse quantization unit 2102 and the inverse transform unit 2104, resulting in the residual samples D2111.

The motion compensation unit 2106 takes a set of decoded motion vectors D2107 and reference pictures D2127 and produces the inter prediction samples D2115. The intra prediction unit takes the decoded intra prediction information D2109 and the prior reconstructed samples D2123 of the current image, then produces the intra prediction samples D2117. The decoded intra prediction information D2109 comprises the inter-color-plane prediction control parameters. The switch unit takes the decoded intra/inter prediction mode to channel either the inter prediction samples D2115 or intra prediction samples D2117 as the prediction samples D2119.

The summing unit 2112 adds the prediction samples D2119 and the residual samples D2113 to produce the reconstructed samples D2121. The reconstructed samples D2121 of the current image are stored in the intra prediction memory unit 2116 to be used for the decoding process of subsequent blocks of image samples within a current image. The reconstructed samples D2121 are filtered by the filter unit 2114 and the filtered samples D2125 are stored into the picture memory unit 2118.

The effects of the first embodiment of the current invention take place in the intra prediction unit 2004 of the video encoder and the intra prediction unit 2108 of the video decoder. According to the first embodiment of the current invention, the inter-color-plane prediction control parameters (D1901 in encoder and D2109 in decoder) comprise a parameter indicating color plane format. The color plane format is used in the intra prediction units for selecting one out a plurality of predetermined rescaling schemes to be performed during the inter-color-plane prediction process.

FIG. 22 shows a diagram showing the location of the parameter indicating color plane format in a header of a coded video bitstream. FIG. 22A shows the location of said parameter in a sequence header of a compressed video bitstream. FIG. 22B shows the location of said parameter in a picture header of a compressed video bitstream. FIG. 22C shows the location of said parameter in a slice header of a compressed video bitstream. FIG. 22D shows that said parameter can also be derived from a pre-defined look-up table based on the profile parameter, the level parameter, or both profile and level parameters located in a sequence header of a compressed video bitstream. In the prior art, an example of the parameter indicating color plane format is the syntax element chroma_format_idc in sequence parameter set of MPEG-4 AVC/H.264 video coding scheme specification. In the prior art, the parameter indicating color plane format is not used for controlling inter-color-plane prediction process.

Embodiment 2

Figure 8:
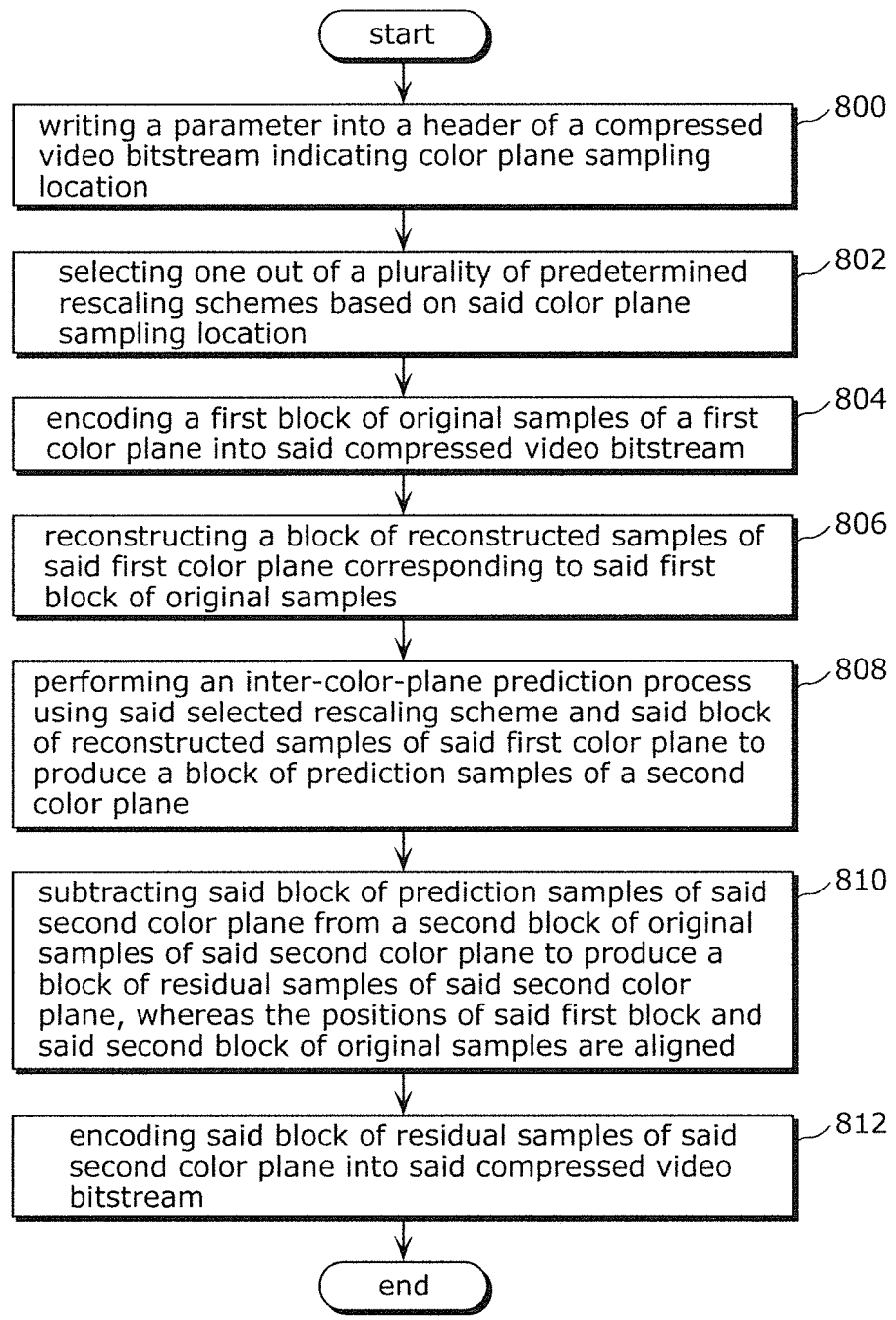
FIG. 8 is a flowchart showing a video encoding process utilizing inter-color-plane prediction scheme according to the second embodiment of the current invention.

FIG. 8 shows a flowchart showing a video encoding process utilizing inter-color-plane prediction scheme according to the second embodiment of the current invention. First, module 800 writes a parameter into a header of a compressed video bitstream indicating color plane sampling location. Module 802 then selects one out of a plurality of predetermined rescaling schemes based on said color plane sampling location. Next, module 804 encodes a first block of original samples of a first color plane into said compressed video bitstream. Next in module 806, a block of reconstructed samples of said first color plane corresponding to said first block of original samples is reconstructed. Module 808 then uses said selected rescaling schemes and said block of reconstructed samples of said first color plane to perform an inter-color-plane prediction process. Upon performing said inter-color-prediction process, module 808 produces a block of prediction samples of a second color plane. Next, module 810 subtracts said block of prediction samples of said second color plane from a second block of original samples of said second color plane to produce a block of residual samples of said second color plane. In this encoding process, the positions of said first block and said second block of original samples are aligned. Finally, module 812 encodes said block of residual samples of said second color plane into said compressed video bitstream.

Figure 9:
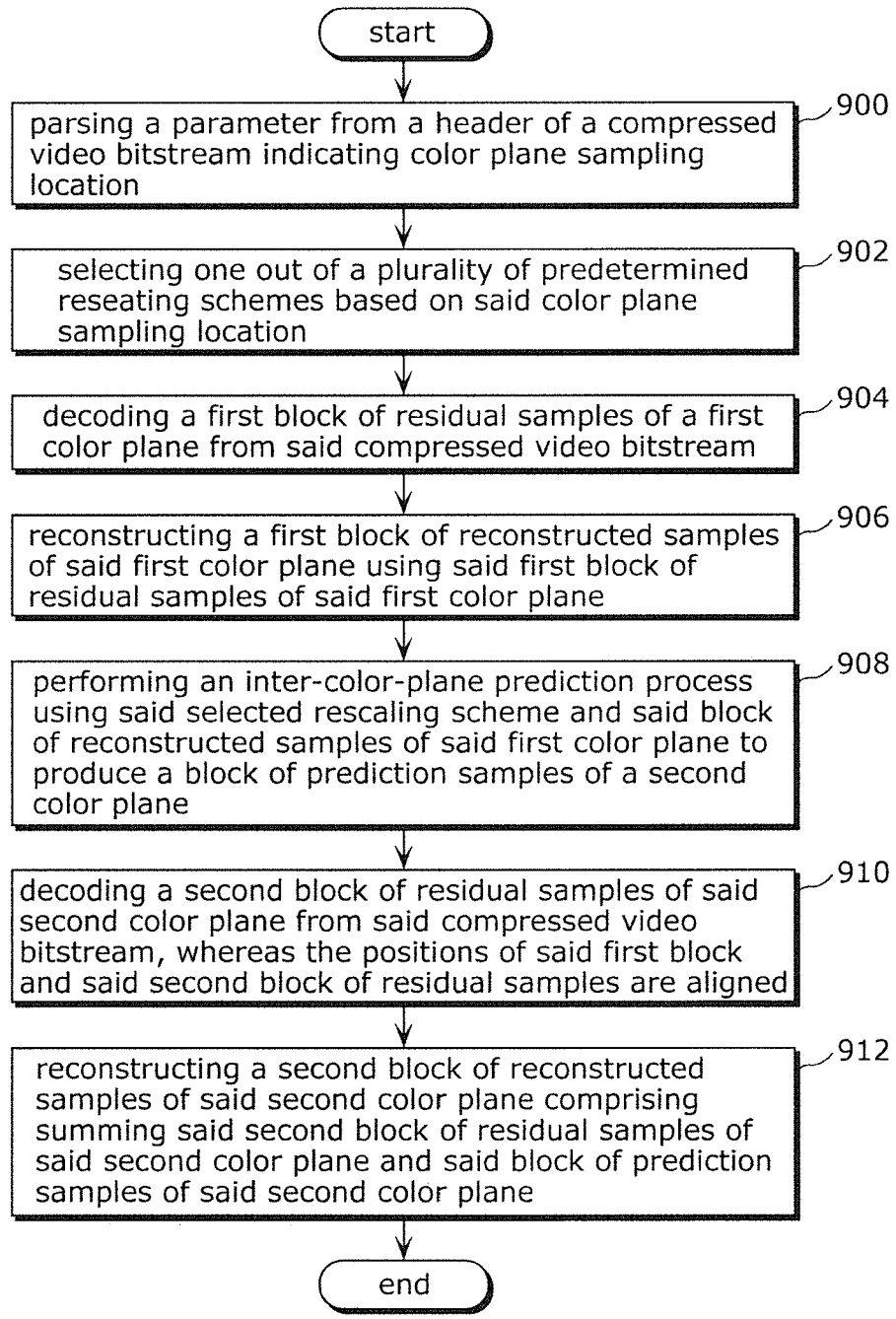
FIG. 9 is a flowchart showing a video decoding process utilizing inter-color-plane prediction scheme according to the second embodiment of the current invention.

FIG. 9 shows a flowchart showing a video decoding process utilizing inter-color-plane prediction scheme according to the second embodiment of the current invention. First, module 900 parses a parameter from a header of a compressed video bitstream indicating color plane sampling location. Module 902 then selects one out of a plurality of predetermined rescaling schemes based on said color plane sampling location. Next, module 904 decodes a first block of residual samples of a first color plane from said compressed video bitstream. Next in module 906, a first block of reconstructed samples of said first color plane corresponding to said first block of original samples is reconstructed. Module 908 then uses said selected rescaling schemes and said first block of reconstructed samples of said first color plane to perform an inter-color-plane prediction process, producing a block of prediction samples of a second color plane. Next, module 910 decodes a second block of residual samples of said second color plane from said compressed video bitstream. In this decoding process, the positions of said first block and said second block of residual samples are aligned. Finally, module 912 performs a reconstruction process to produce a second block of reconstructed samples of said second color plane, comprising summing said second block of residual samples of said second color plane and said block of prediction samples of said second color plane.

Both the encoding process (FIG. 8) and the decoding process (FIG. 9) perform the inter-color prediction process as described above in FIG. 7 in exactly the same manner.

FIG. 20 shows a block diagram showing an example apparatus of a video encoder utilizing inter-color-plane prediction scheme according to the current invention. FIG. 21 shows a block diagram showing an example apparatus of a video decoder utilizing inter-color-plane prediction scheme according to the current invention. The effects of the second embodiment of the current invention take place in the intra prediction unit 2004 of the video encoder and the intra prediction unit 2108 of the video decoder. According to the second embodiment of the current invention, the inter-color-plane prediction control parameters (D2001 in encoder and D2109 in decoder) comprise a parameter indicating color plane sampling location. The color plane sampling location is used in the intra prediction units for selecting one out a plurality of predetermined rescaling schemes to be performed during the inter-color-plane prediction process.

FIG. 23 shows a diagram showing the location of the parameter indicating color plane sampling location in a header of a coded video bitstream. FIG. 23A shows the location of said parameter in a sequence header of a compressed video bitstream. FIG. 23B shows the location of said parameter in a picture header of a compressed video bitstream. FIG. 23C shows the location of said parameter in a slice header of a compressed video bitstream. FIG. 23D shows that said parameter can also be derived from a pre-defined look-up table based on the profile parameter, the level parameter, or both profile and level parameters located in a sequence header of a compressed video bitstream. In the prior art, examples of the parameters indicating color plane sampling location are the syntax elements chroma_sample_loc_type_top_field and chroma_sample_loc_type_bottom_field in the video usability information (VUI) section of the sequence parameter set of MPEG-4 AVC/H.264 video coding scheme specification. In the prior art, the parameter indicating color plane sampling location is not used for controlling inter-color-plane prediction process.

Embodiment 3

Figure 10:
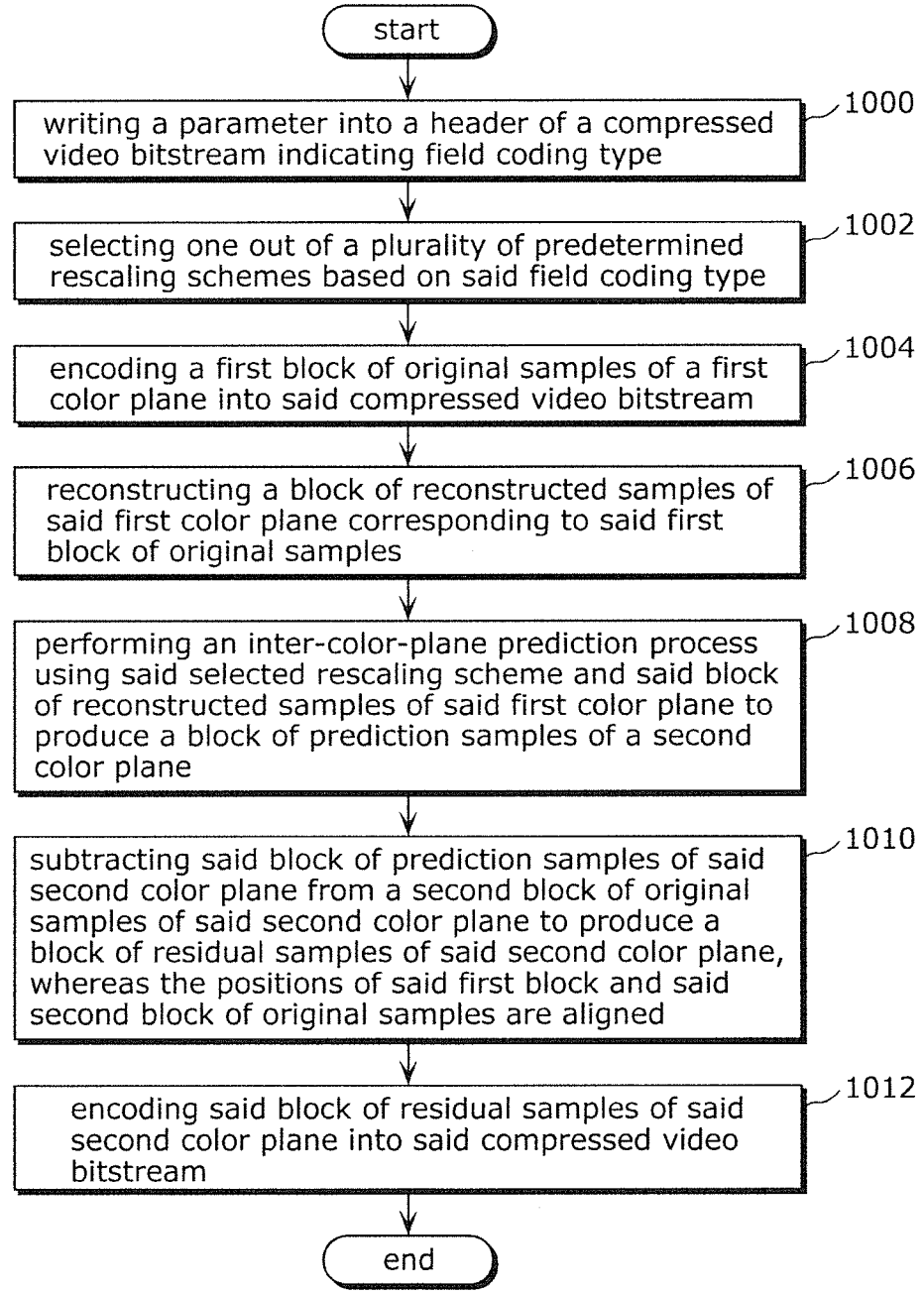
FIG. 10 is a flowchart showing a video encoding process utilizing inter-color-plane prediction scheme according to the third embodiment of the current invention.

FIG. 10 shows a flowchart showing a video encoding process utilizing inter-color-plane prediction scheme according to the third embodiment of the current invention. First, module 1000 writes a parameter into a header of a compressed video bitstream indicating field coding type. Module 1002 then selects one out of a plurality of predetermined rescaling schemes based on said field coding type. Next, module 1004 encodes a first block of original samples of a first color plane into said compressed video bitstream. Next in module 1006, a block of reconstructed samples of said first color plane corresponding to said first block of original samples is reconstructed. Module 1008 then uses said selected rescaling schemes and said block of reconstructed samples of said first color plane to perform an inter-color-plane prediction process. Upon performing said inter-color-prediction process, module 1008 produces a block of prediction samples of a second color plane. Next, module 1010 subtracts said block of prediction samples of said second color plane from a second block of original samples of said second color plane to produce a block of residual samples of said second color plane. In this encoding process, the positions of said first block and said second block of original samples are aligned. Finally, module 1012 encodes said block of residual samples of said second color plane into said compressed video bitstream.

Figure 11:
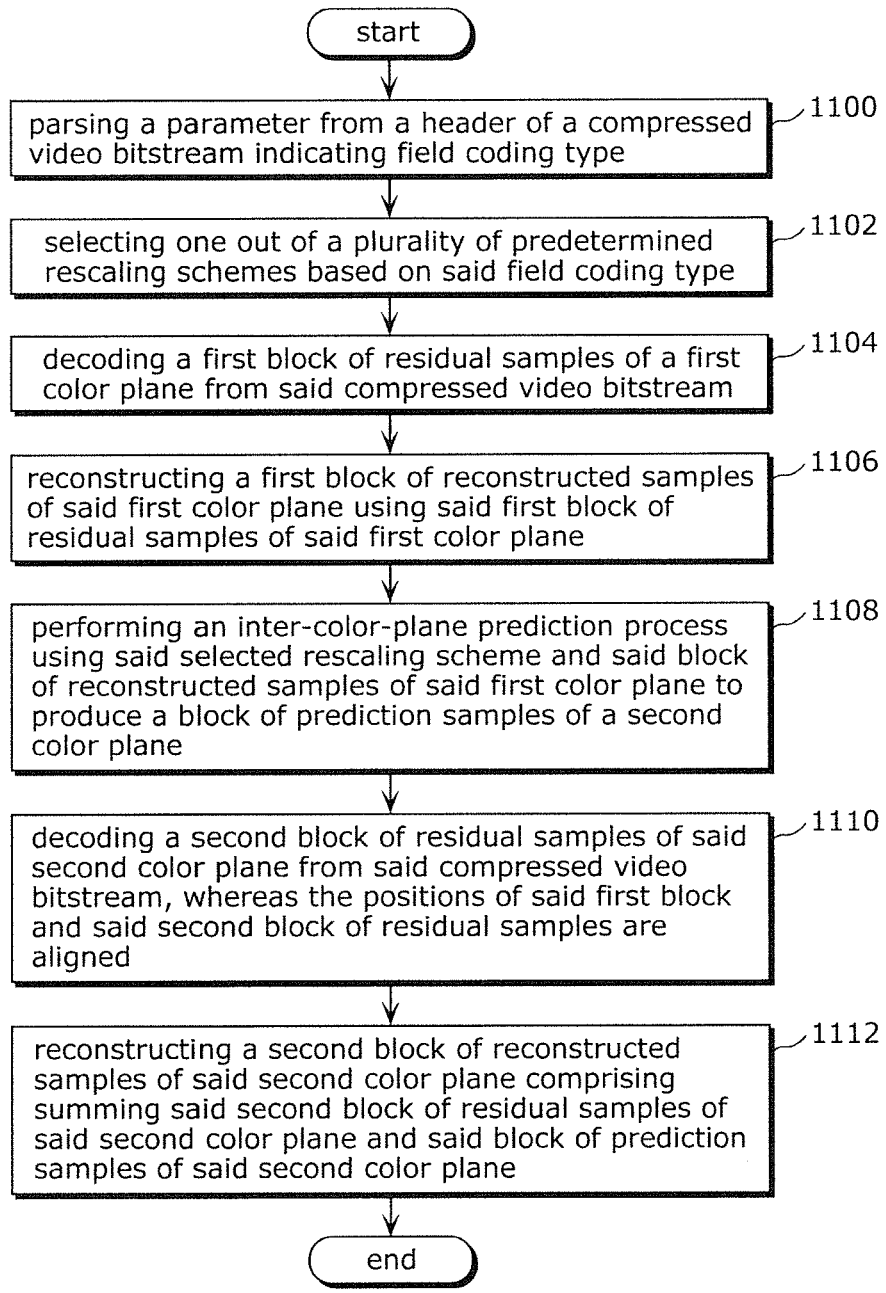
FIG. 11 is a flowchart showing a video decoding process utilizing inter-color-plane prediction scheme according to the third embodiment of the current invention.

FIG. 11 shows a flowchart showing a video decoding process utilizing inter-color-plane prediction scheme according to the second embodiment of the current invention. First, module 1100 parses a parameter from a header of a compressed video bitstream indicating field coding type. Module 1102 then selects one out of a plurality of predetermined rescaling schemes based on said field coding type. Next, module 1104 decodes a first block of residual samples of a first color plane from said compressed video bitstream. Next in module 1106, a first block of reconstructed samples of said first color plane corresponding to said first block of original samples is reconstructed. Module 1108 then uses said selected rescaling schemes and said first block of reconstructed samples of said first color plane to perform an inter-color-plane prediction process, producing a block of prediction samples of a second color plane. Next, module 1110 decodes a second block of residual samples of said second color plane from said compressed video bitstream. In this decoding process, the positions of said first block and said second block of residual samples are aligned. Finally, module 1112 performs a reconstruction process to produce a second block of reconstructed samples of said second color plane, comprising summing said second block of residual samples of said second color plane and said block of prediction samples of said second color plane.

Both the encoding process (FIG. 10) and the decoding process (FIG. 11) perform the inter-color prediction process as described above in FIG. 7 in exactly the same manner.

FIG. 20 shows a block diagram showing an example apparatus of a video encoder utilizing inter-color-plane prediction scheme according to the current invention. FIG. 21 shows a block diagram showing an example apparatus of a video decoder utilizing inter-color-plane prediction scheme according to the current invention. The effects of the third embodiment of the current invention take place in the intra prediction unit 2004 of the video encoder and the intra prediction unit 2108 of the video decoder. According to the third embodiment of the current invention, the inter-color-plane prediction control parameters (D2001 in encoder and D2109 in decoder) comprise a parameter indicating field coding type. The field coding type is used in the intra prediction units for selecting one out a plurality of predetermined rescaling schemes to be performed during the inter-color-plane prediction process.

FIG. 24 shows a diagram showing the location of the parameter indicating field coding type in a header of a coded video bitstream. FIG. 24A shows the location of said parameter in a sequence header of a compressed video bitstream. FIG. 24B shows the location of said parameter in a picture header of a compressed video bitstream. FIG. 24C shows the location of said parameter in a slice header of a compressed video bitstream. FIG. 24D shows that said parameter can also be derived from a pre-defined look-up table based on the profile parameter, the level parameter, or both profile and level parameters located in a sequence header of a compressed video bitstream. In the prior art, an example of the parameter indicating field coding type is the syntax element field_pic_flag in the slice header of MPEG-4 AVC/H.264 video coding scheme specification. In the prior art, the parameter indicating field coding type is not used for controlling inter-color-plane prediction process.

As indicated above, combinations of two or more embodiments of the current invention can be carried out. In particular, combinations among first, second and third embodiments can be utilized to enable the adaptability of inter-color-plane prediction to various image/video content representations.

Embodiment 4

Figure 12:
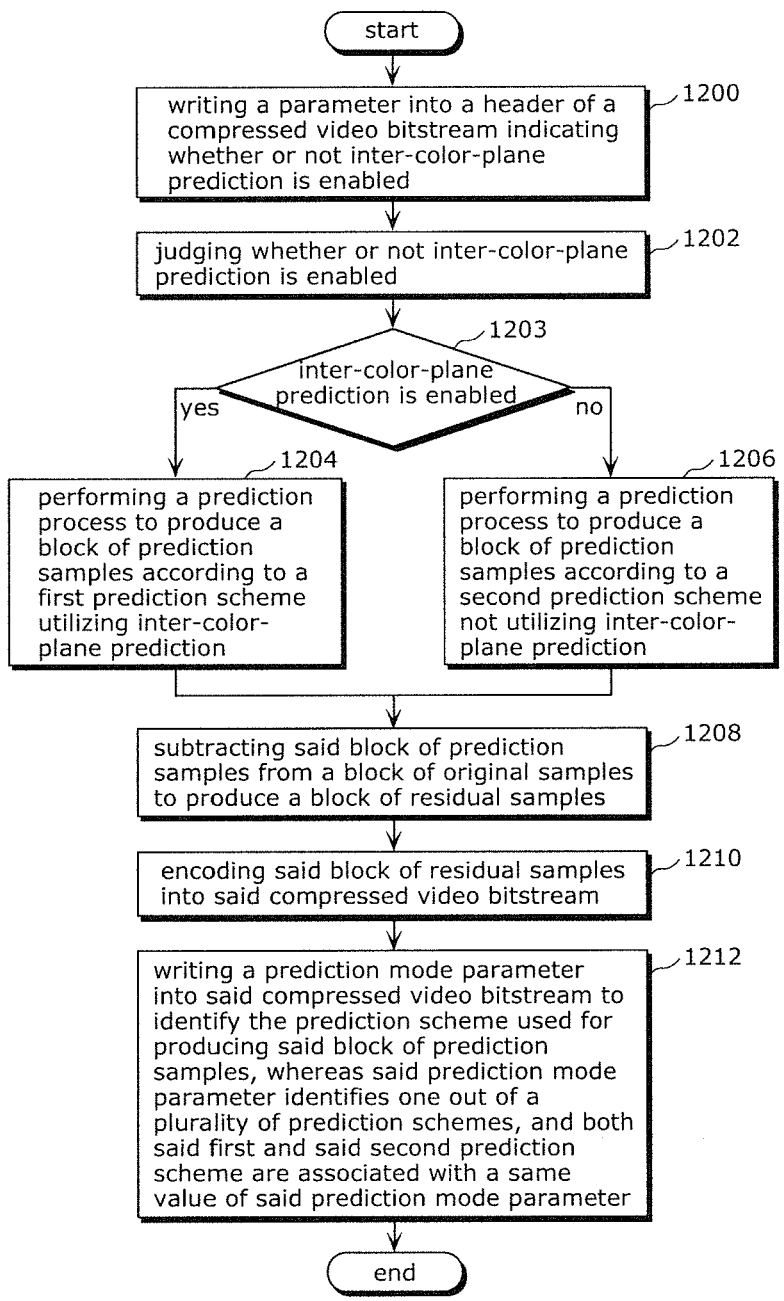
FIG. 12 is a flowchart showing a video encoding process utilizing inter-color-plane prediction scheme according to the fourth embodiment of the current invention.

FIG. 12 shows a flowchart showing a video encoding process utilizing inter-color-plane prediction scheme according to the fourth embodiment of the current invention. First, module 1200 writes a parameter into a header of a compressed video bitstream indicating whether or not inter-color-plane prediction is enabled. In one embodiment of the current invention, the parameter indicating whether or not inter-color-plane prediction is enabled is a flag. In another embodiment of the current invention, the parameter indicating whether or not inter-color-prediction is enabled is inferred from a parameter having another primary purpose not directly related to inter-color-plane prediction (for example, a parameter indicating field coding type). In yet another embodiment of the current invention, the parameter indicating whether or not inter-color-prediction is enabled is inferred from a combination of a plurality of parameters having another primary purposes not directly related to inter-color-plane prediction (for example, parameters indicating field coding type and intra/inter picture type).

Module 1202 then judges whether or not inter-color-plane prediction is enabled. When inter-color-plane prediction is enabled, module 1204 performs a prediction process to produce a block of prediction samples according to a first prediction scheme utilizing inter-color-plane prediction. When inter-color-plane prediction is not enabled, module 1206 performs a prediction process to produce a block of prediction samples according to a second prediction scheme not utilizing inter-color-plane prediction.

Next, whether or not inter-color-prediction is enabled, module 1208 subtracts said block of prediction samples from a block of original samples to produce a block of residual samples. Then, module 1210 encodes said block of residual samples into said compressed video bitstream. Finally, module 1212 writes a prediction mode parameter into said compressed video bitstream to identify the prediction scheme used for producing said block of prediction samples. Said prediction mode parameter identifies one out of a plurality of prediction schemes. Both said first and said second prediction scheme are associated with a same value of said prediction mode parameter, for example an index value of 0.

Figure 13:
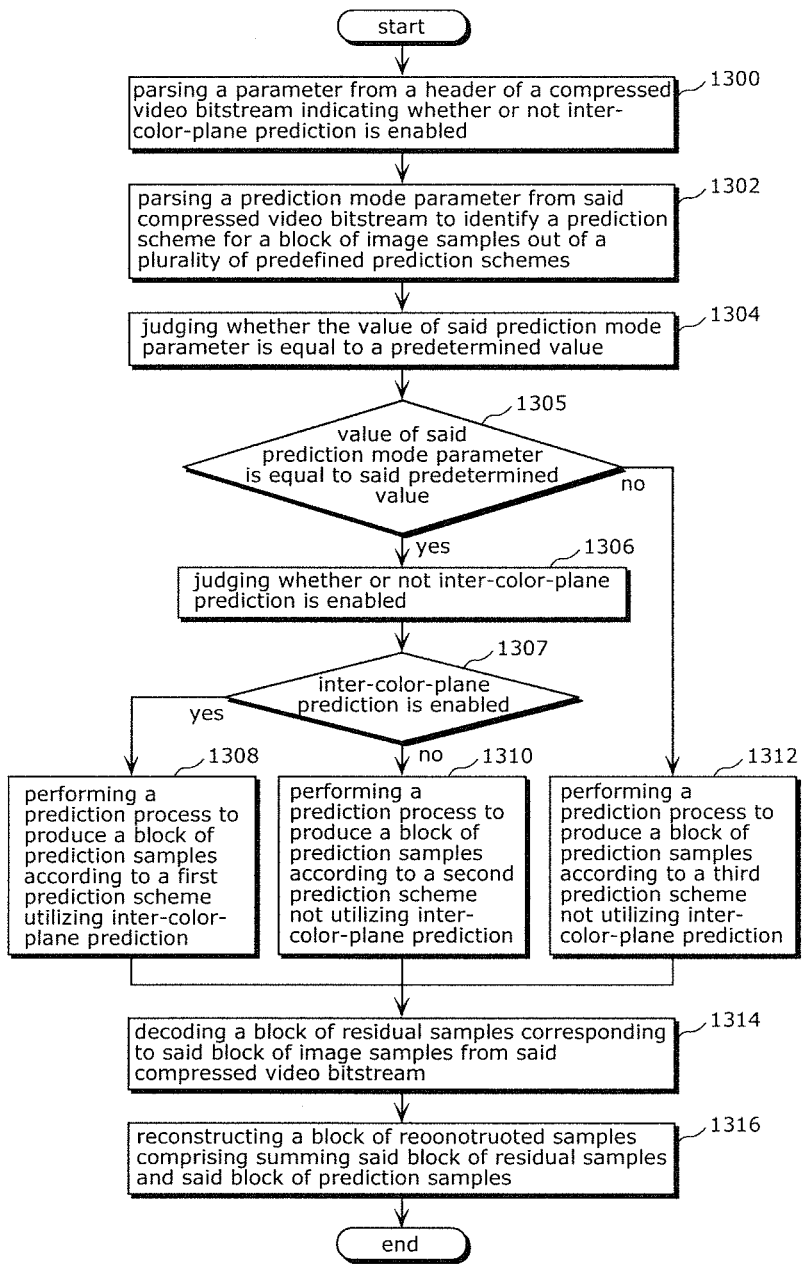
FIG. 13 is a flowchart showing a video decoding process utilizing inter-color-plane prediction scheme according to the fourth embodiment of the current invention.

FIG. 13 shows a flowchart showing a video decoding process utilizing inter-color-plane prediction scheme according to the fourth embodiment of the current invention. First, module 1300 parses a parameter from a header of a compressed video bitstream indicating whether or not inter-color-plane prediction is enabled. Next, module 1302 parses a prediction mode parameter from said compressed video bitstream to identify a prediction scheme for a block of image samples out of a plurality of predefined prediction schemes. Module 1304 then judges whether the value of said prediction mode parameter is equal to a predetermined value. An example of the predetermined value is the value 0.

When the value of said prediction mode parameter is equal to said predetermined value, module 1306 then judges whether or not inter-color-plane prediction is enabled.

When inter-color-plane prediction is enabled, module 1308 performs a prediction process to produce a block of prediction samples according to a first prediction scheme utilizing inter-color-plane prediction. When inter-color-plane prediction is not enabled, module 1310 performs a prediction process to produce a block of prediction samples according to a second prediction scheme not utilizing inter-color-plane prediction.

When the value of said prediction mode parameter is not equal to said predetermined value, module 1312 performs a prediction process to produce a block of prediction samples according to a third prediction scheme not utilizing inter-color-plane prediction.

Next, whether or not inter-color-prediction is enabled and whether or not the value of said prediction mode parameter is equal to said predetermined value, module 1314 decodes a block of residual samples corresponding to said block of image samples from said compressed video bitstream. Module 1316 then reconstructs a block of reconstructed samples comprising summing said block of residual samples and said block of prediction samples.

Both the encoding process (FIG. 12) and the decoding process (FIG. 13) perform the prediction process in exactly the same manner. The first prediction scheme utilizing inter-color-plane prediction comprises the steps as described above in FIG. 7.

FIG. 20 shows a block diagram showing an example apparatus of a video encoder utilizing inter-color-plane prediction scheme according to the current invention. FIG. 21 shows a block diagram showing an example apparatus of a video decoder utilizing inter-color-plane prediction scheme according to the current invention. The effects of the fourth embodiment of the current invention take place in the intra prediction unit 2004 of the video encoder and the intra prediction unit 2108 of the video decoder. According to the fourth embodiment of the current invention, the inter-color-plane prediction control parameters (D2001 in encoder and D2109 in decoder) comprise a parameter indicating whether or not inter-color-plane prediction is enabled.

FIG. 25 shows a diagram showing the location of the parameter indicating whether or not inter-color-plane prediction is enabled in a header of a coded video bitstream. FIG. 25A shows the location of said parameter in a sequence header of a compressed video bitstream. FIG. 25B shows the location of said parameter in a picture header of a compressed video bitstream. FIG. 25C shows the location of said parameter in a slice header of a compressed video bitstream. FIG. 25D shows that said parameter can also be derived from a pre-defined look-up table based on the profile parameter, the level parameter, or both profile and level parameters located in a sequence header of a compressed video bitstream.

Figure 26A:
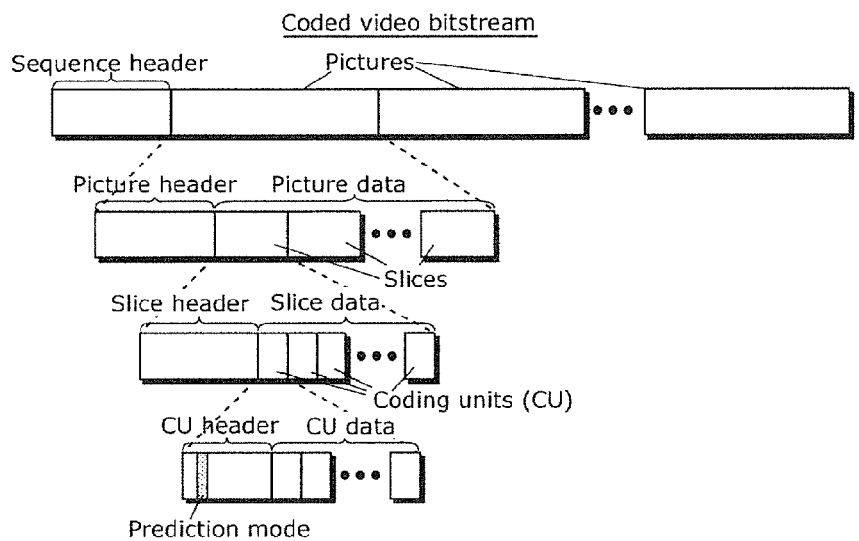
FIG. 26A is a diagram showing the location of the parameter indicating prediction mode in a coded video bitstream according to the fourth embodiment of the current invention.

FIG. 26 shows a diagram showing the location of the parameter in a coded video bitstream indicating prediction mode for a block of image samples or a set of aligned blocks of image samples representing the color planes of a video/image content representation. FIG. 26A shows the location of said parameter in a header of a coding unit.

Figure 26B:
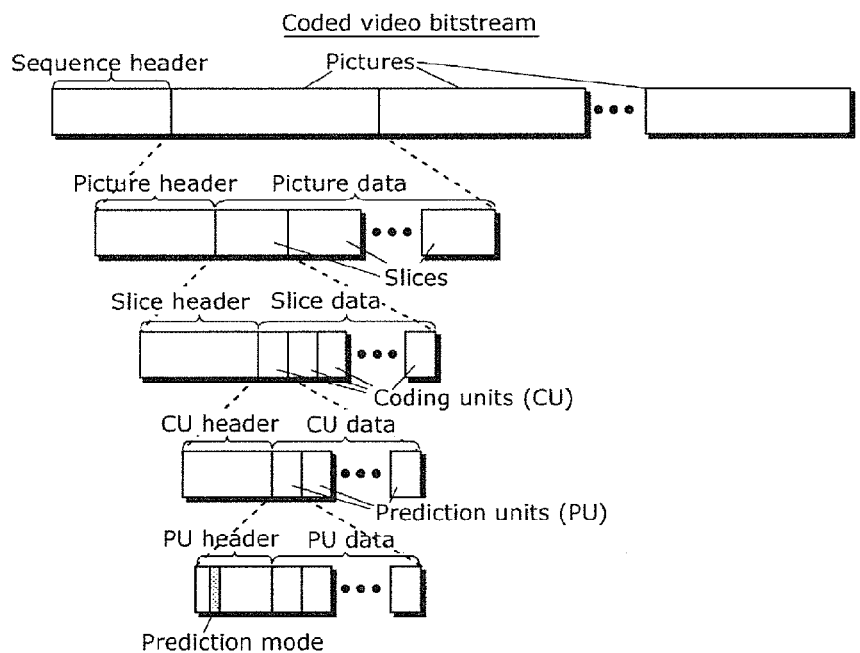
FIG. 26B is a diagram showing the location of the parameter indicating prediction mode in a coded video bitstream according to the fourth embodiment of the current invention.
Figure 27A:
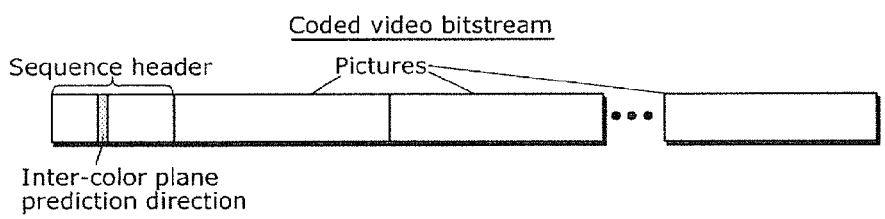
FIG. 27A is a diagram showing the location of the parameter indicating inter-color-plane prediction direction in a header of a coded video bitstream according to the fifth embodiment of the current invention.
Figure 27B:
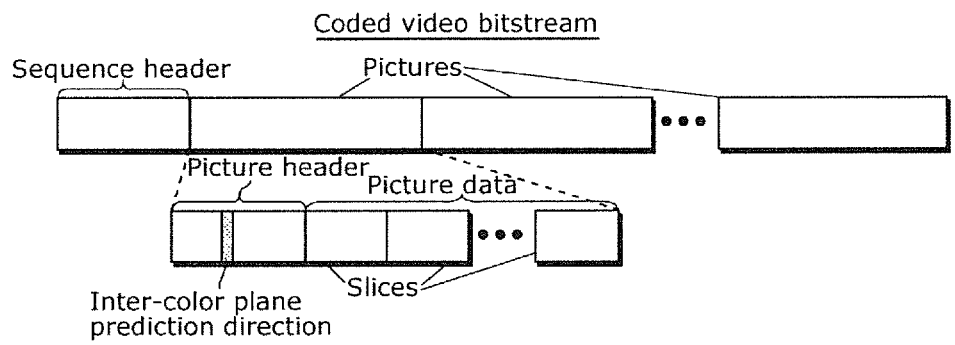
FIG. 27B is a diagram showing the location of the parameter indicating inter-color-plane prediction direction in a header of a coded video bitstream according to the fifth embodiment of the current invention.
Figure 27C:
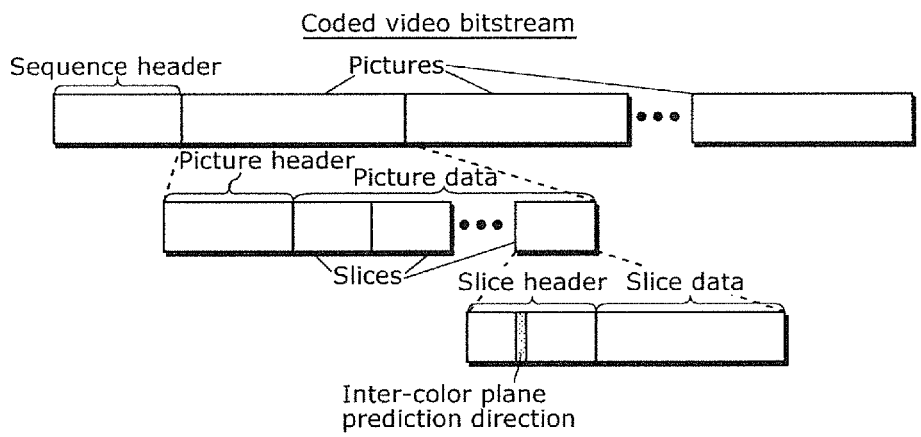
FIG. 27C is a diagram showing the location of the parameter indicating inter-color-plane prediction direction in a header of a coded video bitstream according to the fifth embodiment of the current invention.
Figure 27D:
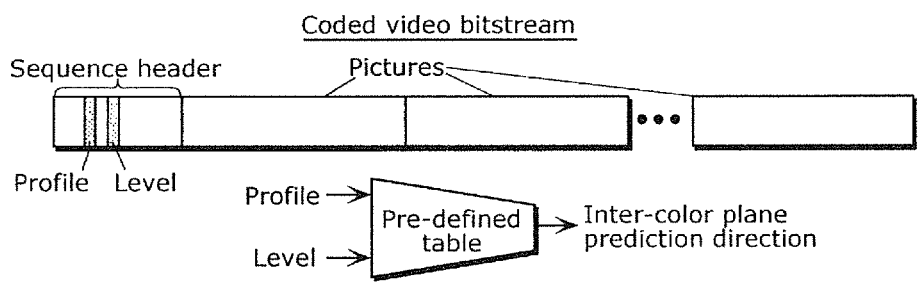
FIG. 27D is a diagram showing the location of the parameter indicating inter-color-plane prediction direction in a header of a coded video bitstream according to the fifth embodiment of the current invention.
Figure 28A:
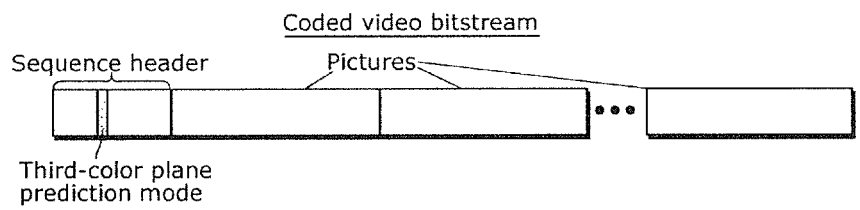
FIG. 28A is a diagram showing the location of the parameter indicating third-color-plane prediction mode in a header of a coded video bitstream according to the seventh embodiment of the current invention.
Figure 28B:
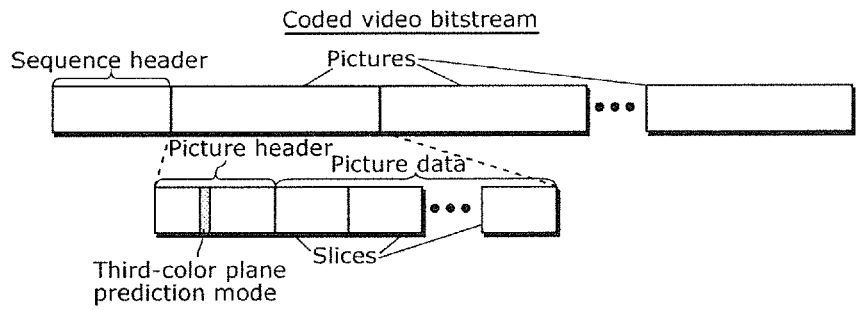
FIG. 28B is a diagram showing the location of the parameter indicating third-color-plane prediction mode in a header of a coded video bitstream according to the seventh embodiment of the current invention.
Figure 28C:
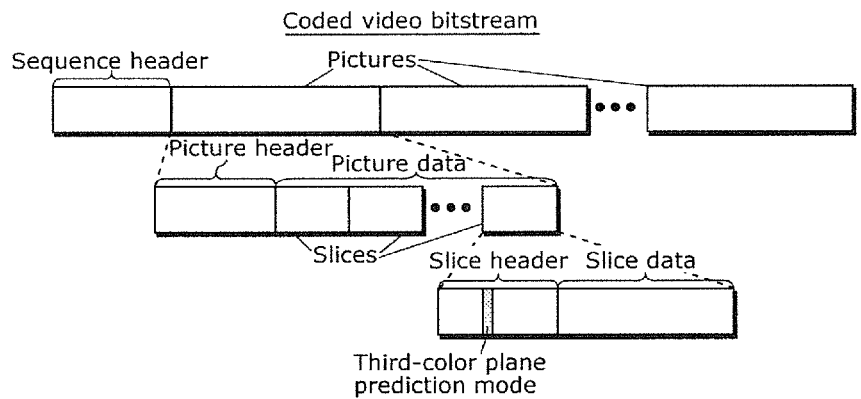
FIG. 28C is a diagram showing the location of the parameter indicating third-color-plane prediction mode in a header of a coded video bitstream according to the seventh embodiment of the current invention.
Figure 28D:
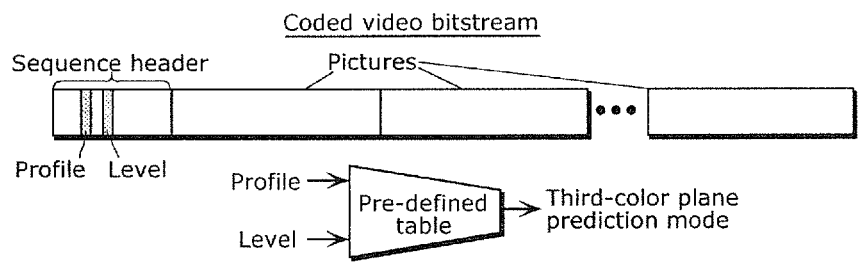
FIG. 28D is a diagram showing the location of the parameter indicating third-color-plane prediction mode in a header of a coded video bitstream according to the seventh embodiment of the current invention.

FIG. 26B shows the location of said parameter in a header of a prediction unit.

Embodiment 5

Figure 14:
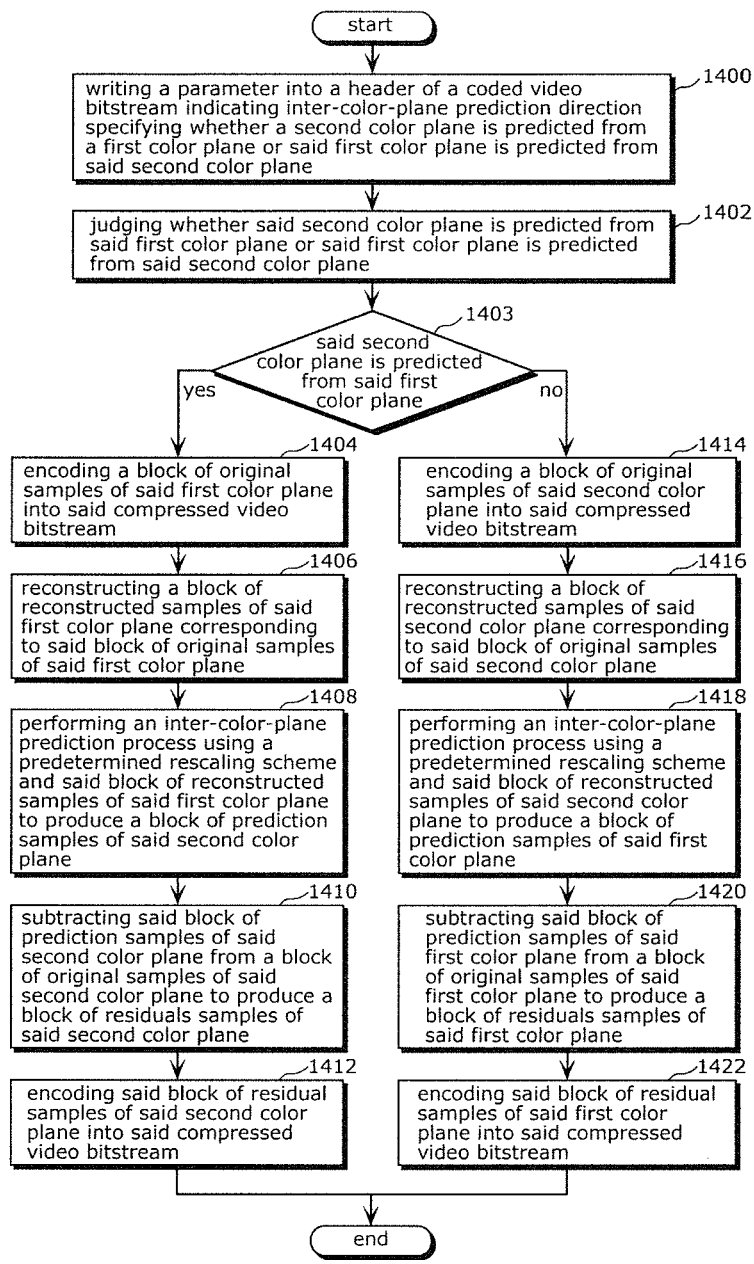
FIG. 14 is a flowchart showing a video encoding process utilizing inter-color-plane prediction scheme according to the fifth embodiment of the current invention.

FIG. 14 shows a flowchart showing a video encoding process utilizing inter-color-plane prediction scheme according to the fifth embodiment of the current invention. First, module 1400 writes a parameter into a header of a coded video bitstream indicating inter-color-plane prediction direction. Inter-color-plane prediction direction specifies whether a second color plane is predicted from a first color plane or said first color plane is predicted from said second color plane. Module 1402 then judges whether said second color plane is predicted from said first color plane or said first color plane is predicted from said second color plane.

When said second color plane is predicted from said first color plane, module 1404 encodes a block of original samples of said first color plane into said compressed video bitstream. Module 1406 reconstructs a block of reconstructed samples of said first color plane corresponding to said block of original samples of said first color plane. Next, module 1408 performs an inter-color-plane prediction process using a predetermined rescaling scheme and said block of reconstructed samples of said first color plane to produce a block of prediction samples of said second color plane. Module 1410 subtracts said block of prediction samples of said second color plane from a block of original samples of said second color plane to produce a block of residuals samples of said second color plane. Finally, module 1412 encodes said block of residual samples of said second color plane into said compressed video bitstream.

When said first color plane is predicted from said second color plane, module 1414 encodes a block of original samples of said second color plane into said compressed video bitstream. Module 1416 reconstructs a block of reconstructed samples of said second color plane corresponding to said block of original samples of said second color plane. Next, module 1418 performs an inter-color-plane prediction process using a predetermined rescaling scheme and said block of reconstructed samples of said second color plane to produce a block of prediction samples of said first color plane. Module 1420 subtracts said block of prediction samples of said first color plane from a block of original samples of said first color plane to produce a block of residual samples of said first color plane. Finally, module 1422 encodes said block of residual samples of said first color plane into said compressed video bitstream.

Figure 15:
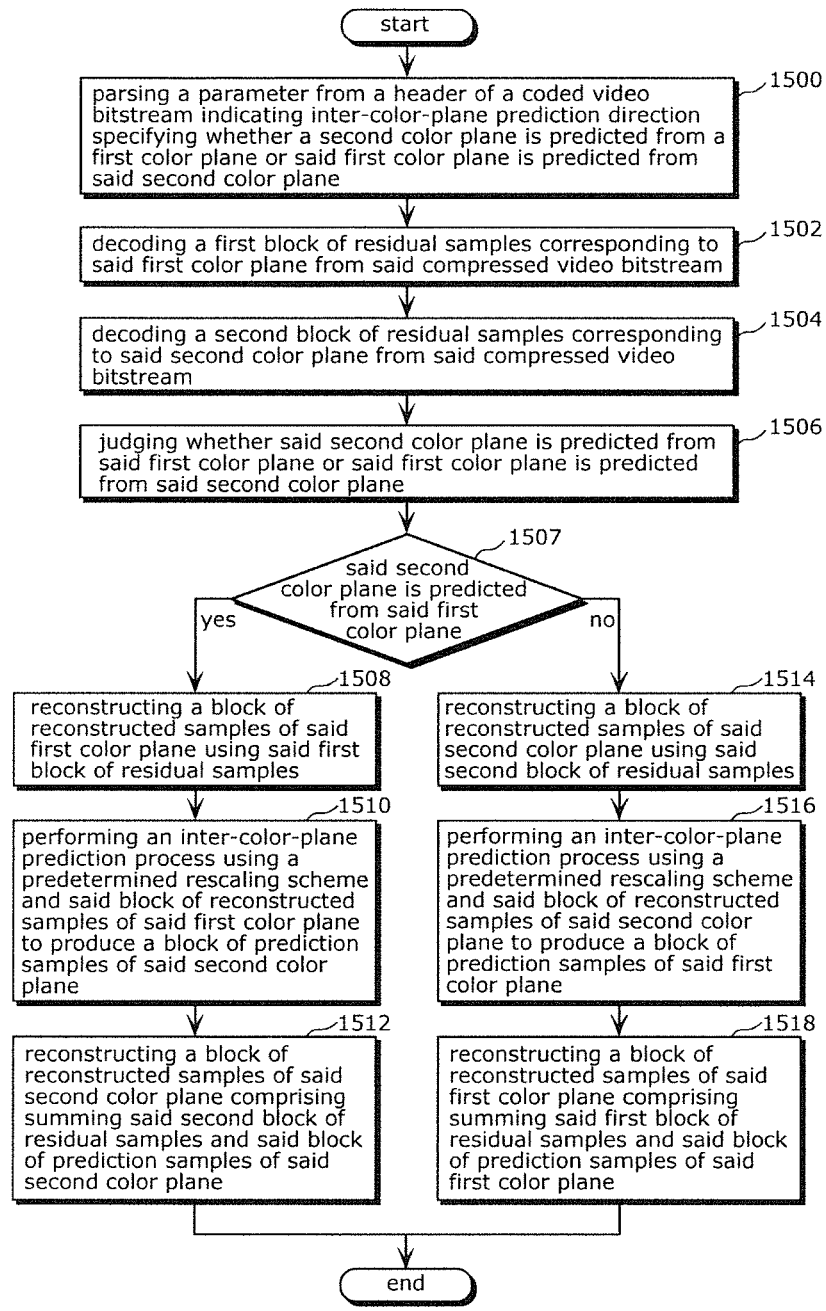
FIG. 15 is a flowchart showing a video decoding process utilizing inter-color-plane prediction scheme according to the fifth embodiment of the current invention.

FIG. 15 shows a flowchart showing a video decoding process utilizing inter-color-plane prediction scheme according to the fifth embodiment of the current invention. First, module 1500 parses a parameter from a header of a coded video bitstream indicating inter-color-plane prediction direction. Inter-color-plane prediction direction specifies whether a second color plane is predicted from a first color plane or said first color plane is predicted from said second color plane. Then, module 1502 decodes a first block of residual samples corresponding to said first color plane from said compressed video bitstream, and module 1504 decodes a second block of residual samples corresponding to said second color plane from said compressed video bitstream. Next, module 1506 judges whether said second color plane is predicted from said first color plane or said first color plane is predicted from said second color plane.

When said second color plane is predicted from said first color plane, module 1508 reconstructs a block of reconstructed samples of said first color plane using said first block of residual samples. Module 1510 then performs an inter-color-plane prediction process using a predetermined rescaling scheme and said block of reconstructed samples of said first color plane to produce a block of prediction samples of said second color plane. Finally, module 1512 reconstructs a block of reconstructed samples of said second color plane comprising summing said second block of residual samples and said block of prediction samples of said second color plane.

When said first color plane is predicted from said second color plane, module 1514 reconstructs a block of reconstructed samples of said second color plane using said second block of residual samples. Module 1516 then performs an inter-color-plane prediction process using a predetermined rescaling scheme and said block of reconstructed samples of said second color plane to produce a block of prediction samples of said first color plane. Finally, module 1518 reconstructs a block of reconstructed samples of said first color plane comprising summing said first block of residual samples and said block of prediction samples of said first color plane.

Both the encoding process (FIG. 14) and the decoding process (FIG. 15) perform the inter-color prediction process as described above in FIG. 7 in exactly the same manner.

FIG. 20 shows a block diagram showing an example apparatus of a video encoder utilizing inter-color-plane prediction scheme according to the current invention. FIG. 21 shows a block diagram showing an example apparatus of a video decoder utilizing inter-color-plane prediction scheme according to the current invention. The effects of the fifth embodiment of the current invention take place in the intra prediction unit 2004 of the video encoder and the intra prediction unit 2108 of the video decoder. According to the fifth embodiment of the current invention, the inter-color-plane prediction control parameters (D2001 in encoder and D2109 in decoder) comprise a parameter indicating inter-color-plane prediction direction.

FIG. 27 shows a diagram showing the location of the parameter indicating inter-color-plane prediction direction in a header of a coded video bitstream. FIG. 27A shows the location of said parameter in a sequence header of a compressed video bitstream. FIG. 27B shows the location of said parameter in a picture header of a compressed video bitstream. FIG. 27C shows the location of said parameter in a slice header of a compressed video bitstream. FIG. 27D shows that said parameter can also be derived from a predefined look-up table based on the profile parameter, the level parameter, or both profile and level parameters located in a sequence header of a compressed video bitstream.

Embodiment 6

Figure 16:
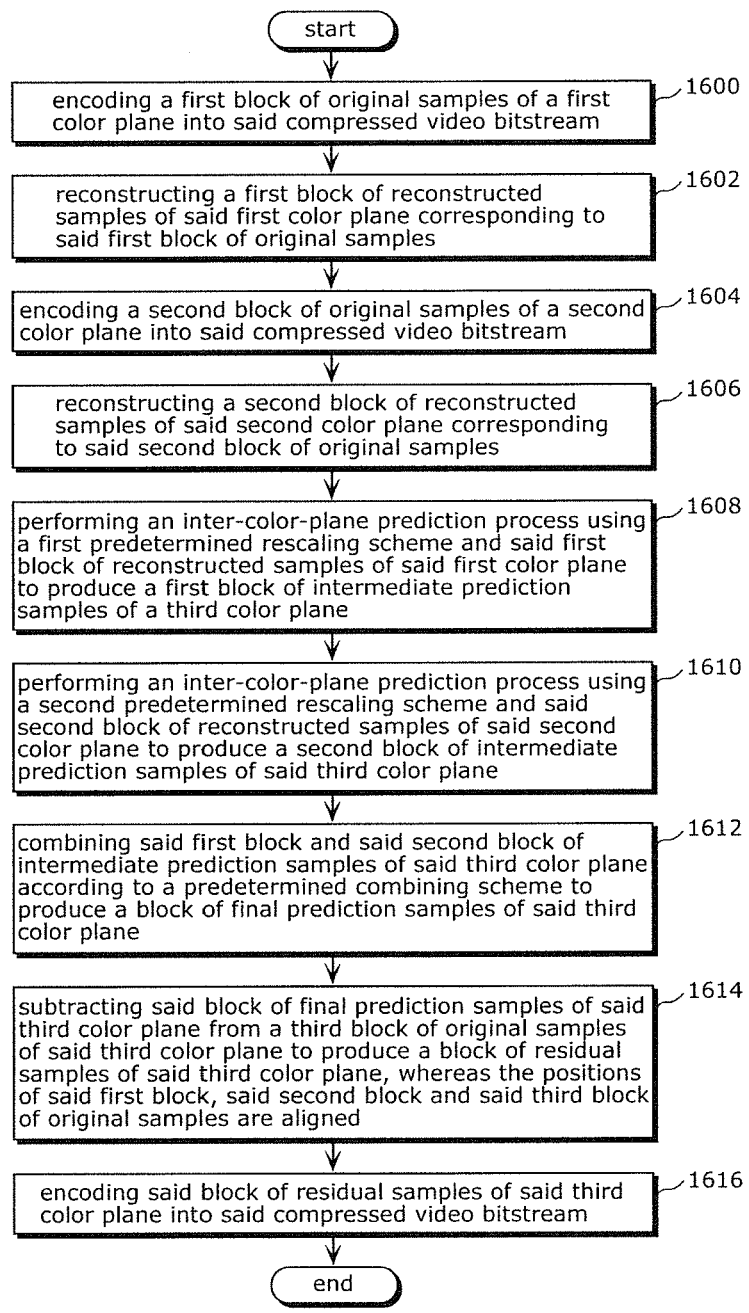
FIG. 16 is a flowchart showing a video encoding process utilizing inter-color-plane prediction scheme according to the sixth embodiment of the current invention.

FIG. 16 shows a flowchart showing a video encoding process utilizing inter-color-plane prediction scheme according to the sixth embodiment of the current invention. First, module 1600 encodes a first block of original samples of a first color plane into said compressed video bitstream. Module 1602 then reconstructs a first block of reconstructed samples of said first color plane corresponding to said first block of original samples. Next, module 1604 encodes a second block of original samples of a second color plane into said compressed video bitstream. Module 1606 then reconstructing a second block of reconstructed samples of said second color plane corresponding to said second block of original samples. Next, module 1608 performs an inter-color-plane prediction process using a first predetermined rescaling scheme and said first block of reconstructed samples of said first color plane to produce a first block of intermediate prediction samples of a third color plane. Module 1610 performs an inter-color-plane prediction process using a second predetermined rescaling scheme and said second block of reconstructed samples of said second color plane to produce a second block of intermediate prediction samples of said third color plane. Next, module 1612 combines said first block and said second block of intermediate prediction samples of said third color plane according to a predetermined combining scheme to produce a block of final prediction samples of said third color plane. In one embodiment of the current invention, the predetermined combining scheme is linear averaging between collocated sample values in said first and said second blocks of intermediate prediction samples. In another embodiment of the current invention, the predetermined combining scheme is weighted averaging between collocated values in said first and said second blocks of intermediate prediction samples. An example of weighted averaging is the operation p=a·p1+b·p2+c, where p is the resulting weighted average value, p1 and p2 are the input values, a and b are predetermined weights (scaling factors) assigned to p1 and p2 respectively, and c is a constant additive offset value.

Next, module 1614 then subtracts said block of final prediction samples of said third color plane from a third block of original samples of said third color plane to produce a block of residual samples of said third color plane. The positions of said first block, said second block and said third block of original samples are aligned. Finally, module 1616 encodes said block of residual samples of said third color plane into said compressed video bitstream.

Figure 17:
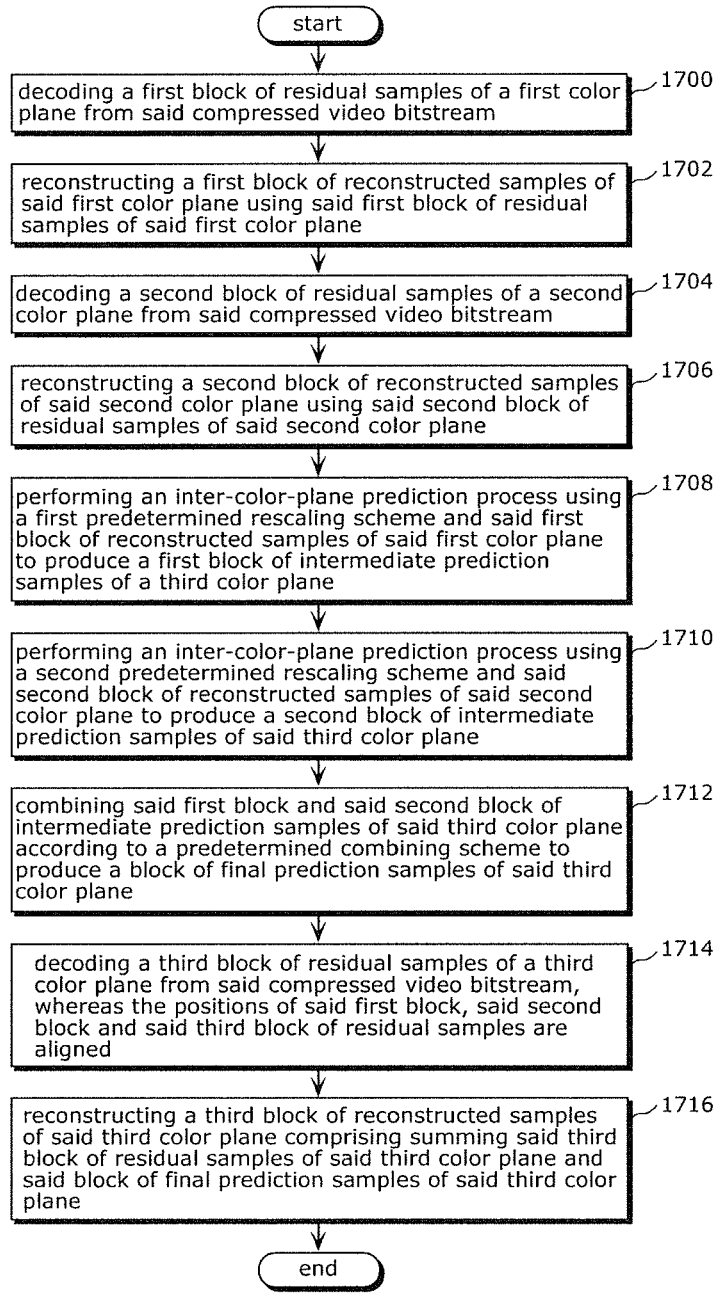
FIG. 17 is a flowchart showing a video decoding process utilizing inter-color-plane prediction scheme according to the sixth embodiment of the current invention.

FIG. 17 shows a flowchart showing a video decoding process utilizing inter-color-plane prediction scheme according to the sixth embodiment of the current invention. Module 1700 decodes a first block of residual samples of a first color plane from said compressed video bitstream. Module 1702 then reconstructs a first block of reconstructed samples of said first color plane using said first block of residual samples of said first color plane. Next, module 1704 decodes a second block of residual samples of a second color plane from said compressed video bitstream. Module 1706 then reconstructs a second block of reconstructed samples of said second color plane using said second block of residual samples of said second color plane. Next, module 1708 performs an inter-color-plane prediction process using a first predetermined rescaling scheme and said first block of reconstructed samples of said first color plane to produce a first block of intermediate prediction samples of a third color plane. Module 1710 performs an inter-color-plane prediction process using a second predetermined rescaling scheme and said second block of reconstructed samples of said second color plane to produce a second block of intermediate prediction samples of said third color plane. Module 1712 then combines said first block and said second block of intermediate prediction samples of said third color plane according to a predetermined combining scheme to produce a block of final prediction samples of said third color plane. Next, module 1714 decodes a third block of residual samples of a third color plane from said compressed video bitstream, whereas the positions of said first block, said second block and said third block of residual samples are aligned. Module 1716 reconstructs a third block of reconstructed samples of said third color plane comprising summing said third block of residual samples of said third color plane and said block of final prediction samples of said third color plane.

Both the encoding process (FIG. 16) and the decoding process (FIG. 17) perform the inter-color prediction process as described above in FIG. 7 in exactly the same manner and utilizes the same predetermined combining scheme as described above.

FIG. 20 shows a block diagram showing an example apparatus of a video encoder utilizing inter-color-plane prediction scheme according to the current invention. FIG. 21 shows a block diagram showing an example apparatus of a video decoder utilizing inter-color-plane prediction scheme according to the current invention. The effects of the sixth embodiment of the current invention take place in the intra prediction unit 2004 of the video encoder and the intra prediction unit 2108 of the video decoder. According to the sixth embodiment of the current invention, no inter-color-plane prediction control parameters are carried in the coded video bitstream (in other words, the data D2001 in encoder and D2109 in decoder is not present).

Embodiment 7

Figure 18:
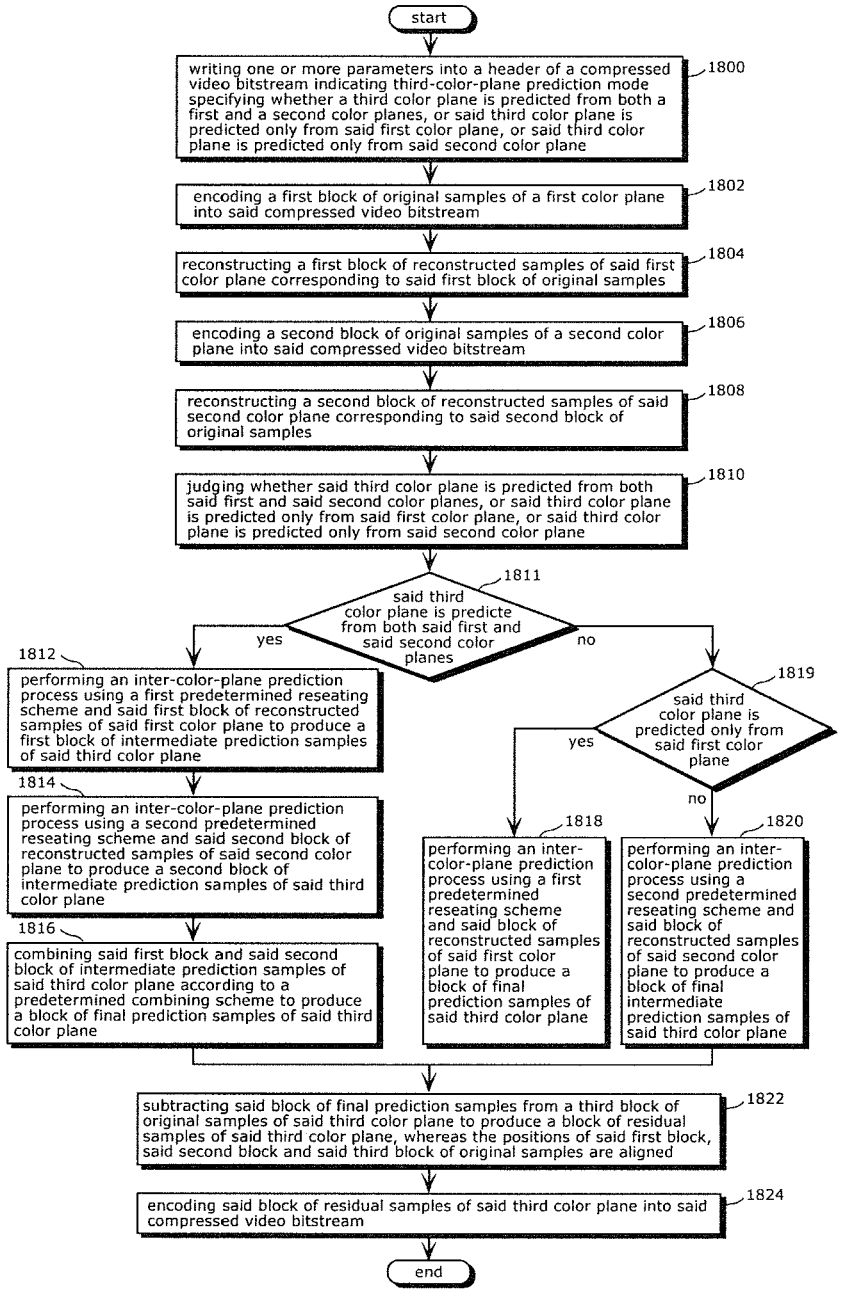
FIG. 18 is a flowchart showing a video encoding process utilizing inter-color-plane prediction scheme according to the seventh embodiment of the current invention.

FIG. 18 shows a flowchart showing a video encoding process utilizing inter-color-plane prediction scheme according to the seventh embodiment of the current invention. First, module 1800 writes one or more parameters into a header of a compressed video bitstream indicating third-color-plane prediction mode. Said third-color-plane prediction mode specifies whether a third color plane is predicted from both a first and a second color planes, or said third color plane is predicted only from said first color plane, or said third color plane is predicted only from said second color plane. Next, module 1802 encodes a first block of original samples of a first color plane into said compressed video bitstream. Module 1804 then reconstructs a first block of reconstructed samples of said first color plane corresponding to said first block of original samples. Next, module 1806 encodes a second block of original samples of a second color plane into said compressed video bitstream. Module 1808 then reconstructs a second block of reconstructed samples of said second color plane corresponding to said second block of original samples. Module 1810 judges whether said third color plane is predicted from both said first and said second color planes, or said third color plane is predicted only from said first color plane, or said third color plane is predicted only from said second color plane.

When said third color plane is predicted from both said first and said second color planes, module 1812 performs an inter-color-plane prediction process using a first predetermined rescaling scheme and said first block of reconstructed samples of said first color plane to produce a first block of intermediate prediction samples of said third color plane. Module 1814 performs an inter-color-plane prediction process using a second predetermined rescaling scheme and said second block of reconstructed samples of said second color plane to produce a second block of intermediate prediction samples of said third color plane. Next, module 1816 combines said first block and said second block of intermediate prediction samples of said third color plane according to a predetermined combining scheme to produce a block of final prediction samples of said third color plane.

When said third color plane is predicted only from said first color plane, module 1818 performs an inter-color-plane prediction process using a first predetermined rescaling scheme and said block of reconstructed samples of said first color plane to produce a block of final prediction samples of said third color plane.

When said third color plane is predicted only from said second color plane, module 1820 performs an inter-color-plane prediction process using a second predetermined rescaling scheme and said block of reconstructed samples of said second color plane to produce a block of final intermediate prediction samples of said third color plane.

Subsequently after said block of final intermediate prediction samples of said third color plane is produced, module 1822 subtracts said block of final prediction samples from a third block of original samples of said third color plane to produce a block of residual samples of said third color plane. The positions of said first block, said second block and said third block of original samples are aligned. Finally, module 1824 encodes said block of residual samples of said third color plane into said compressed video bitstream.

Figure 19:
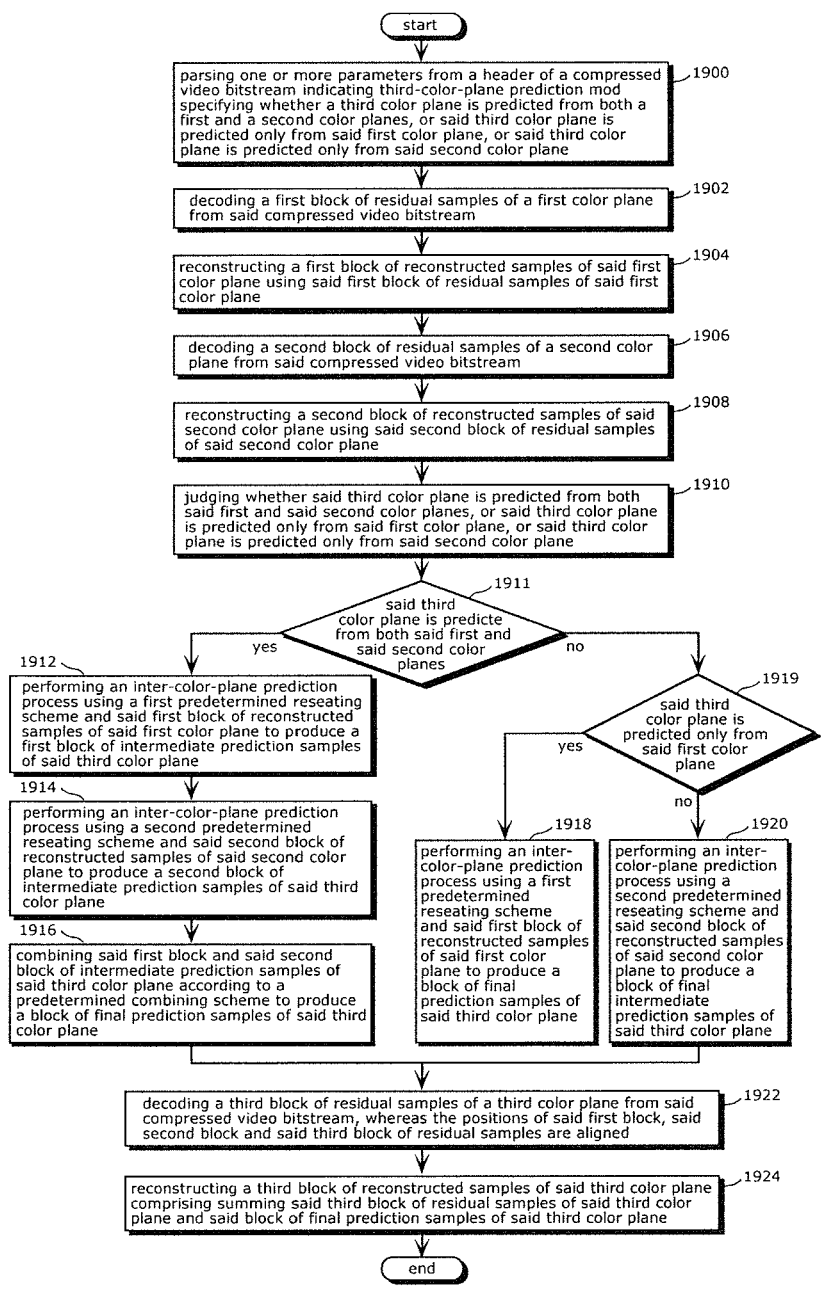
FIG. 19 is a flowchart showing a video decoding process utilizing inter-color-plane prediction scheme according to the seventh embodiment of the current invention.

FIG. 19 shows a flowchart showing a video decoding process utilizing inter-color-plane prediction scheme according to the seventh embodiment of the current invention. First, module 1900 parses one or more parameters from a header of a compressed video bitstream indicating third-color-plane prediction mode. Equivalent to the encoding process, said third third-color-plane prediction mode specifies whether a third color plane is predicted from both a first and a second color planes, or said third color plane is predicted only from said first color plane, or said third color plane is predicted only from said second color plane. Next, module 1902 decodes a first block of residual samples of a first color plane from said compressed video bitstream. Module 1904 then reconstructs a first block of reconstructed samples of said first color plane using said first block of residual samples of said first color plane. Next, module 1906 decodes a second block of residual samples of a second color plane from said compressed video bitstream. Module 1908 then reconstructs a second block of reconstructed samples of said second color plane using said second block of residual samples of said second color plane. Next, module 1910 judges whether said third color plane is predicted from both said first and said second color planes, or said third color plane is predicted only from said first color plane, or said third color plane is predicted only from said second color plane.

When said third color plane is predicted from both said first and said second color planes, module 1912 performs an inter-color-plane prediction process using a first predetermined rescaling scheme and said first block of reconstructed samples of said first color plane to produce a first block of intermediate prediction samples of said third color plane. Module 1914 performs an inter-color-plane prediction process using a second predetermined rescaling scheme and said second block of reconstructed samples of said second color plane to produce a second block of intermediate prediction samples of said third color plane. Next, module 1916 combines said first block and said second block of intermediate prediction samples of said third color plane according to a predetermined combining scheme to produce a block of final prediction samples of said third color plane. When said third color plane is predicted only from said first color plane, module 1918 performs an inter-color-plane prediction process using a first predetermined rescaling scheme and said first block of reconstructed samples of said first color plane to produce a block of final prediction samples of said third color plane.

When said third color plane is predicted only from said second color plane, module 1920 performs an inter-color-plane prediction process using a second predetermined rescaling scheme and said second block of reconstructed samples of said second color plane to produce a block of final intermediate prediction samples of said third color plane.

Subsequently after said block of final intermediate prediction samples of said third color plane is produced, module 1922 decodes a third block of residual samples of a third color plane from said compressed video bitstream. The positions of said first block, said second block and said third block of residual samples are aligned. Finally, module 1924 reconstructs a third block of reconstructed samples of said third color plane comprising summing said third block of residual samples of said third color plane and said block of final prediction samples of said third color plane.

Both the encoding process (FIG. 18) and the decoding process (FIG. 19) perform the inter-color prediction process as described above in FIG. 7 in exactly the same manner and utilizes the same predetermined combining scheme as described above.

FIG. 20 shows a block diagram showing an example apparatus of a video encoder utilizing inter-color-plane prediction scheme according to the current invention. FIG. 21 shows a block diagram showing an example apparatus of a video decoder utilizing inter-color-plane prediction scheme according to the current invention. The effects of the seventh embodiment of the current invention take place in the intra prediction unit 2004 of the video encoder and the intra prediction unit 2108 of the video decoder. According to the seventh embodiment of the current invention, the inter-color-plane prediction control parameters (D2001 in encoder and D2109 in decoder) comprise a parameter indicating third-color-plane prediction mode.

Embodiment 8

Figure 29:
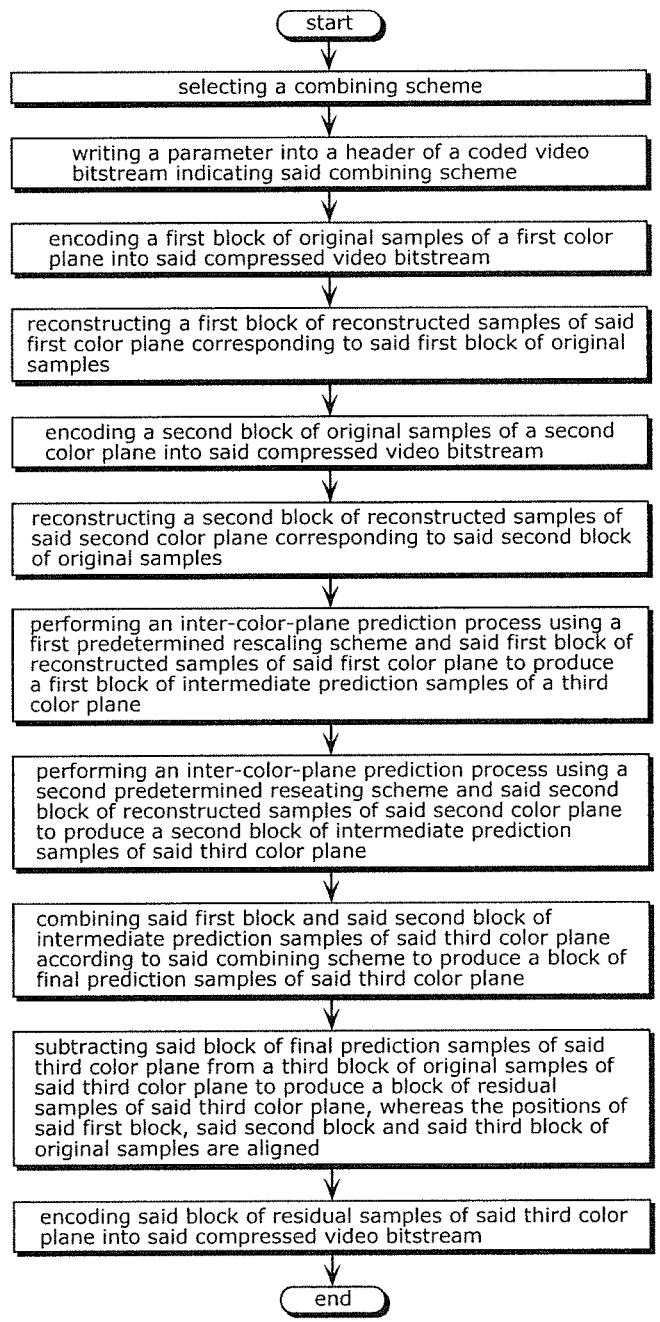
FIG. 29 shows a flowchart showing a video encoding process utilizing inter-color-plane prediction scheme according to the eighth embodiment of the current invention.
Figure 30:
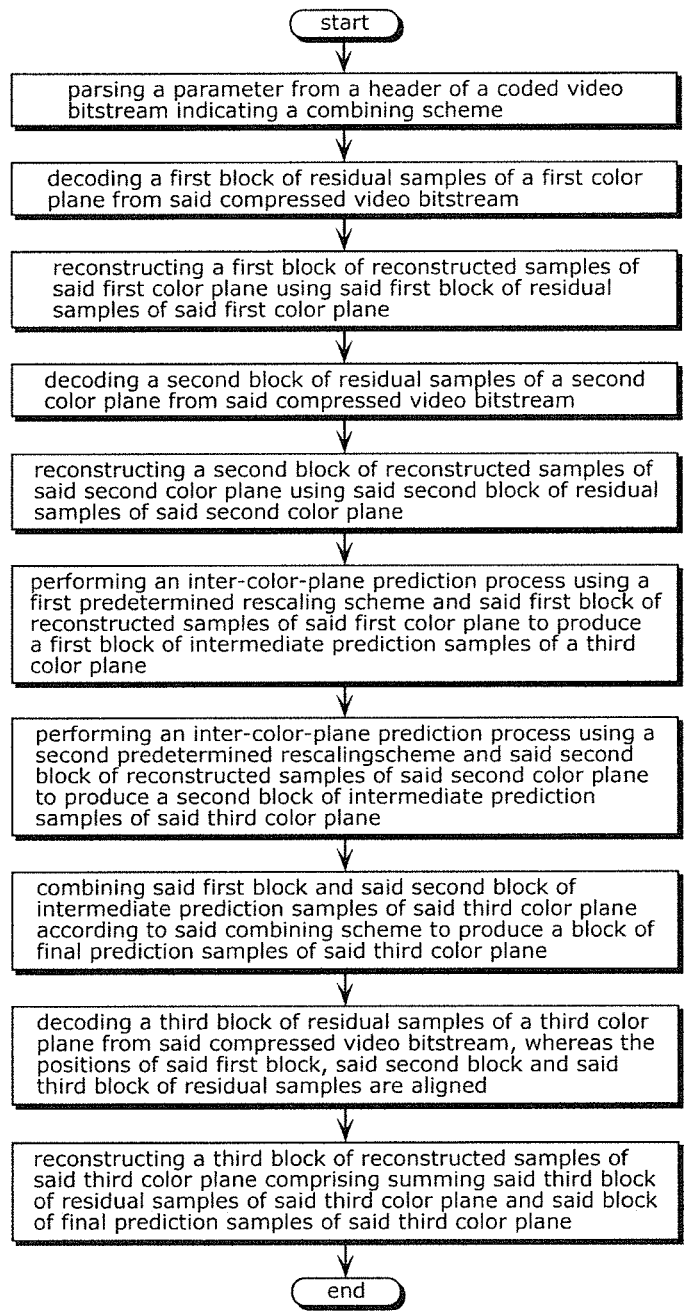
FIG. 30 shows a flowchart showing a video decoding process utilizing inter-color-plane prediction scheme according to the eighth embodiment of the current invention.

FIG. 29 shows a flowchart showing a video encoding process utilizing inter-color-plane prediction scheme according to the eighth embodiment of the current invention. FIG. 30 shows a flowchart showing a video decoding process utilizing inter-color-plane prediction scheme according to the eighth embodiment of the current invention. This embodiment reflects explicit combining scheme used for generating final prediction samples from two intermediate prediction samples.

Embodiment 9

Figure 31:
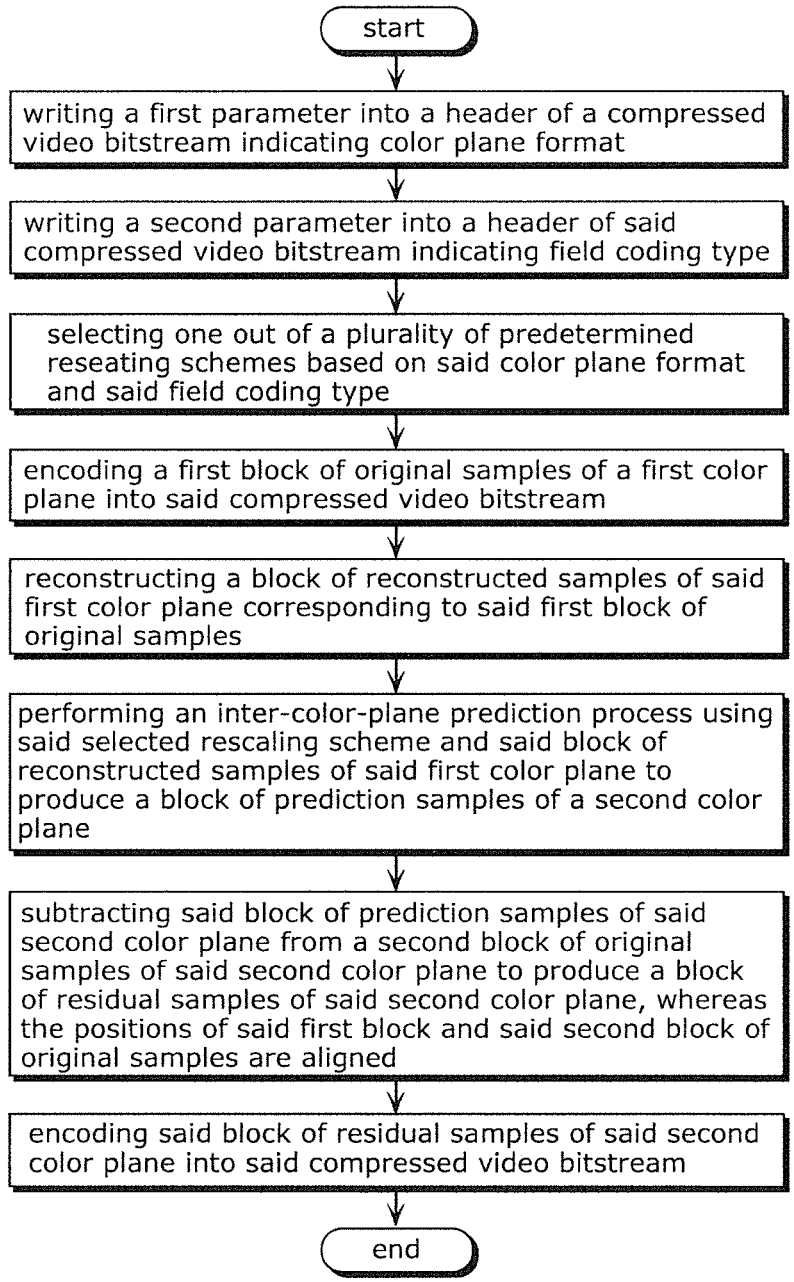
FIG. 31 shows a flowchart showing a video encoding process utilizing inter-color-plane prediction scheme according to the ninth embodiment of the current invention.
Figure 32:
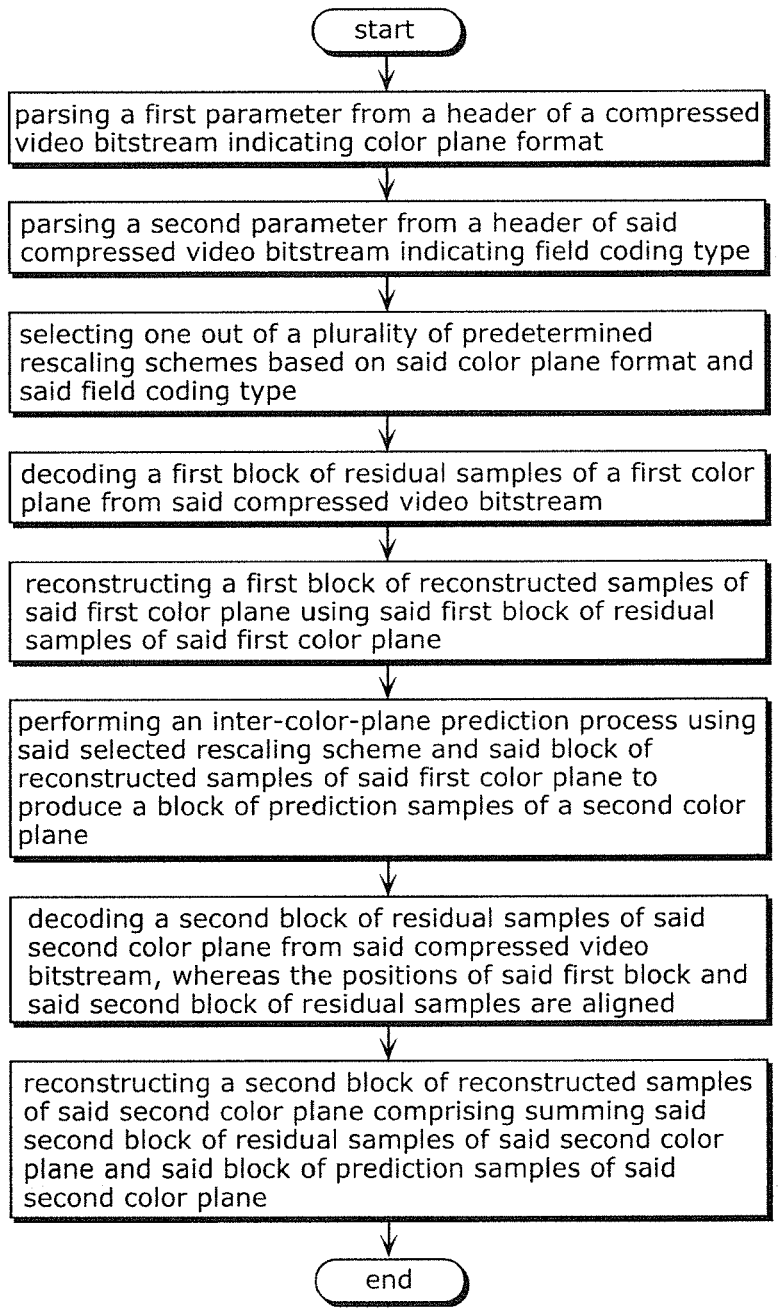
FIG. 32 shows a flowchart showing a video decoding process utilizing inter-color-plane prediction scheme according to the ninth embodiment of the current invention.

FIG. 31 shows a flowchart showing a video encoding process utilizing inter-color-plane prediction scheme according to the ninth embodiment of the current invention. FIG. 32 shows a flowchart showing a video decoding process utilizing inter-color-plane prediction scheme according to the ninth embodiment of the current invention. This embodiment reflects the selection of rescaling scheme based on both color plane format and field coding type.

<Summary>

(Method 1) A method of encoding video utilizing inter-color-plane prediction comprising, writing a parameter into a header of a compressed video bitstream indicating color plane format; selecting one out of a plurality of predetermined rescaling schemes based on said color plane format; encoding a first block of original samples of a first color plane into said compressed video bitstream; reconstructing a block of reconstructed samples of said first color plane corresponding to said first block of original samples; performing an inter-color-plane prediction process using said selected rescaling scheme and said block of reconstructed samples of said first color plane to produce a block of prediction samples of a second color plane; subtracting said block of prediction samples of said second color plane from a second block of original samples of said second color plane to produce a block of residual samples of said second color plane, whereas the positions of said first block and said second block of original samples are aligned; encoding said block of residual samples of said second color plane into said compressed video bitstream.

(Method 2) A method of decoding video utilizing inter-color-plane prediction comprising, parsing a parameter from a header of a compressed video bitstream indicating color plane format; selecting one out of a plurality of predetermined rescaling schemes based on said color plane format; decoding a first block of residual samples of a first color plane from said compressed video bitstream; reconstructing a first block of reconstructed samples of said first color plane using said first block of residual samples of said first color plane; performing an inter-color-plane prediction process using said selected rescaling scheme and said block of reconstructed samples of said first color plane to produce a block of prediction samples of a second color plane; decoding a second block of residual samples of said second color plane from said compressed video bitstream, whereas the positions of said first block and said second block of residual samples are aligned; reconstructing a second block of reconstructed samples of said second color plane comprising summing said second block of residual samples of said second color plane and said block of prediction samples of said second color plane.

(Method 3) A method of encoding video utilizing inter-color-plane prediction comprising, writing a parameter into a header of a compressed video bitstream indicating color plane sampling location; selecting one out of a plurality of predetermined rescaling schemes based on said color plane sampling location; encoding a first block of original samples of a first color plane into said compressed video bitstream; reconstructing a block of reconstructed samples of said first color plane corresponding to said first block of original samples; performing an inter-color-plane prediction process using said selected rescaling scheme and said block of reconstructed samples of said first color plane to produce a block of prediction samples of a second color plane; subtracting said block of prediction samples of said second color plane from a second block of original samples of said second color plane to produce a block of residual samples of said second color plane, whereas the positions of said first block and said second block of original samples are aligned; encoding said block of residual samples of said second color plane into said compressed video bitstream.

(Method 4) A method of decoding video utilizing inter-color-plane prediction comprising, parsing a parameter from a header of a compressed video bitstream indicating color plane sampling location; selecting one out of a plurality of predetermined rescaling schemes based on said color plane sampling location; decoding a first block of residual samples of a first color plane from said compressed video bitstream; reconstructing a first block of reconstructed samples of said first color plane using said first block of residual samples of said first color plane; performing an inter-color-plane prediction process using said selected rescaling scheme and said block of reconstructed samples of said first color plane to produce a block of prediction samples of a second color plane; decoding a second block of residual samples of said second color plane from said compressed video bitstream, whereas the positions of said first block and said second block of residual samples are aligned; reconstructing a second block of reconstructed samples of said second color plane comprising summing said second block of residual samples of said second color plane and said block of prediction samples of said second color plane.

(Method 5) A method of encoding video utilizing inter-color-plane prediction comprising, writing a parameter into a header of a compressed video bitstream indicating field coding type; selecting one out of a plurality of predetermined rescaling schemes based on said field coding type; encoding a first block of original samples of a first color plane into said compressed video bitstream; reconstructing a block of reconstructed samples of said first color plane corresponding to said first block of original samples; performing an inter-color-plane prediction process using said selected rescaling scheme and said block of reconstructed samples of said first color plane to produce a block of prediction samples of a second color plane; subtracting said block of prediction samples of said second color plane from a second block of original samples of said second color plane to produce a block of residual samples of said second color plane, whereas the positions of said first block and said second block of original samples are aligned; encoding said block of residual samples of said second color plane into said compressed video bitstream.

(Method 6) A method of decoding video utilizing inter-color-plane prediction comprising, parsing a parameter from a header of a compressed video bitstream indicating field coding type; selecting one out of a plurality of predetermined rescaling schemes based on said field coding type; decoding a first block of residual samples of a first color plane from said compressed video bitstream; reconstructing a first block of reconstructed samples of said first color plane using said first block of residual samples of said first color plane; performing an inter-color-plane prediction process using said selected rescaling scheme and said block of reconstructed samples of said first color plane to produce a block of prediction samples of a second color plane; decoding a second block of residual samples of said second color plane from said compressed video bitstream, whereas the positions of said first block and said second block of residual samples are aligned; reconstructing a second block of reconstructed samples of said second color plane comprising summing said second block of residual samples of said second color plane and said block of prediction samples of said second color plane.

(Method 7) A method of encoding video utilizing inter-color-plane prediction comprising, writing a parameter into a header of a compressed video bitstream indicating whether or not inter-color-plane prediction is enabled; judging whether or not inter-color-plane prediction is enabled; wherein, when inter-color-plane prediction is enabled, performing a prediction process to produce a block of prediction samples according to a first prediction scheme utilizing inter-color-plane prediction; wherein, when inter-color-plane prediction is not enabled, performing a prediction process to produce a block of prediction samples according to a second prediction scheme not utilizing inter-color-plane prediction whereafter, when inter-color-plane prediction is enabled or not enabled, subtracting said block of prediction samples from a block of original samples to produce a block of residual samples; encoding said block of residual samples into said compressed video bitstream; writing a prediction mode parameter into said compressed video bitstream to identify the prediction scheme used for producing said block of prediction samples, whereas said prediction mode parameter identifies one out of a plurality of prediction schemes, and both said first and said second prediction scheme are associated with a same value of said prediction mode parameter.

(Method 8) A method of decoding video utilizing inter-color-plane prediction comprising, parsing a parameter from a header of a compressed video bitstream indicating whether or not inter-color-plane prediction is enabled; parsing a prediction mode parameter from said compressed video bitstream to identify a prediction scheme for a block of image samples out of a plurality of predefined prediction schemes; judging whether the value of said prediction mode parameter is equal to a predetermined value; wherein, when the value of said prediction mode parameter is equal to said predetermined value, judging whether or not inter-color-plane prediction is enabled; wherein, when inter-color-plane prediction is enabled, performing a prediction process to produce a block of prediction samples according to a first prediction scheme utilizing inter-color-plane prediction; wherein, when inter-color-plane prediction is not enabled, performing a prediction process to produce a block of prediction samples according to a second prediction scheme not utilizing inter-color-plane prediction; wherein, when the value of said prediction mode parameter is not equal to said predetermined value, performing a prediction process to produce a block of prediction samples according to a third prediction scheme not utilizing inter-color-plane prediction; whereafter, when the value of said prediction mode parameter is equal or not equal to said predetermined value and inter-color-plane prediction is enabled or not enabled, decoding a block of residual samples corresponding to said block of image samples from said compressed video bitstream; reconstructing a block of reconstructed samples comprising summing said block of residual samples and said block of prediction samples.

(Method 9) A method of encoding video utilizing inter-color-plane prediction comprising, writing a parameter into a header of a coded video bitstream indicating inter-color-plane prediction direction specifying whether a second color plane is predicted from a first color plane or said first color plane is predicted from said second color plane; judging whether said second color plane is predicted from said first color plane or said first color plane is predicted from said second color plane; wherein, when said second color plane is predicted from said first color plane, encoding a block of original samples of said first color plane into said compressed video bitstream; reconstructing a block of reconstructed samples of said first color plane corresponding to said block of original samples of said first color plane; performing an inter-color-plane prediction process using a predetermined rescaling scheme and said block of reconstructed samples of said first color plane to produce a block of prediction samples of said second color plane; subtracting said block of prediction samples of said second color plane from a block of original samples of said second color plane to produce a block of residuals samples of said second color plane; encoding said block of residual samples of said second color plane into said compressed video bitstream; wherein, when said first color plane is predicted from said second color plane, encoding a block of original samples of said second color plane into said compressed video bitstream; reconstructing a block of reconstructed samples of said second color plane corresponding to said block of original samples of said second color plane; performing an inter-color-plane prediction process using a predetermined rescaling scheme and said block of reconstructed samples of said second color plane to produce a block of prediction samples of said first color plane; subtracting said block of prediction samples of said first color plane from a block of original samples of said first color plane to produce a block of residual samples of said first color plane; encoding said block of residual samples of said first color plane into said compressed video bitstream.

(Method 10) A method of decoding video utilizing inter-color-plane prediction comprising, parsing a parameter from a header of a coded video bitstream indicating inter-color-plane prediction direction specifying whether a second color plane is predicted from a first color plane or said first color plane is predicted from said second color plane; decoding a first block of residual samples corresponding to said first color plane from said compressed video bitstream; decoding a second block of residual samples corresponding to said second color plane from said compressed video bitstream; judging whether said second color plane is predicted from said first color plane or said first color plane is predicted from said second color plane; wherein, when said second color plane is predicted from said first color plane, reconstructing a block of reconstructed samples of said first color plane using said first block of residual samples; performing an inter-color-plane prediction process using a predetermined rescaling scheme and said block of reconstructed samples of said first color plane to produce a block of prediction samples of said second color plane; reconstructing a block of reconstructed samples of said second color plane comprising summing said second block of residual samples and said block of prediction samples of said second color plane; wherein, when said first color plane is predicted from said second color plane, reconstructing a block of reconstructed samples of said second color plane using said second block of residual samples; performing an inter-color-plane prediction process using a predetermined rescaling scheme and said block of reconstructed samples of said second color plane to produce a block of prediction samples of said first color plane; reconstructing a block of reconstructed samples of said first color plane comprising summing said first block of residual samples and said block of prediction samples of said first color plane.

(Method 11) A method of encoding video utilizing inter-color-plane prediction comprising, encoding a first block of original samples of a first color plane into said compressed video bitstream; reconstructing a first block of reconstructed samples of said first color plane corresponding to said first block of original samples; encoding a second block of original samples of a second color plane into said compressed video bitstream; reconstructing a second block of reconstructed samples of said second color plane corresponding to said second block of original samples; performing an inter-color-plane prediction process using a first predetermined rescaling scheme and said first block of reconstructed samples of said first color plane to produce a first block of intermediate prediction samples of a third color plane; performing an inter-color-plane prediction process using a second predetermined rescaling scheme and said second block of reconstructed samples of said second color plane to produce a second block of intermediate prediction samples of said third color plane; combining said first block and said second block of intermediate prediction samples of said third color plane according to a predetermined combining scheme to produce a block of final prediction samples of said third color plane; subtracting said block of final prediction samples of said third color plane from a third block of original samples of said third color plane to produce a block of residual samples of said third color plane, whereas the positions of said first block, said second block and said third block of original samples are aligned; encoding said block of residual samples of said third color plane into said compressed video bitstream.

(Method 12) A method of decoding video utilizing inter-color-plane prediction comprising, decoding a first block of residual samples of a first color plane from said compressed video bitstream; reconstructing a first block of reconstructed samples of said first color plane using said first block of residual samples of said first color plane; decoding a second block of residual samples of a second color plane from said compressed video bitstream; reconstructing a second block of reconstructed samples of said second color plane using said second block of residual samples of said second color plane; performing an inter-color-plane prediction process using a first predetermined rescaling scheme and said first block of reconstructed samples of said first color plane to produce a first block of intermediate prediction samples of a third color plane; performing an inter-color-plane prediction process using a second predetermined rescaling scheme and said second block of reconstructed samples of said second color plane to produce a second block of intermediate prediction samples of said third color plane; combining said first block and said second block of intermediate prediction samples of said third color plane according to a predetermined combining scheme to produce a block of final prediction samples of said third color plane; decoding a third block of residual samples of a third color plane from said compressed video bitstream, whereas the positions of said first block, said second block and said third block of residual samples are aligned; reconstructing a third block of reconstructed samples of said third color plane comprising summing said third block of residual samples of said third color plane and said block of final prediction samples of said third color plane.

(Method 13) A method of encoding video utilizing inter-color-plane prediction comprising, writing one or more parameters into a header of a compressed video bitstream indicating third-color-plane prediction mode specifying whether a third color plane is predicted from both a first and a second color planes, or said third color plane is predicted only from said first color plane, or said third color plane is predicted only from said second color plane; encoding a first block of original samples of a first color plane into said compressed video bitstream; reconstructing a first block of reconstructed samples of said first color plane corresponding to said first block of original samples; encoding a second block of original samples of a second color plane into said compressed video bitstream; reconstructing a second block of reconstructed samples of said second color plane corresponding to said second block of original samples; judging whether said third color plane is predicted from both said first and said second color planes, or said third color plane is predicted only from said first color plane, or said third color plane is predicted only from said second color plane; wherein, when said third color plane is predicted from both said first and said second color planes, performing an inter-color-plane prediction process using a first predetermined rescaling scheme and said first block of reconstructed samples of said first color plane to produce a first block of intermediate prediction samples of said third color plane performing an inter-color-plane prediction process using a second predetermined rescaling scheme and said second block of reconstructed samples of said second color plane to produce a second block of intermediate prediction samples of said third color plane, combining said first block and said second block of intermediate prediction samples of said third color plane according to a predetermined combining scheme to produce a block of final prediction samples of said third color plane, wherein, when said third color plane is predicted only from said first color plane, performing an inter-color-plane prediction process using a first predetermined rescaling scheme and said block of reconstructed samples of said first color plane to produce a block of final prediction samples of said third color plane, wherein, when said third color plane is predicted only from said second color plane, performing an inter-color-plane prediction process using a second predetermined rescaling scheme and said block of reconstructed samples of said second color plane to produce a block of final intermediate prediction samples of said third color plane, whereafter, when said third color plane is predicted from both said first and said second color planes, or said third color plane is predicted only from said first color plane, or said third color plane is predicted only from said second color plane, subtracting said block of final prediction samples from a third block of original samples of said third color plane to produce a block of residual samples of said third color plane, whereas the positions of said first block, said second block and said third block of original samples are aligned; encoding said block of residual samples of said third color plane into said compressed video bitstream.

(Method 14) A method of decoding video utilizing inter-color-plane prediction comprising, parsing one or more parameters from a header of a compressed video bitstream indicating third-color-plane prediction mode specifying whether a third color plane is predicted from both a first and a second color planes, or said third color plane is predicted only from said first color plane, or said third color plane is predicted only from said second color plane; decoding a first block of residual samples of a first color plane from said compressed video bitstream; reconstructing a first block of reconstructed samples of said first color plane using said first block of residual samples of said first color plane; decoding a second block of residual samples of a second color plane from said compressed video bitstream; reconstructing a second block of reconstructed samples of said second color plane using said second block of residual samples of said second color plane; judging whether said third color plane is predicted from both said first and said second color planes, or said third color plane is predicted only from said first color plane, or said third color plane is predicted only from said second color plane; wherein, when said third color plane is predicted from both said first and said second color planes, performing an inter-color-plane prediction process using a first predetermined rescaling scheme and said first block of reconstructed samples of said first color plane to produce a first block of intermediate prediction samples of said third color plane, performing an inter-color-plane prediction process using a second predetermined rescaling scheme and said second block of reconstructed samples of said second color plane to produce a second block of intermediate prediction samples of said third color plane, combining said first block and said second block of intermediate prediction samples of said third color plane according to a predetermined combining scheme to produce a block of final prediction samples of said third color plane, wherein, when said third color plane is predicted only from said first color plane, performing an inter-color-plane prediction process using a first predetermined rescaling scheme and said first block of reconstructed samples of said first color plane to produce a block of final prediction samples of said third color plane, wherein, when said third color plane is predicted only from said second color plane, performing an inter-color-plane prediction process using a second predetermined rescaling scheme and said second block of reconstructed samples of said second color plane to produce a block of final intermediate prediction samples of said third color plane, whereafter, when said third color plane is predicted from both said first and said second color planes, or said third color plane is predicted only from said first color plane, or said third color plane is predicted only from said second color plane, decoding a third block of residual samples of a third color plane from said compressed video bitstream, whereas the positions of said first block, said second block and said third block of residual samples are aligned; reconstructing a third block of reconstructed samples of said third color plane comprising summing said third block of residual samples of said third color plane and said block of final prediction samples of said third color plane.

(Method 15) A method of encoding video utilizing inter-color-plane prediction comprising, selecting a combining scheme; writing a parameter into a header of a coded video bitstream indicating said combining scheme; encoding a first block of original samples of a first color plane into said compressed video bitstream; reconstructing a first block of reconstructed samples of said first color plane corresponding to said first block of original samples; encoding a second block of original samples of a second color plane into said compressed video bitstream; reconstructing a second block of reconstructed samples of said second color plane corresponding to said second block of original samples; performing an inter-color-plane prediction process using a first predetermined rescaling scheme and said first block of reconstructed samples of said first color plane to produce a first block of intermediate prediction samples of a third color plane; performing an inter-color-plane prediction process using a second predetermined rescaling scheme and said second block of reconstructed samples of said second color plane to produce a second block of intermediate prediction samples of said third color plane; combining said first block and said second block of intermediate prediction samples of said third color plane according to said combining scheme to produce a block of final prediction samples of said third color plane; subtracting said block of final prediction samples of said third color plane from a third block of original samples of said third color plane to produce a block of residual samples of said third color plane, whereas the positions of said first block, said second block and said third block of original samples are aligned; encoding said block of residual samples of said third color plane into said compressed video bitstream.

(Method 16) A method of decoding video utilizing inter-color-plane prediction comprising, parsing a parameter from a header of a coded video bitstream indicating a combining scheme; decoding a first block of residual samples of a first color plane from said compressed video bitstream; reconstructing a first block of reconstructed samples of said first color plane using said first block of residual samples of said first color plane; decoding a second block of residual samples of a second color plane from said compressed video bitstream; reconstructing a second block of reconstructed samples of said second color plane using said second block of residual samples of said second color plane; performing an inter-color-plane prediction process using a first predetermined rescaling scheme and said first block of reconstructed samples of said first color plane to produce a first block of intermediate prediction samples of a third color plane; performing an inter-color-plane prediction process using a second predetermined rescaling scheme and said second block of reconstructed samples of said second color plane to produce a second block of intermediate prediction samples of said third color plane; combining said first block and said second block of intermediate prediction samples of said third color plane according to said combining scheme to produce a block of final prediction samples of said third color plane; decoding a third block of residual samples of a third color plane from said compressed video bitstream, whereas the positions of said first block, said second block and said third block of residual samples are aligned; reconstructing a third block of reconstructed samples of said third color plane comprising summing said third block of residual samples of said third color plane and said block of final prediction samples of said third color plane.

(Method 17) A method of encoding video utilizing inter-color-plane prediction comprising, writing a first parameter into a header of a compressed video bitstream indicating color plane format; writing a second parameter into a header of said compressed video bitstream indicating field coding type; selecting one out of a plurality of predetermined rescaling schemes based on said color plane format and said field coding type; encoding a first block of original samples of a first color plane into said compressed video bitstream; reconstructing a block of reconstructed samples of said first color plane corresponding to said first block of original samples; performing an inter-color-plane prediction process using said selected rescaling scheme and said block of reconstructed samples of said first color plane to produce a block of prediction samples of a second color plane; subtracting said block of prediction samples of said second color plane from a second block of original samples of said second color plane to produce a block of residual samples of said second color plane, whereas the positions of said first block and said second block of original samples are aligned; encoding said block of residual samples of said second color plane into said compressed video bitstream.

(Method 18) A method of decoding video utilizing inter-color-plane prediction comprising, parsing a first parameter from a header of a compressed video bitstream indicating color plane format; parsing a second parameter from a header of said compressed video bitstream indicating field coding type; selecting one out of a plurality of predetermined rescaling schemes based on said color plane format and said field coding type; decoding a first block of residual samples of a first color plane from said compressed video bitstream; reconstructing a first block of reconstructed samples of said first color plane using said first block of residual samples of said first color plane; performing an inter-color-plane prediction process using said selected rescaling scheme and said block of reconstructed samples of said first color plane to produce a block of prediction samples of a second color plane; decoding a second block of residual samples of said second color plane from said compressed video bitstream, whereas the positions of said first block and said second block of residual samples are aligned; reconstructing a second block of reconstructed samples of said second color plane comprising summing said second block of residual samples of said second color plane and said block of prediction samples of said second color plane.

(Apparatus 19) An apparatus for encoding video utilizing inter-color-plane prediction comprising, a writing unit operable to write a parameter into a header of a compressed video bitstream indicating color plane format; a selecting unit operable to select one out of a plurality of predetermined rescaling schemes based on said color plane format; an encoding unit operable to encode a first block of original samples of a first color plane into said compressed video bitstream; a reconstruction unit operable to reconstruct a block of reconstructed samples of said first color plane corresponding to said first block of original samples; a prediction unit operable to perform an inter-color-plane prediction process using said selected rescaling scheme and said block of reconstructed samples of said first color plane to produce a block of prediction samples of a second color plane; a subtracting unit operable to subtract said block of prediction samples of said second color plane from a second block of original samples of said second color plane to produce a block of residual samples of said second color plane, whereas the positions of said first block and said second block of original samples are aligned; an encoding unit operable to encode said block of residual samples of said second color plane into said compressed video bitstream.

(Apparatus 20) An apparatus for decoding video utilizing inter-color-plane prediction comprising, a parsing unit operable to parse a parameter from a header of a compressed video bitstream indicating color plane format; a selecting unit operable to select one out of a plurality of predetermined rescaling schemes based on said color plane format; a decoding unit operable to decode a first block of residual samples of a first color plane from said compressed video bitstream; a reconstruction unit operable to reconstruct a first block of reconstructed samples of said first color plane using said first block of residual samples of said first color plane; a prediction unit operable to perform an inter-color-plane prediction process using said selected rescaling scheme and said block of reconstructed samples of said first color plane to produce a block of prediction samples of a second color plane; a decoding unit operable to decode a second block of residual samples of said second color plane from said compressed video bitstream, whereas the positions of said first block and said second block of residual samples are aligned; a reconstruction unit operable to reconstruct a second block of reconstructed samples of said second color plane comprising summing said second block of residual samples of said second color plane and said block of prediction samples of said second color plane.

(Apparatus 21) An apparatus for encoding video utilizing inter-color-plane prediction comprising, a writing unit operable to write a parameter into a header of a compressed video bitstream indicating color plane sampling location; a selecting unit operable to select one out of a plurality of predetermined rescaling schemes based on said color plane sampling location; an encoding unit operable to encode a first block of original samples of a first color plane into said compressed video bitstream; a reconstruction unit operable to reconstruct a block of reconstructed samples of said first color plane corresponding to said first block of original samples; a prediction unit operable to perform an inter-color-plane prediction process using said selected rescaling scheme and said block of reconstructed samples of said first color plane to produce a block of prediction samples of a second color plane; a subtracting unit operable to subtract said block of prediction samples of said second color plane from a second block of original samples of said second color plane to produce a block of residual samples of said second color plane, whereas the positions of said first block and said second block of original samples are aligned; an encoding unit operable to encode said block of residual samples of said second color plane into said compressed video bitstream.

(Apparatus 22) An apparatus for decoding video utilizing inter-color-plane prediction comprising, a parsing unit operable to parse a parameter from a header of a compressed video bitstream indicating color plane sampling location; a selecting unit operable to select one out of a plurality of predetermined rescaling schemes based on said color plane sampling location; a decoding unit operable to decode a first block of residual samples of a first color plane from said compressed video bitstream; a reconstruction unit operable to reconstruct a first block of reconstructed samples of said first color plane using said first block of residual samples of said first color plane; a prediction unit operable to perform an inter-color-plane prediction process using said selected rescaling scheme and said block of reconstructed samples of said first color plane to produce a block of prediction samples of a second color plane; a decoding unit operable to decode a second block of residual samples of said second color plane from said compressed video bitstream, whereas the positions of said first block and said second block of residual samples are aligned; a reconstruction unit operable to reconstruct a second block of reconstructed samples of said second color plane comprising summing said second block of residual samples of said second color plane and said block of prediction samples of said second color plane.

(Apparatus 23) An apparatus for encoding video utilizing inter-color-plane prediction comprising, a writing unit operable to write a parameter into a header of a compressed video bitstream indicating field coding type; a selecting unit operable to select one out of a plurality of predetermined rescaling schemes based on said field coding type; an encoding unit operable to encode a first block of original samples of a first color plane into said compressed video bitstream; a reconstruction unit operable to reconstruct a block of reconstructed samples of said first color plane corresponding to said first block of original samples; a prediction unit operable to perform an inter-color-plane prediction process using said selected rescaling scheme and said block of reconstructed samples of said first color plane to produce a block of prediction samples of a second color plane; a subtracting unit operable to subtract said block of prediction samples of said second color plane from a second block of original samples of said second color plane to produce a block of residual samples of said second color plane, whereas the positions of said first block and said second block of original samples are aligned; an encoding unit operable to encode said block of residual samples of said second color plane into said compressed video bitstream.

(Apparatus 24) An apparatus for decoding video utilizing inter-color-plane prediction comprising, a parsing unit operable to parse a parameter from a header of a compressed video bitstream indicating field coding type; a selecting unit operable to select one out of a plurality of predetermined rescaling schemes based on said field coding type; a decoding unit operable to decode a first block of residual samples of a first color plane from said compressed video bitstream; a reconstruction unit operable to reconstruct a first block of reconstructed samples of said first color plane using said first block of residual samples of said first color plane; a prediction unit operable to perform an inter-color-plane prediction process using said selected rescaling scheme and said block of reconstructed samples of said first color plane to produce a block of prediction samples of a second color plane; a decoding unit operable to decode a second block of residual samples of said second color plane from said compressed video bitstream, whereas the positions of said first block and said second block of residual samples are aligned; a reconstruction unit operable to reconstruct a second block of reconstructed samples of said second color plane comprising summing said second block of residual samples of said second color plane and said block of prediction samples of said second color plane.

(Apparatus 25) An apparatus for encoding video utilizing inter-color-plane prediction comprising, a writing unit operable to write a parameter into a header of a compressed video bitstream indicating whether or not inter-color-plane prediction is enabled; a judging unit operable to judge whether or not inter-color-plane prediction is enabled; wherein, when inter-color-plane prediction is enabled, a prediction unit operable to perform a prediction process to produce a block of prediction samples according to a first prediction scheme utilizing inter-color-plane prediction; wherein, when inter-color-plane prediction is not enabled, a prediction unit operable to perform a prediction process to produce a block of prediction samples according to a second prediction scheme not utilizing inter-color-plane prediction whereafter, when inter-color-plane prediction is enabled or not enabled, a subtracting unit operable to subtract said block of prediction samples from a block of original samples to produce a block of residual samples; an encoding unit operable to encode said block of residual samples into said compressed video bitstream; a writing unit operable to write a prediction mode parameter into said compressed video bitstream to identify the prediction scheme used for producing said block of prediction samples, whereas said prediction mode parameter identifies one out of a plurality of prediction schemes, and both said first and said second prediction scheme are associated with a same value of said prediction mode parameter.

(Apparatus 26) An apparatus for decoding video utilizing inter-color-plane prediction comprising, a parsing unit operable to parse a parameter from a header of a compressed video bitstream indicating whether or not inter-color-plane prediction is enabled; a parsing unit operable to parse a prediction mode parameter from said compressed video bitstream to identify a prediction scheme for a block of image samples out of a plurality of predefined prediction schemes; a judging unit operable to judge whether the value of said prediction mode parameter is equal to a predetermined value; wherein, when the value of said prediction mode parameter is equal to said predetermined value, a judging unit operable to judge whether or not inter-color-plane prediction is enabled; wherein, when inter-color-plane prediction is enabled, a prediction unit operable to perform a prediction process to produce a block of prediction samples according to a first prediction scheme utilizing inter-color-plane prediction; wherein, when inter-color-plane prediction is not enabled, a prediction unit operable to perform a prediction process to produce a block of prediction samples according to a second prediction scheme not utilizing inter-color-plane prediction; wherein, when the value of said prediction mode parameter is not equal to said predetermined value, a prediction unit operable to perform a prediction process to produce a block of prediction samples according to a third prediction scheme not utilizing inter-color-plane prediction; whereafter, when the value of said prediction mode parameter is equal or not equal to said predetermined value and inter-color-plane prediction is enabled or not enabled, a decoding unit operable to decode a block of residual samples corresponding to said block of image samples from said compressed video bitstream; a reconstruction unit operable to reconstruct a block of reconstructed samples comprising summing said block of residual samples and said block of prediction samples.

(Apparatus 27) An apparatus for encoding video utilizing inter-color-plane prediction comprising, a writing unit operable to write a parameter into a header of a coded video bitstream indicating inter-color-plane prediction direction specifying whether a second color plane is predicted from a first color plane or said first color plane is predicted from said second color plane; a judging unit operable to judge whether said second color plane is predicted from said first color plane or said first color plane is predicted from said second color plane; wherein, when said second color plane is predicted from said first color plane, an encoding unit operable to encode a block of original samples of said first color plane into said compressed video bitstream; a reconstruction unit operable to reconstruct a block of reconstructed samples of said first color plane corresponding to said block of original samples of said first color plane; a prediction unit operable to perform an inter-color-plane prediction process using a predetermined rescaling scheme and said block of reconstructed samples of said first color plane to produce a block of prediction samples of said second color plane; a subtracting unit operable to subtract said block of prediction samples of said second color plane from a block of original samples of said second color plane to produce a block of residuals samples of said second color plane; an encoding unit operable to encode said block of residual samples of said second color plane into said compressed video bitstream; wherein, when said first color plane is predicted from said second color plane, an encoding unit operable to encode a block of original samples of said second color plane into said compressed video bitstream; a reconstruction unit operable to reconstruct a block of reconstructed samples of said second color plane corresponding to said block of original samples of said second color plane; a prediction unit operable to perform an inter-color-plane prediction process using a predetermined rescaling scheme and said block of reconstructed samples of said second color plane to produce a block of prediction samples of said first color plane; a subtracting unit operable to subtract said block of prediction samples of said first color plane from a block of original samples of said first color plane to produce a block of residual samples of said first color plane; an encoding unit operable to encode said block of residual samples of said first color plane into said compressed video bitstream.

(Apparatus 28) An apparatus for decoding video utilizing inter-color-plane prediction comprising, a parsing unit operable to parse a parameter from a header of a coded video bitstream indicating inter-color-plane prediction direction specifying whether a second color plane is predicted from a first color plane or said first color plane is predicted from said second color plane; a decoding unit operable to decode a first block of residual samples corresponding to said first color plane from said compressed video bitstream; a decoding unit operable to decode a second block of residual samples corresponding to said second color plane from said compressed video bitstream; a judging unit operable to judge whether said second color plane is predicted from said first color plane or said first color plane is predicted from said second color plane; wherein, when said second color plane is predicted from said first color plane, a reconstruction unit operable to reconstruct a block of reconstructed samples of said first color plane using said first block of residual samples; a prediction unit operable to perform an inter-color-plane prediction process using a predetermined rescaling scheme and said block of reconstructed samples of said first color plane to produce a block of prediction samples of said second color plane; a reconstruction unit operable to reconstruct a block of reconstructed samples of said second color plane comprising summing said second block of residual samples and said block of prediction samples of said second color plane; wherein, when said first color plane is predicted from said second color plane, a reconstruction unit operable to reconstruct a block of reconstructed samples of said second color plane using said second block of residual samples; a prediction unit operable to perform an inter-color-plane prediction process using a predetermined rescaling scheme and said block of reconstructed samples of said second color plane to produce a block of prediction samples of said first color plane; a reconstruction unit operable to reconstruct a block of reconstructed samples of said first color plane comprising summing said first block of residual samples and said block of prediction samples of said first color plane.

(Apparatus 29) An apparatus for encoding video utilizing inter-color-plane prediction comprising, an encoding unit operable to encode a first block of original samples of a first color plane into said compressed video bitstream; a reconstruction unit operable to reconstruct a first block of reconstructed samples of said first color plane corresponding to said first block of original samples; an encoding unit operable to encode a second block of original samples of a second color plane into said compressed video bitstream; a reconstruction unit operable to reconstruct a second block of reconstructed samples of said second color plane corresponding to said second block of original samples; a prediction unit operable to perform an inter-color-plane prediction process using a first predetermined rescaling scheme and said first block of reconstructed samples of said first color plane to produce a first block of intermediate prediction samples of a third color plane; a prediction unit operable to perform an inter-color-plane prediction process using a second predetermined rescaling scheme and said second block of reconstructed samples of said second color plane to produce a second block of intermediate prediction samples of said third color plane; a combining unit operable to combine said first block and said second block of intermediate prediction samples of said third color plane according to a predetermined combining scheme to produce a block of final prediction samples of said third color plane; a subtracting unit operable to subtract said block of final prediction samples of said third color plane from a third block of original samples of said third color plane to produce a block of residual samples of said third color plane, whereas the positions of said first block, said second block and said third block of original samples are aligned; an encoding unit operable to encode said block of residual samples of said third color plane into said compressed video bitstream.

(Apparatus 30) An apparatus for decoding video utilizing inter-color-plane prediction comprising, a decoding unit operable to decode a first block of residual samples of a first color plane from said compressed video bitstream; a reconstruction unit operable to reconstruct a first block of reconstructed samples of said first color plane using said first block of residual samples of said first color plane; a decoding unit operable to decode a second block of residual samples of a second color plane from said compressed video bitstream; a reconstruction unit operable to reconstruct a second block of reconstructed samples of said second color plane using said second block of residual samples of said second color plane; a prediction unit operable to perform an inter-color-plane prediction process using a first predetermined rescaling scheme and said first block of reconstructed samples of said first color plane to produce a first block of intermediate prediction samples of a third color plane; a prediction unit operable to perform an inter-color-plane prediction process using a second predetermined rescaling scheme and said second block of reconstructed samples of said second color plane to produce a second block of intermediate prediction samples of said third color plane; a combining unit operable to combine said first block and said second block of intermediate prediction samples of said third color plane according to a predetermined combining scheme to produce a block of final prediction samples of said third color plane; a decoding unit operable to decode a third block of residual samples of a third color plane from said compressed video bitstream, whereas the positions of said first block, said second block and said third block of residual samples are aligned; a reconstruction unit operable to reconstruct a third block of reconstructed samples of said third color plane comprising summing said third block of residual samples of said third color plane and said block of final prediction samples of said third color plane.

(Apparatus 31) An apparatus for encoding video utilizing inter-color-plane prediction comprising, a writing unit operable to write one or more parameters into a header of a compressed video bitstream indicating third-color-plane prediction mode specifying whether a third color plane is predicted from both a first and a second color planes, or said third color plane is predicted only from said first color plane, or said third color plane is predicted only from said second color plane; an encoding unit operable to encode a first block of original samples of a first color plane into said compressed video bitstream; a reconstruction unit operable to reconstruct a first block of reconstructed samples of said first color plane corresponding to said first block of original samples; an encoding unit operable to encode a second block of original samples of a second color plane into said compressed video bitstream; a reconstruction unit operable to reconstruct a second block of reconstructed samples of said second color plane corresponding to said second block of original samples; a judging unit operable to judge whether said third color plane is predicted from both said first and said second color planes, or said third color plane is predicted only from said first color plane, or said third color plane is predicted only from said second color plane; wherein, when said third color plane is predicted from both said first and said second color planes, a prediction unit operable to perform an inter-color-plane prediction process using a first predetermined rescaling scheme and said first block of reconstructed samples of said first color plane to produce a first block of intermediate prediction samples of said third color plane, a prediction unit operable to perform an inter-color-plane prediction process using a second predetermined rescaling scheme and said second block of reconstructed samples of said second color plane to produce a second block of intermediate prediction samples of said third color plane, a combining unit operable to combine said first block and said second block of intermediate prediction samples of said third color plane according to a predetermined combining scheme to produce a block of final prediction samples of said third color plane, wherein, when said third color plane is predicted only from said first color plane, a prediction unit operable to perform an inter-color-plane prediction process using a first predetermined rescaling scheme and said block of reconstructed samples of said first color plane to produce a block of final prediction samples of said third color plane, wherein, when said third color plane is predicted only from said second color plane, a prediction unit operable to perform an inter-color-plane prediction process using a second predetermined rescaling scheme and said block of reconstructed samples of said second color plane to produce a block of final intermediate prediction samples of said third color plane, whereafter, when said third color plane is predicted from both said first and said second color planes, or said third color plane is predicted only from said first color plane, or said third color plane is predicted only from said second color plane, a subtracting unit operable to subtract said block of final prediction samples from a third block of original samples of said third color plane to produce a block of residual samples of said third color plane, whereas the positions of said first block, said second block and said third block of original samples are aligned; an encoding unit operable to encode said block of residual samples of said third color plane into said compressed video bitstream.

(Apparatus 32) An apparatus for decoding video utilizing inter-color-plane prediction comprising, a parsing unit operable to parse one or more parameters from a header of a compressed video bitstream indicating third-color-plane prediction mode specifying whether a third color plane is predicted from both a first and a second color planes, or said third color plane is predicted only from said first color plane, or said third color plane is predicted only from said second color plane; a decoding unit operable to decode a first block of residual samples of a first color plane from said compressed video bitstream; a reconstruction unit operable to reconstruct a first block of reconstructed samples of said first color plane using said first block of residual samples of said first color plane; a decoding unit operable to decode a second block of residual samples of a second color plane from said compressed video bitstream; a reconstruction unit operable to reconstruct a second block of reconstructed samples of said second color plane using said second block of residual samples of said second color plane; a judging unit operable to judge whether said third color plane is predicted from both said first and said second color planes, or said third color plane is predicted only from said first color plane, or said third color plane is predicted only from said second color plane; wherein, when said third color plane is predicted from both said first and said second color planes, a prediction unit operable to perform an inter-color-plane prediction process using a first predetermined rescaling scheme and said first block of reconstructed samples of said first color plane to produce a first block of intermediate prediction samples of said third color plane, a prediction unit operable to perform an inter-color-plane prediction process using a second predetermined rescaling scheme and said second block of reconstructed samples of said second color plane to produce a second block of intermediate prediction samples of said third color plane, a combining unit operable to combine said first block and said second block of intermediate prediction samples of said third color plane according to a predetermined combining scheme to produce a block of final prediction samples of said third color plane, wherein, when said third color plane is predicted only from said first color plane, a prediction unit operable to perform an inter-color-plane prediction process using a first predetermined rescaling scheme and said first block of reconstructed samples of said first color plane to produce a block of final prediction samples of said third color plane, wherein, when said third color plane is predicted only from said second color plane, a prediction unit operable to perform an inter-color-plane prediction process using a second predetermined rescaling scheme and said second block of reconstructed samples of said second color plane to produce a block of final intermediate prediction samples of said third color plane, whereafter, when said third color plane is predicted from both said first and said second color planes, or said third color plane is predicted only from said first color plane, or said third color plane is predicted only from said second color plane, a decoding unit operable to decode a third block of residual samples of a third color plane from said compressed video bitstream, whereas the positions of said first block, said second block and said third block of residual samples are aligned; a reconstruction unit operable to reconstruct a third block of reconstructed samples of said third color plane comprising summing said third block of residual samples of said third color plane and said block of final prediction samples of said third color plane.

Embodiment 10

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 33:
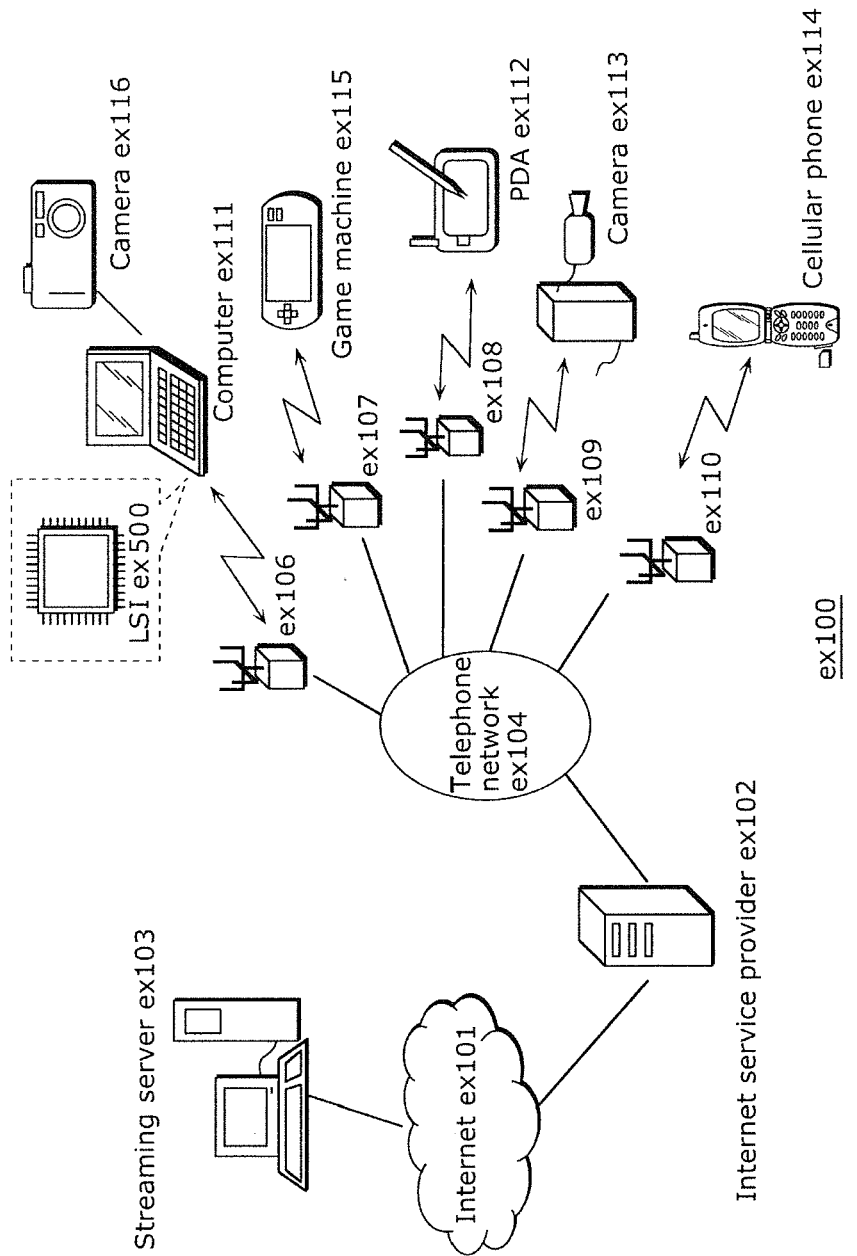
FIG. 33 shows an overall configuration of a content providing system for implementing content distribution services.

FIG. 33 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 33, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 34:
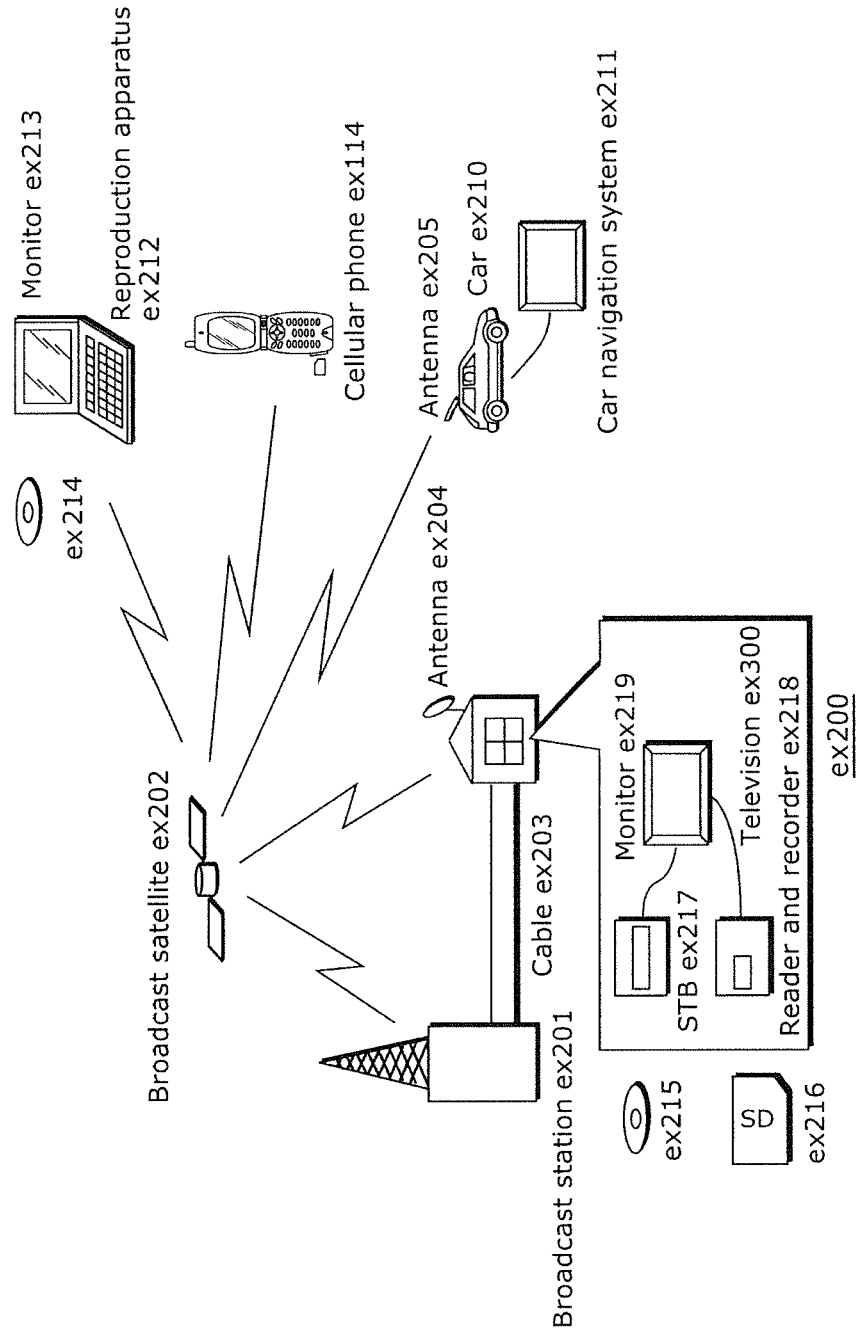
FIG. 34 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 34. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 35:
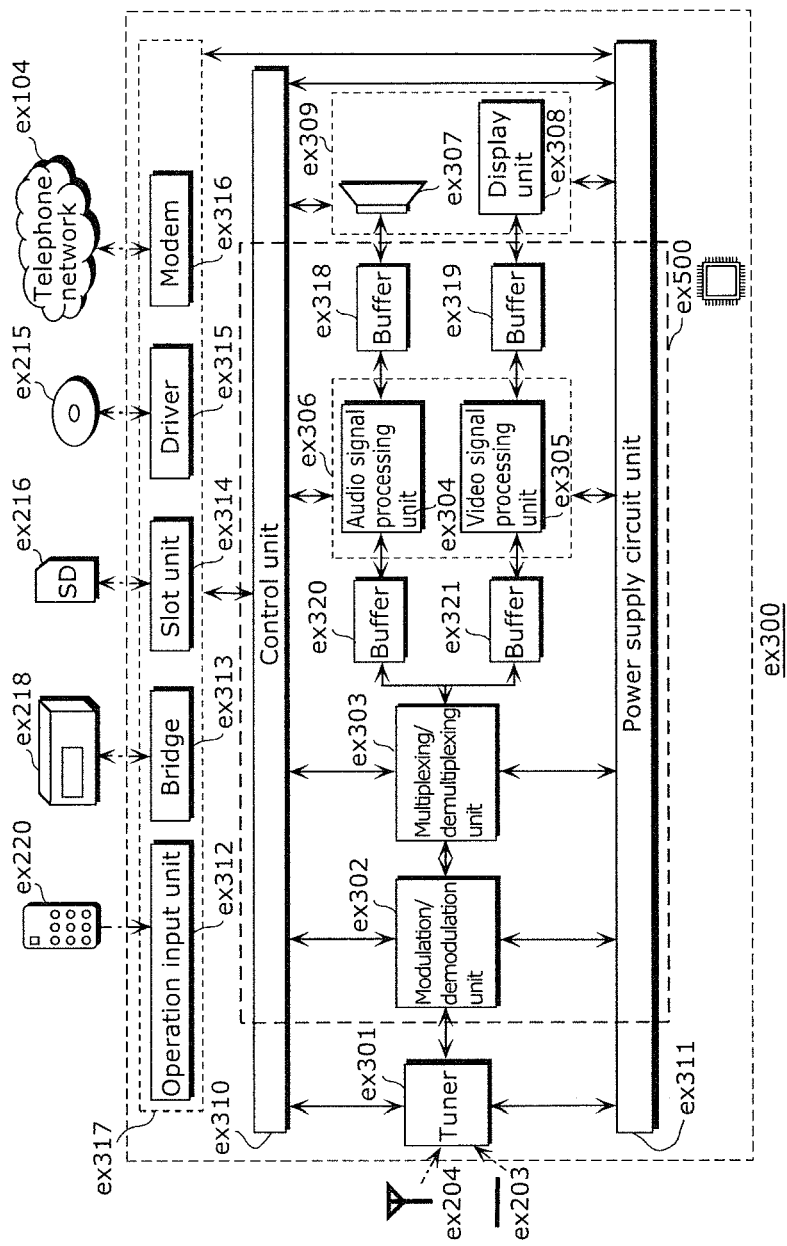
FIG. 35 shows a block diagram illustrating an example of a configuration of a television.

FIG. 35 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 36:
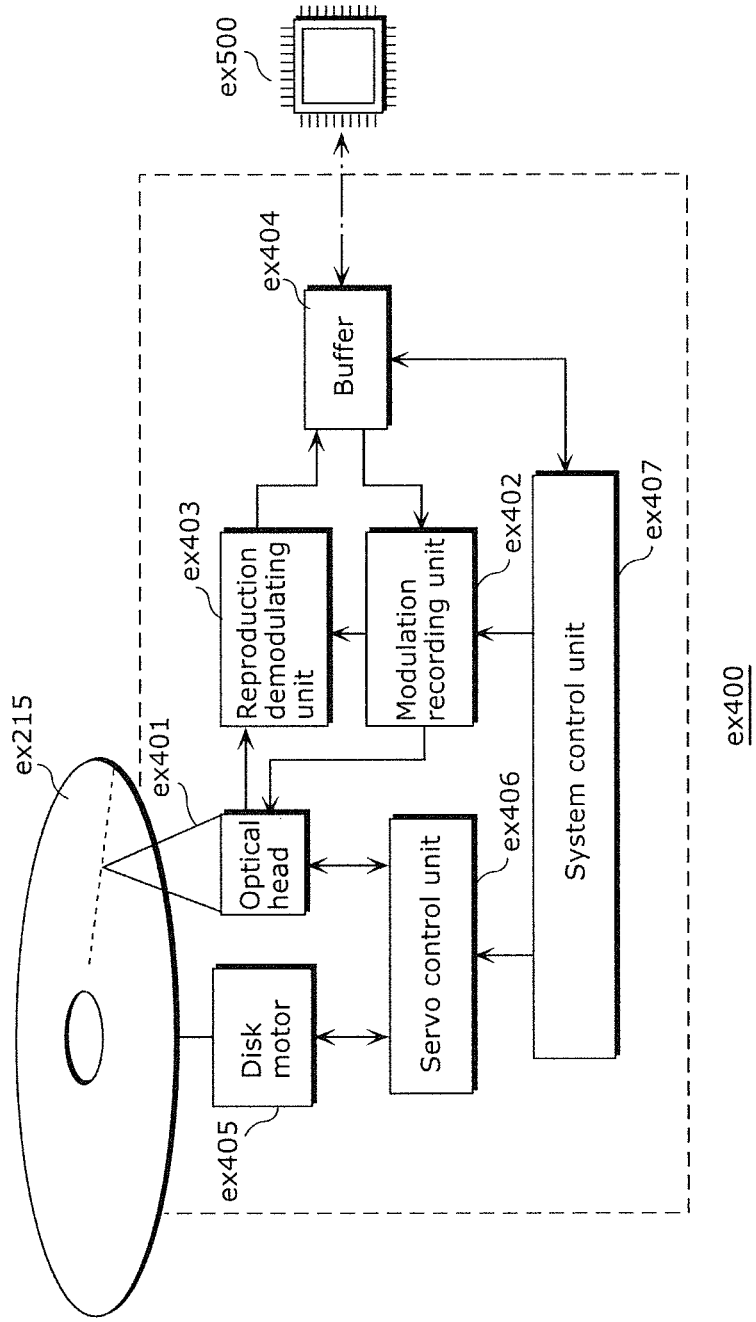
FIG. 36 shows a block diagram illustrating an example of a configuration of an information reproducing/recording unit that reads and writes information from and on a recording medium that is an optical disk.

As an example, FIG. 36 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 37:
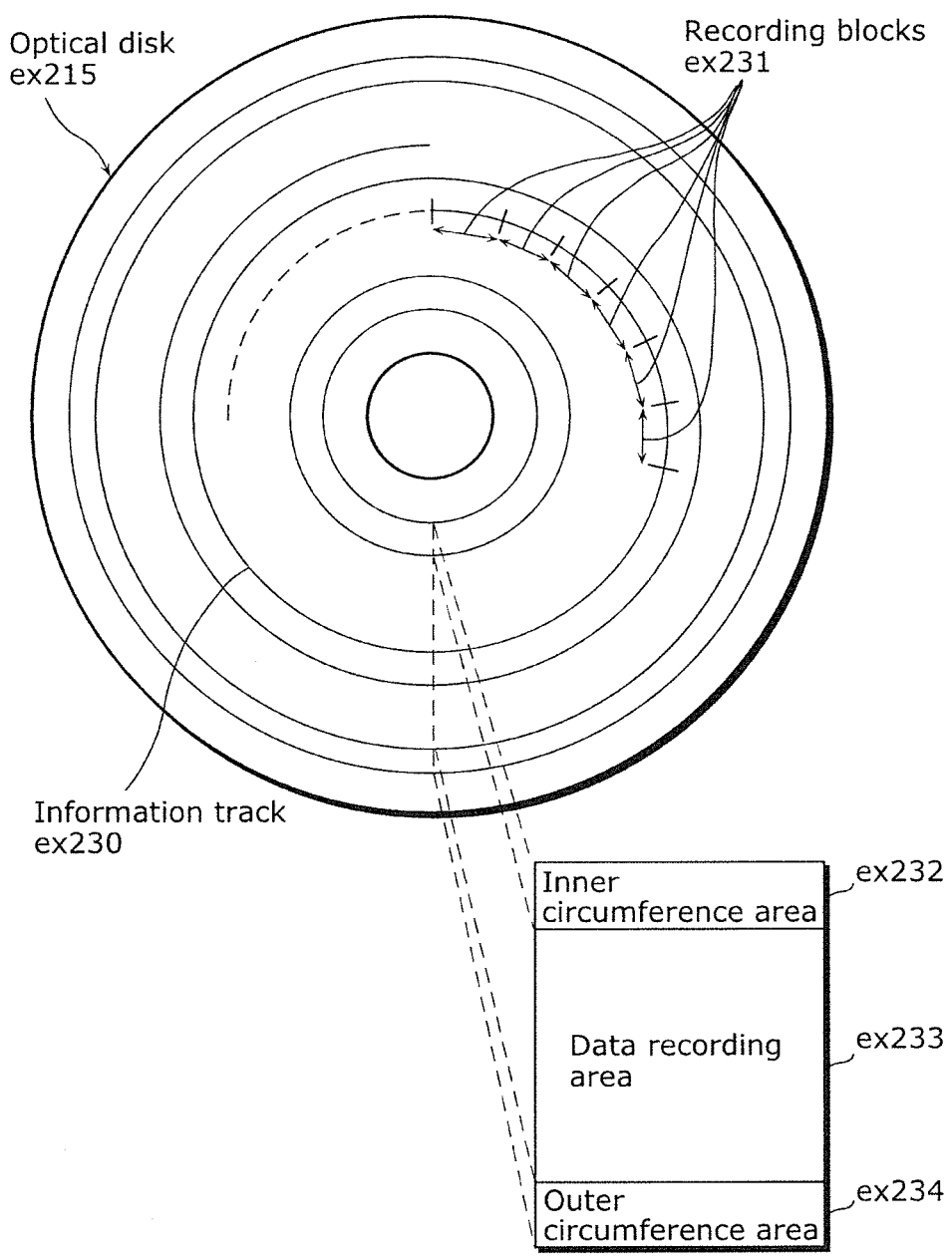
FIG. 37 shows an example of a configuration of a recording medium that is an optical disk.

FIG. 37 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 35.

The same will be true for the configuration of the computer ex111, the cellular phone ex114, and others.

Figure 38A:
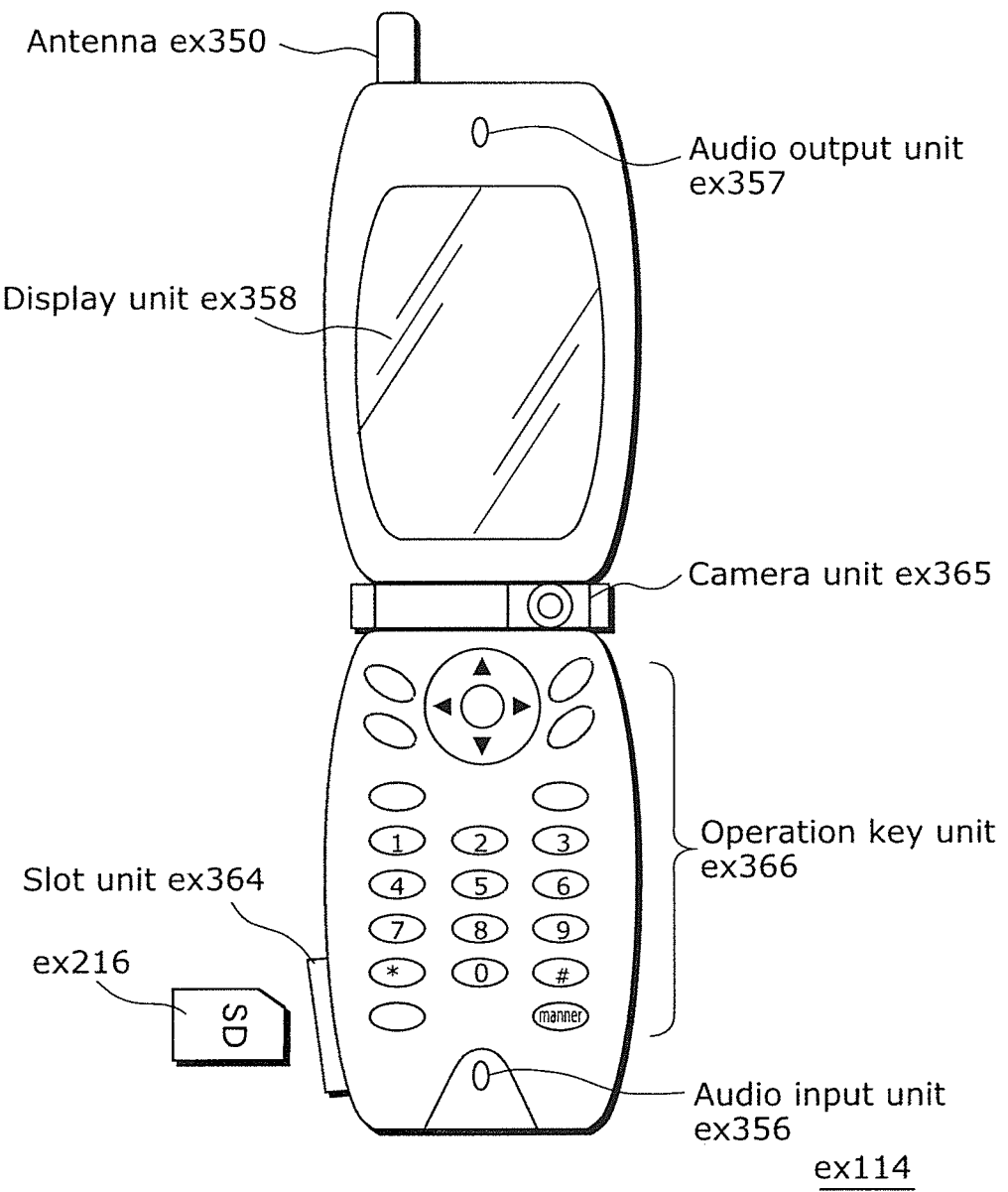
FIG. 38A shows an example of a cellular phone.

FIG. 38A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 38B:
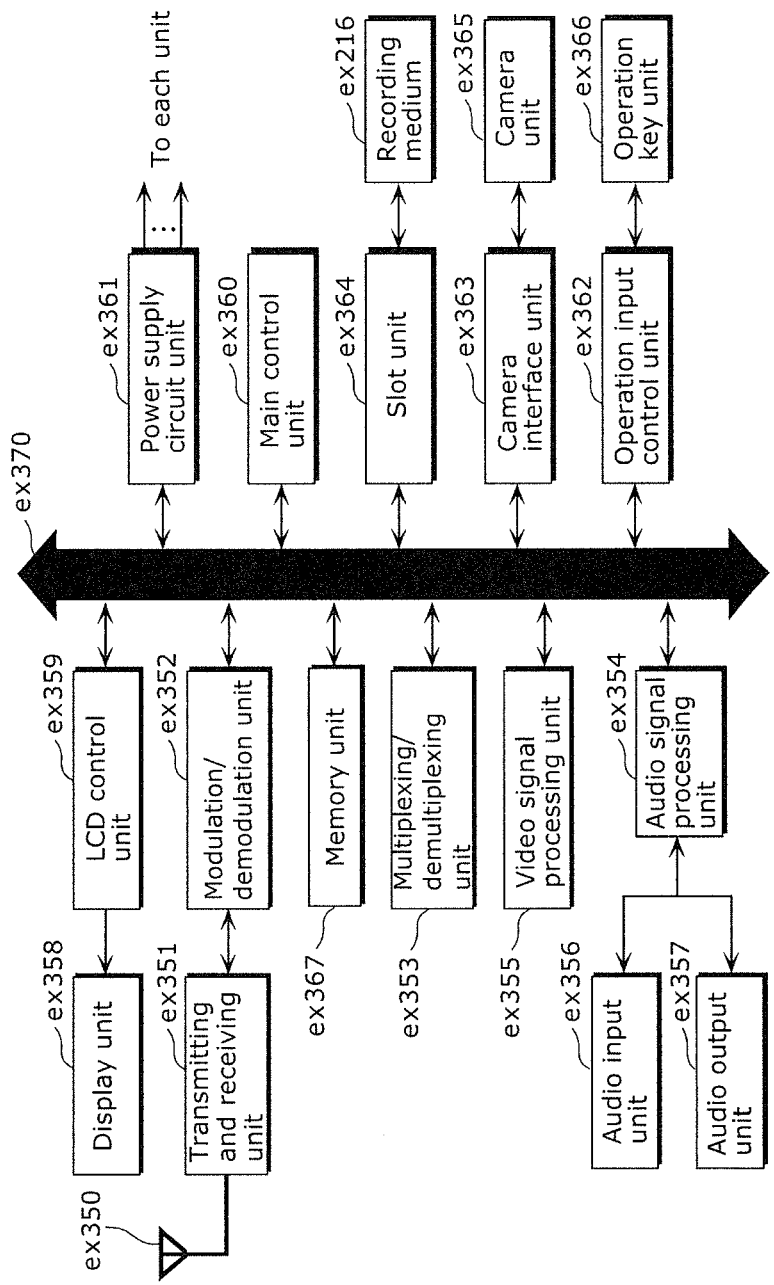
FIG. 38B is a block diagram showing an example of a configuration of a cellular phone.

Next, an example of a configuration of the cellular phone ex114 will be described with reference to FIG. 38B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 11

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 39 illustrates a structure of the multiplexed data. As illustrated in FIG. 39, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 40:
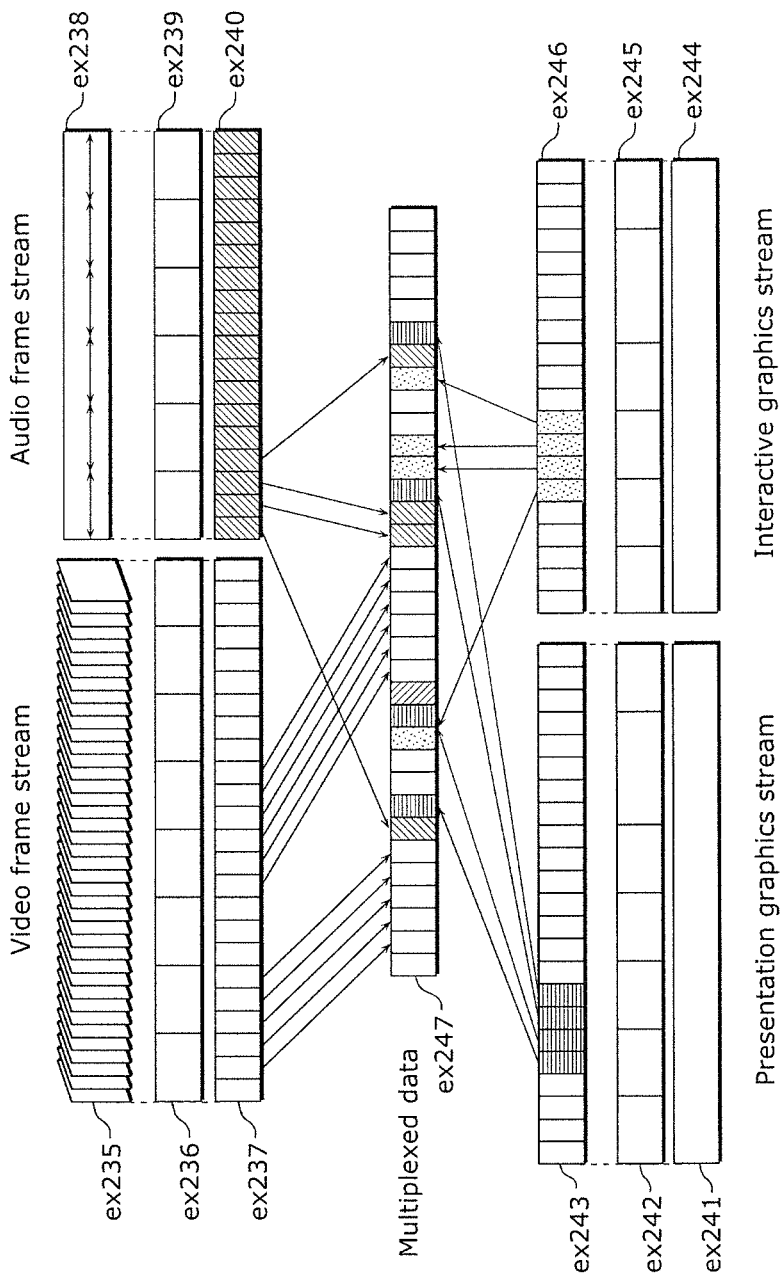
FIG. 40 schematically shows how each stream is multiplexed in multiplexed data.

FIG. 40 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 41:
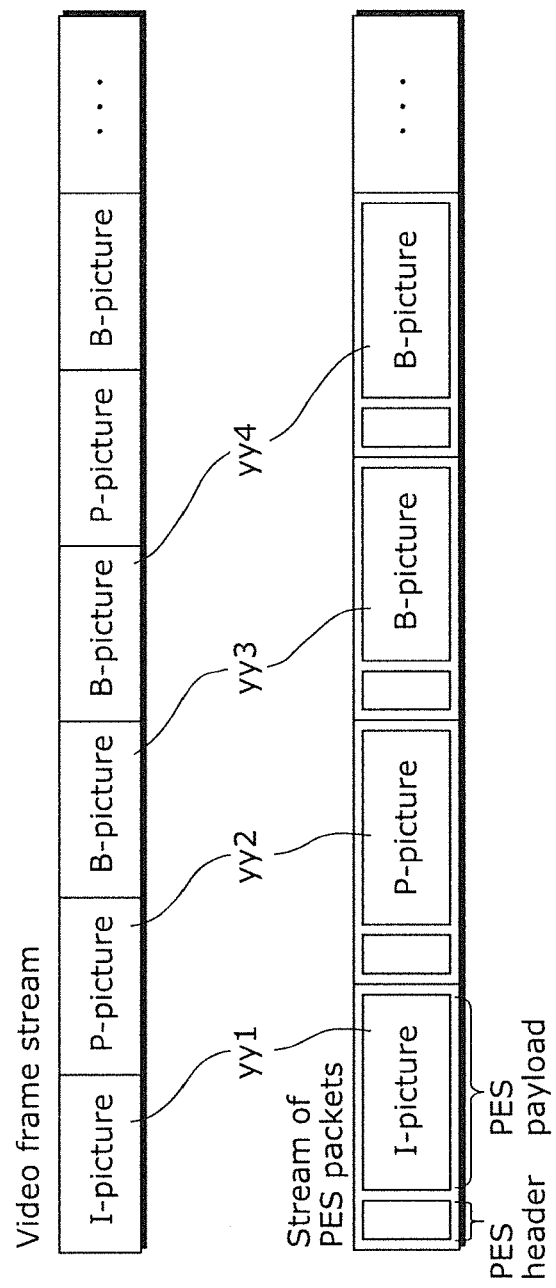
FIG. 41 shows how a video stream is stored in a stream of PES packets in more detail.

FIG. 41 illustrates how a video stream is stored in a stream of PES packets in more detail. The first bar in FIG. 41 shows a video frame stream in a video stream. The second bar shows the stream of PES packets. As indicated by arrows denoted as yy1, yy2, yy3, and yy4 in FIG. 41, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 42 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 42. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 43:
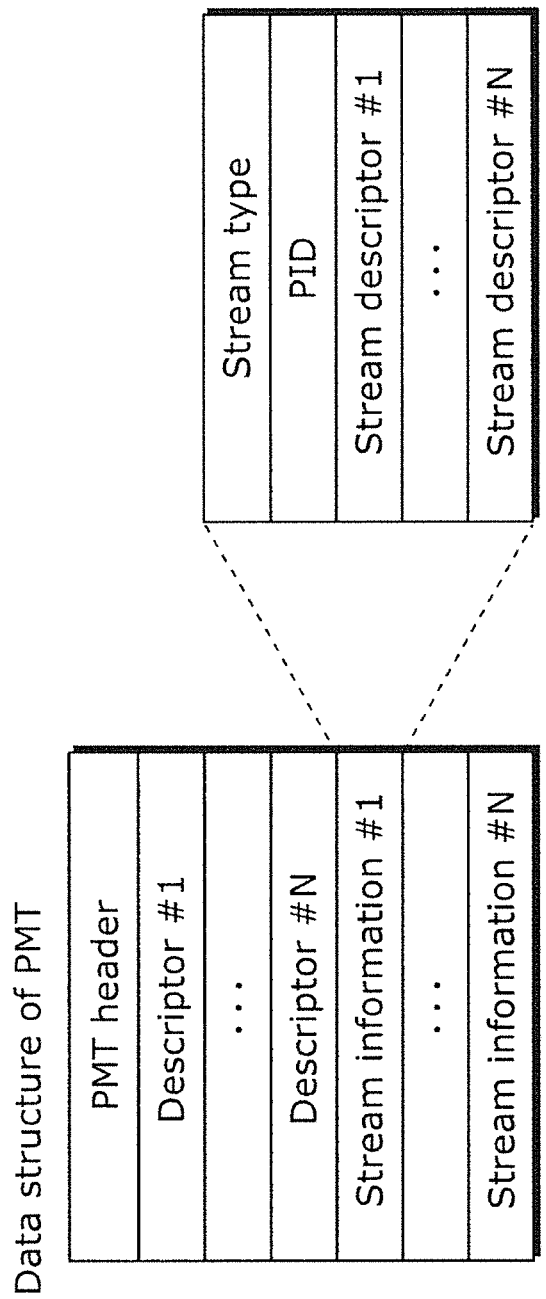
FIG. 43 shows a data structure of a PMT.

FIG. 43 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 44:
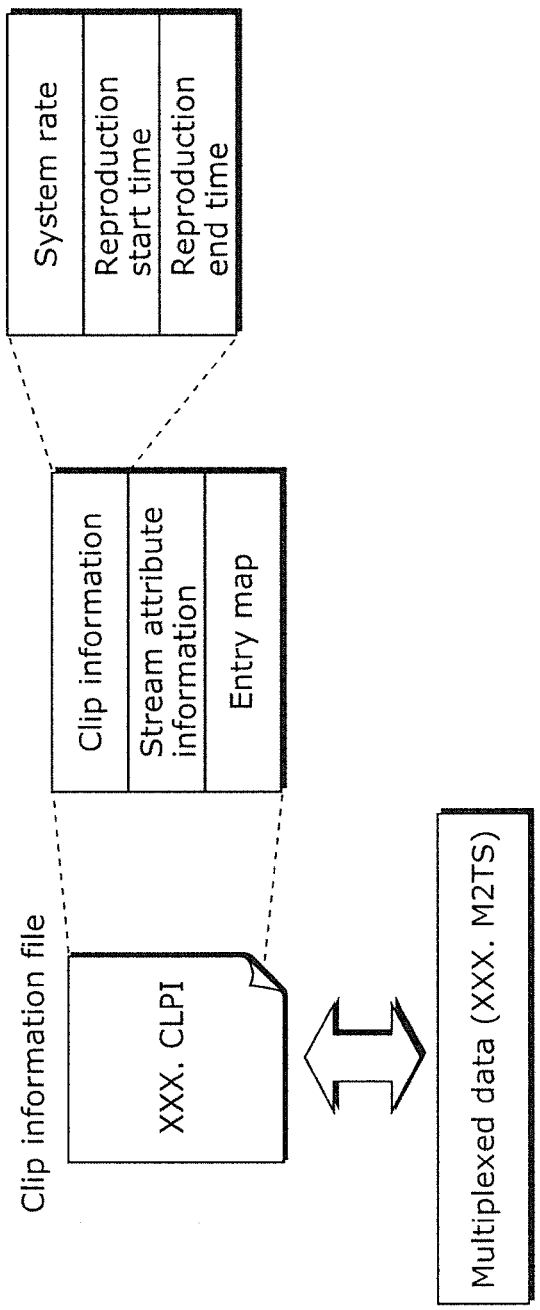
FIG. 44 shows an internal structure of multiplexed data information.

Each of the multiplexed data information files is management information of the multiplexed data as shown in FIG. 44. The multiplexed data information files are in one to one correspondence with the multiplexed data, and each of the files includes multiplexed data information, stream attribute information, and an entry map.

As illustrated in FIG. 44, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 45:
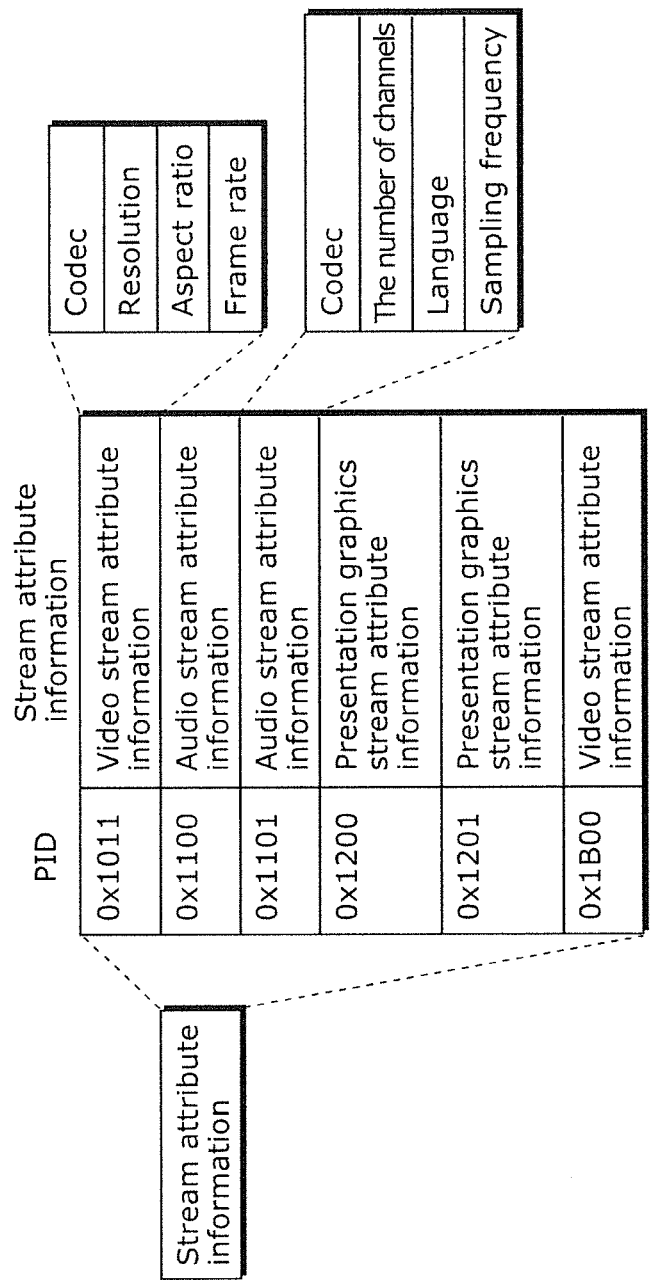
FIG. 45 shows an internal structure of stream attribute information.

As shown in FIG. 45, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 46:
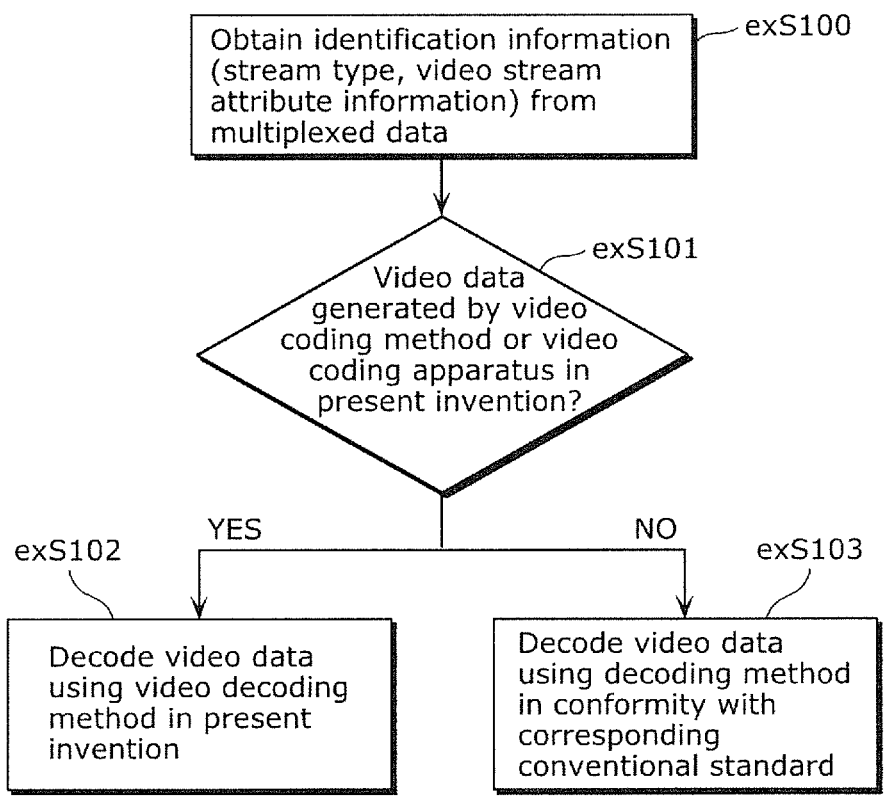
FIG. 46 shows steps for identifying video data.

Furthermore, FIG. 46 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 12

Figure 47:
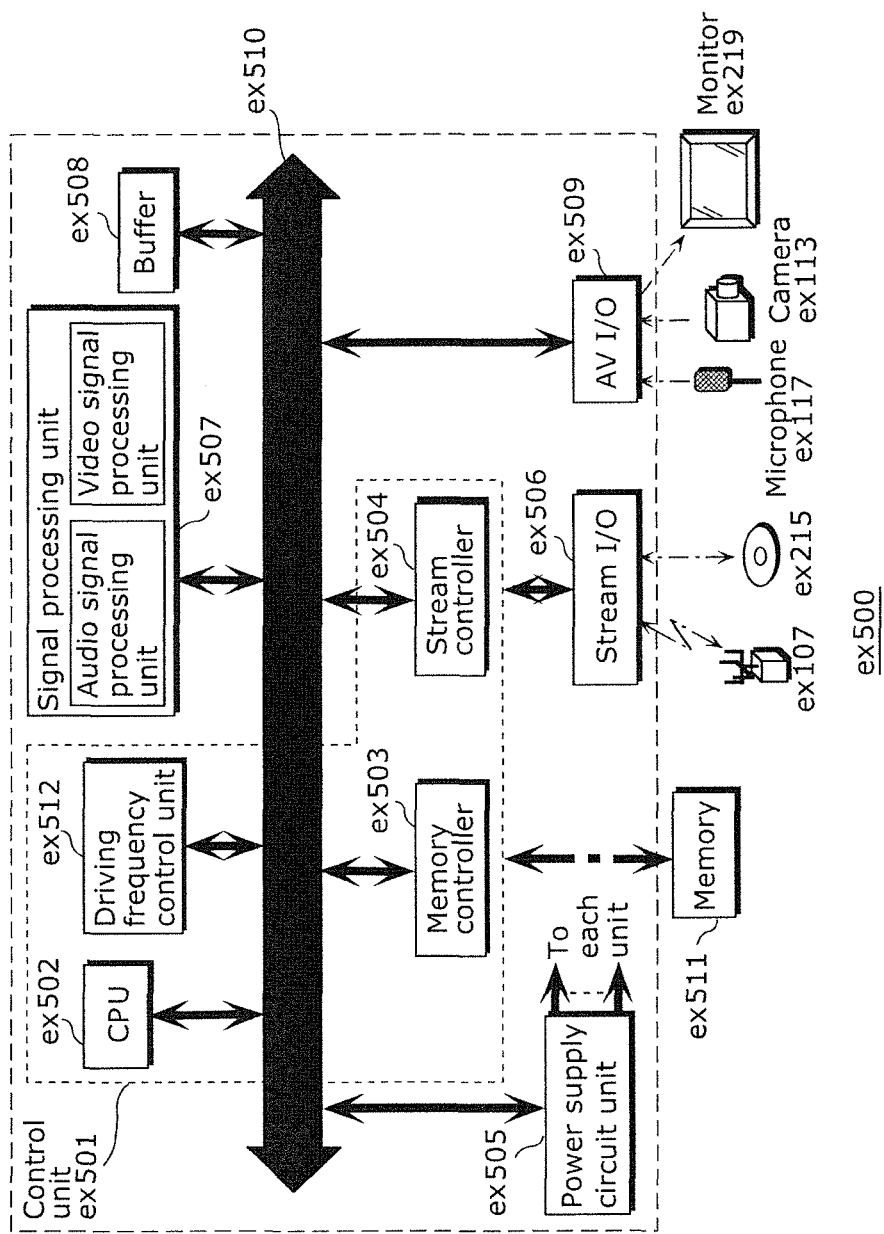
FIG. 47 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 47 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 13

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 48:
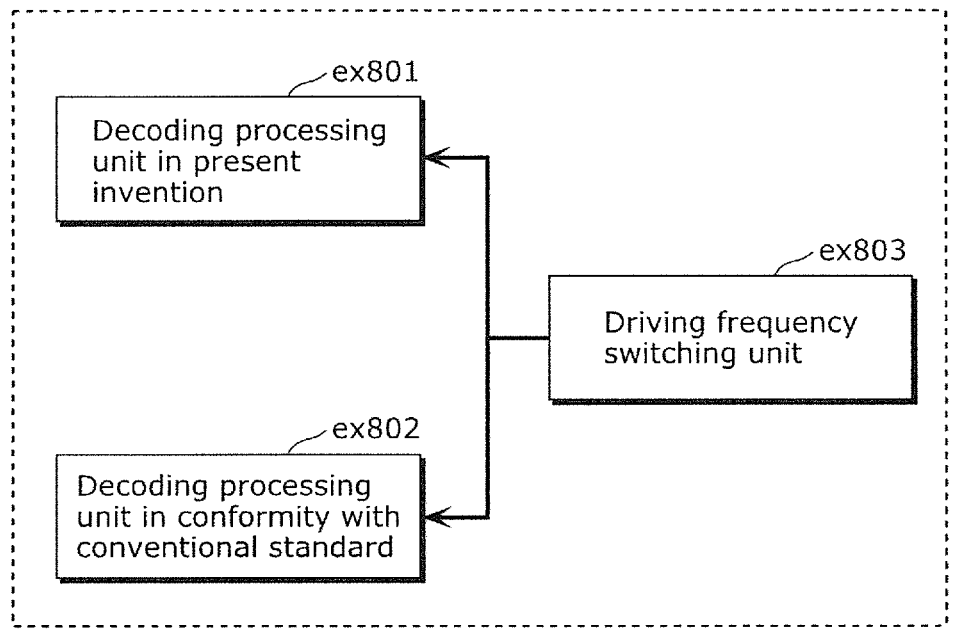
FIG. 48 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 48 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 47. Here, each of the decoding processing unit ex801 that executes the moving picture decoding method described in each of embodiments and the decoding processing unit ex802 that conforms to the conventional standard corresponds to the signal processing unit ex507 in FIG. 47. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 11 is probably used for identifying the video data. The identification information is not limited to the one described in Embodiment 11 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 50. The driving frequency can be selected by storing the look-up table in the buffer ex508 and in an internal memory of an LSI, and with reference to the look-up table by the CPU ex502.

Figure 49:
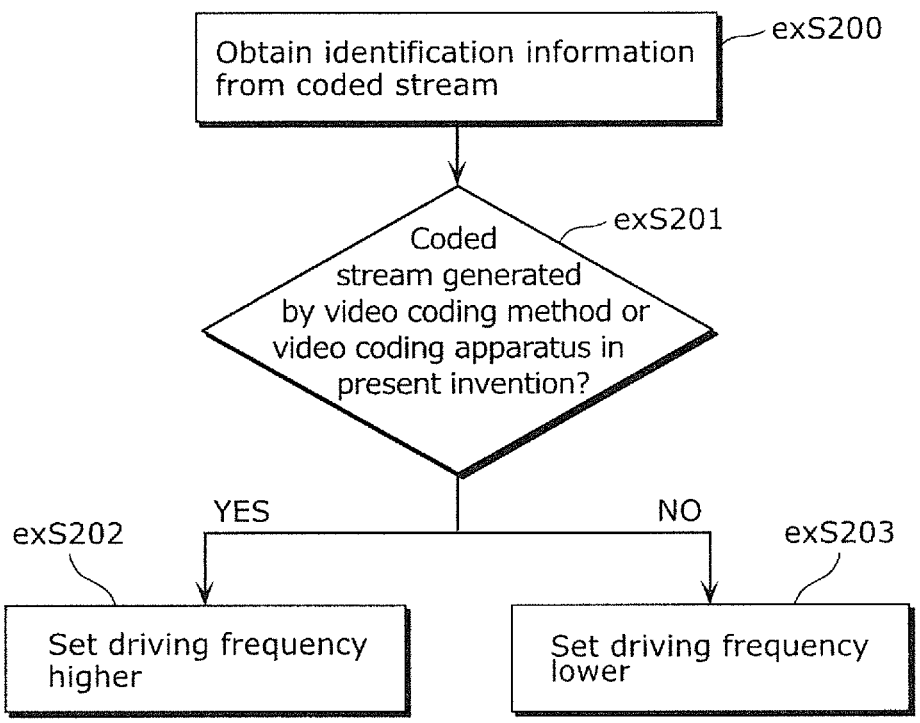
FIG. 49 shows steps for identifying video data and switching between driving frequencies.

FIG. 49 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 14

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 51A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by intra prediction processing in particular, for example, the dedicated decoding processing unit ex901 is used for intra prediction processing. Otherwise, the decoding processing unit is probably shared for one of the entropy decoding, inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 51B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

Methods and apparatuses for encoding and decoding video according to the present invention have advantages of improving coding efficiency. For example, the methods are applicable to video cameras, mobile phones, and personal computers.

REFERENCE SIGNS LIST

2000 Motion Estimation
2002 Motion Compensation
2004 Intra Prediction
2006 Switch Unit
2008 Subtracting Unit
2010 Transform
2012 Quantization
2014 Entropy Coding
2016 Inverse Quantization
2018 Inverse Transform
2020 Summing Unit
2022 Filter
2024 Intra Prediction Memory
2026 Picture Memory
2100 Entropy Decoding
2102 Inverse Quantization
2104 Inverse Transform
2106 Motion Compensation
2108 Intra Prediction
2110 Switch Unit
2112 Summing Unit
2114 Filter
2116 Intra Prediction Memory
2118 Picture Memory

The invention claimed is:

1. A method of encoding video utilizing inter-color-plane prediction comprising:
- writing a parameter into a header of a compressed video bitstream indicating color plane format;
- selecting one out of a plurality of predetermined rescaling schemes based on said color plane format;
- encoding a first block of original samples of a first color plane into said compressed video bitstream;
- reconstructing a block of reconstructed samples of said first color plane corresponding to said first block of original samples;
- performing an inter-color-plane prediction process using said selected rescaling scheme and said block of reconstructed samples of said first color plane to produce a block of prediction samples of a second color plane;
- subtracting said block of prediction samples of said second color plane from a second block of original samples of said second color plane to produce a block of residual samples of said second color plane, whereas the positions of said first block and said second block of original samples are aligned;
- encoding said block of residual samples of said second color plane into said compressed video bitstream.

2. A method of decoding video utilizing inter-color-plane prediction comprising:
- parsing a parameter from a header of a compressed video bitstream indicating color plane format;
- selecting one out of a plurality of predetermined rescaling schemes based on said color plane format;
- decoding a first block of residual samples of a first color plane from said compressed video bitstream;
- reconstructing a first block of reconstructed samples of said first color plane using said first block of residual samples of said first color plane;
- performing an inter-color-plane prediction process using said selected rescaling scheme and said block of reconstructed samples of said first color plane to produce a block of prediction samples of a second color plane;
- decoding a second block of residual samples of said second color plane from said compressed video bitstream, whereas the positions of said first block and said second block of residual samples are aligned;
- reconstructing a second block of reconstructed samples of said second color plane comprising summing said second block of residual samples of said second color plane and said block of prediction samples of said second color plane.

3. An apparatus for encoding video utilizing inter-color-plane prediction comprising:
- a writing unit operable to write a parameter into a header of a compressed video bitstream indicating color plane format;
- a selecting unit operable to select one out of a plurality of predetermined rescaling schemes based on said color plane format;
- an encoding unit operable to encode a first block of original samples of a first color plane into said compressed video bitstream;
- a reconstruction unit operable to reconstruct a block of reconstructed samples of said first color plane corresponding to said first block of original samples;
- a prediction unit operable to perform an inter-color-plane prediction process using said selected rescaling scheme and said block of reconstructed samples of said first color plane to produce a block of prediction samples of a second color plane;
- a subtracting unit operable to subtract said block of prediction samples of said second color plane from a second block of original samples of said second color plane to produce a block of residual samples of said second color plane, whereas the positions of said first block and said second block of original samples are aligned;
- an encoding unit operable to encode said block of residual samples of said second color plane into said compressed video bitstream.

4. An apparatus for decoding video utilizing inter-color-plane prediction comprising:
- a parsing unit operable to parse a parameter from a header of a compressed video bitstream indicating color plane format;
- a selecting unit operable to select one out of a plurality of predetermined rescaling schemes based on said color plane format;
- a decoding unit operable to decode a first block of residual samples of a first color plane from said compressed video bitstream;
- a reconstruction unit operable to reconstruct a first block of reconstructed samples of said first color plane using said first block of residual samples of said first color plane;
- a prediction unit operable to perform an inter-color-plane prediction process using said selected rescaling scheme and said block of reconstructed samples of said first color plane to produce a block of prediction samples of a second color plane;
- a decoding unit operable to decode a second block of residual samples of said second color plane from said compressed video bitstream, whereas the positions of said first block and said second block of residual samples are aligned;
- a reconstruction unit operable to reconstruct a second block of reconstructed samples of said second color plane comprising summing said second block of residual samples of said second color plane and said block of prediction samples of said second color plane.

* * * * *